((12)) United States Patent
Guan et al.

(10) Patent No.: US 12,470,335 B2
(45) Date of Patent: Nov. 11, 2025

(54) METHOD FOR UPDATING BEAM INFORMATION AND COMMUNICATIONS APPARATUS

(71) Applicant: HUAWEI TECHNOLOGIES CO., LTD., Guangdong (CN)

(72) Inventors: Peng Guan, Shenzhen (CN); Xi Zhang, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 330 days.

(21) Appl. No.: 17/671,229

(22) Filed: Feb. 14, 2022

(65) Prior Publication Data

US 2022/0173848 A1  Jun. 2, 2022

Related U.S. Application Data

(63) Continuation of application No. PCT/CN2020/108073, filed on Aug. 10, 2020.

(30) Foreign Application Priority Data

Aug. 14, 2019 (CN) .................. 201910750959.X
Sep. 30, 2019 (CN) .................. 201910941731.9
Feb. 11, 2020 (CN) .................. 202010087025.5

(51) Int. Cl.
  *H04L 5/00* (2006.01)
  *H04B 7/06* (2006.01)
(52) U.S. Cl.
  CPC ....... *H04L 5/0023* (2013.01); *H04B 7/06968* (2023.05); *H04L 5/0032* (2013.01); *H04L 5/0048* (2013.01); *H04L 5/0098* (2013.01)

(58) Field of Classification Search
  CPC ... H04L 5/0023; H04L 5/0032; H04L 5/0048; H04L 5/0098; H04L 5/001; H04B 7/0617; H04B 7/0695; H04B 7/06968
  USPC ................................ 370/330, 252, 329, 254
  See application file for complete search history.

(56) References Cited

U.S. PATENT DOCUMENTS

| 2018/0219606 A1 | 8/2018 | Ng et al. |
| 2018/0288755 A1 | 10/2018 | Liu et al. |
| 2020/0120644 A1* | 4/2020 | Zhou ............ H04B 7/0689 |
| 2020/0221432 A1* | 7/2020 | Park ............ H04L 1/1896 |
| 2020/0266872 A1* | 8/2020 | Bai ............ H04W 72/0446 |

(Continued)

FOREIGN PATENT DOCUMENTS

| CN | 108809600 A | 11/2018 |
| CN | 109845137 A | 6/2019 |

(Continued)

OTHER PUBLICATIONS

Office Action issued in Indian Application No. 202247009399 on Jul. 22, 2022, 5 pages.

(Continued)

*Primary Examiner* — Ricardo H Castaneyra
(74) *Attorney, Agent, or Firm* — Fish & Richardson P.C.

(57) ABSTRACT

This application provides methods and apparatuses for updating beam information. One method includes: receiving beam update information of a first component carrier (CC), and updating, based on the beam update information of the first CC, beam information of the first CC and beam information of one or more second CCs associated with the first CC.

20 Claims, 10 Drawing Sheets

(56) References Cited

U.S. PATENT DOCUMENTS

2021/0212101 A1* 7/2021 Jiang ................. H04W 72/0453
2021/0314927 A1* 10/2021 Noh ...................... H04L 5/0053

FOREIGN PATENT DOCUMENTS

WO     2018232090 A1    12/2018
WO     2019032997 A1    2/2019

OTHER PUBLICATIONS

3GPP TS 38.133 V15.5.0 (Mar. 2019), "3rd Generation Partnership Project; Technical Specification Group Radio Access Network; NR; Requirements for support of radio resource management(Release 15)," Mar. 2019, 893 pages.
3GPP TS 38.211 V15.5.0 (Mar. 2019), "3rd Generation Partnership Project; Technical Specification Group Radio Access Network; NR; Physical channels and modulation(Release 15)," Mar. 2019, 96 pages.
3GPP TS 38.212 V15.5.0 (Mar. 2019), "3rd Generation Partnership Project; Technical Specification Group Radio Access Network; NR; Multiplexing and channel coding(Release 15)," Mar. 2019, 101 pages.
3GPP TS 38.213 V15.5.0 (Mar. 2019), "3rd Generation Partnership Project; Technical Specification Group Radio Access Network; NR; Physical layer procedures for control(Release 15)," Mar. 2019, 104 pages.
3GPP TS 38.213 V15.6.0 (Jun. 2019), "3rd Generation Partnership Project; Technical Specification Group Radio Access Network; NR; Physical layer procedures for control(Release 15)," Jun. 2019, 107 pages.
3GPP TS 38.214 V15.5.0 (Mar. 2019), "3rd Generation Partnership Project; Technical Specification Group Radio Access Network; NR; Physical layer procedures for data(Release 15)," Mar. 2019, 103 pages.
3GPP TS 38.214 V15.6.0 (Jun. 2019), "3rd Generation Partnership Project; Technical Specification Group Radio Access Network; NR; Physical layer procedures for data(Release 15)," Jun. 2019, 105 pages.
3GPP TS 38.306 V15.5.0 (Mar. 2019), "3rd Generation Partnership Project; Technical Specification Group Radio Access Network; NR;User Equipment (UE) radio access capabilities(Release 15)," Mar. 2019, 49 pages.
3GPP TS 38.321 V15.5.0 (Mar. 2019), "3rd Generation Partnership Project; Technical Specification Group Radio Access Network; NR; Medium Access Control (MAC) protocol specification(Release 15)," Mar. 2019, 78 pages.
3GPP TS 38.321 V15.6.0 (Jun. 2019), "3rd Generation Partnership Project; Technical Specification Group Radio Access Network; NR; Medium Access Control (MAC) protocol specification(Release 15)," Jun. 2019, 78 pages.
3GPP TS 38.331 V15.5.0 (Mar. 2019), "3rd Generation Partnership Project; Technical Specification Group Radio Access Network; NR; Radio Resource Control (RRC) protocol specification(Release 15)," Mar. 2019, 491 pages.
3GPP TS 38.331 V15.6.0 (Jun. 2019), "3rd Generation Partnership Project; Technical Specification Group Radio Access Network; NR; Radio Resource Control (RRC) protocol specification(Release 15)," Jun. 2019, 519 pages.
LG Electronics, "Feature lead summary#2 of Enhancements on Multi-beam Operations," 3GPP TSG RAN WG1 Meeting #97, R1-1907768, Reno, USA, May 13-17, 2019, 34 pages.
PCT International Search Report and Written Opinion issued in International Application No. PCT/CN2020/108073 on Nov. 16, 2020, 17 pages (with English translation).
Qualcomm Incorporated, "Beam management for NR," 3GPP TSG-RAN WG1 Meeting #94, R1-1809711, Gothenburg, Sweden, Aug. 20-24, 2018, 16 pages.

* cited by examiner

| | | | |
|---|---|---|---|
| R | Serving cell ID | BWP ID | Oct 1 |
| $C_0$ | TCI state (TCI-state) $ID_{0,1}$ | | Oct 2 |
| R | TCI state (TCI-state) $ID_{0,2}$ | | Oct 3 (optional) |

...

| | | |
|---|---|---|
| $C_N$ | TCI state (TCI-state) $ID_{N,1}$ | Oct M–1 |
| R | TCI state (TCI-state) $ID_{N,2}$ | Oct M (optional) |

METHOD FOR UPDATING BEAM INFORMATION AND COMMUNICATIONS APPARATUS

CROSS-REFERENCE TO RELATED APPLICATIONS

This application is a continuation of International Application No. PCT/CN2020/108073, filed on Aug. 10, 2020, which claims priority to Chinese Patent Application No. 201910750959.X, filed on Aug. 14, 2019 and Chinese Patent Application No. 201910941731.9, filed on Sep. 30, 2019 and Chinese Patent Application No. 202010087025.5, filed on Feb. 11, 2020. All of the aforementioned patent applications are hereby incorporated by reference in their entireties.

TECHNICAL FIELD

This application relates to the communications field, and specifically, to a method for updating beam information and a communications apparatus.

BACKGROUND

In a communication process, for example, in high-frequency communication, different component carriers (CC) may use a same analog beam, or may use different analog beams. To reduce beam management overheads, in an actually deployed high-frequency communications system, a beam management reference signal is usually configured only for one or a few CCs. A result, including a beam indication, of beam management for the one or a few CCs may be used for another CC. In this case, beam configurations of all CCs are the same.

When a beam of one CC changes, beams of all other CCs should change. In a conventional technology, to notify such a beam change, same signaling needs to be sent on all CCs, for example, radio resource control (RRC) signaling (where for example, only identifiers (ID) of the CCs are different) and a medium access control-control element (MAC-CE) (where for example, only IDs of the CCs are different).

This notification method incurs huge signaling overheads.

SUMMARY

This application provides a method for updating beam information and a communications apparatus, to reduce signaling overheads and a delay of a beam indication.

According to a first aspect, a method for updating beam information is provided. The method may be performed by a terminal device, or may be performed by a chip, a chip system, or a circuit configured in a terminal device. This is not limited in this application.

The method may include: receiving beam update information of a first component carrier (CC); and updating beam information of one or more second CCs and beam information of the first CC based on the beam update information of the first CC, where the one or more second CCs are associated with the first CC.

Optionally, the one or more second CCs and the first CC use a same beam configuration.

Optionally, for example, beam information of a CC may be embodied as information about a reception beam of the CC, namely, a reception beam used in a communication process. For example, a reception beam of the terminal device is a reception beam used when the terminal device receives a signal or data on a frequency domain resource of the CC. For another example, a transmission beam of a network device is a transmission beam used when the network device sends a signal or data on a frequency domain resource of the CC. It should be understood that, the transmission beam of the network device and the reception beam of the terminal device form a downlink. It may be understood that, that the reception beam of the terminal device changes means that the transmission beam of the network device also changes. In other words, when the transmission beam of the network device changes, the reception beam of the corresponding terminal device also changes accordingly.

For example, beam information of a CC may be embodied as a transmission configuration indicator (TCI). The TCI may be a TCI used to transmit a signal or data on a frequency domain resource of the CC.

Optionally, for example, beam information of a CC may be embodied as information about a transmission beam of the CC, namely, a transmission beam used in a communication process. For example, a transmission beam of the terminal device is a transmission beam used when the terminal device sends a signal or data on a frequency domain resource of the CC. For another example, a reception beam of the network device is a reception beam used when the network device receives a signal or data on a frequency domain resource of the CC. It should be understood that, the reception beam of the network device and the transmission beam of the terminal device form an uplink. It may be understood that, that the transmission beam of the terminal device changes means that the reception beam of the network device also changes. In other words, when the reception beam of the network device changes, the transmission beam of the corresponding terminal device also changes accordingly. Optionally, that the one or more second CCs are associated with the first CC may represent that the one or more second CCs and the first CC use a same beam; or may represent that in the beam configuration of the one or more second CCs and the beam configuration of the first CC, all information except IDs of the CCs is the same; or may represent that an active TCI state (TCI-state) of the one or more second CCs is the same as an active TCI-state of the first CC; or may represent that a reference signal resource identifier included in an active TCI-state of the one or more second CCs is associated with an identifier (ID) of the first CC and a reference signal resource identifier included in an active TCI-state of the first CC; or may represent that a same quasi-co-location (QCL)-type D (typeD) (qcl-TypeD) is configured for the one or more second CCs and the first CC; or may represent that the one or more second CCs have a QCL relationship with the first CC.

Optionally, the first CC may represent a CC used for beam management or beam training, and the second CC may represent a CC that uses a beam training result of the first CC.

Based on the foregoing technical solution, when a plurality of CCs (namely, the one or more second CCs and the first CC) are associated with each other, beam update information of one CC (namely, the beam update information of the first CC) may be used to update beam information of the plurality of CCs. In other words, the network device does not need to send beam update information for each CC to indicate the terminal device to update beam information of the corresponding CC. The terminal device updates the beam information. In other words, the terminal device updates a reception beam and/or a transmission beam. Alternatively, it may be understood as that the terminal device performs communication on the CC by using an updated reception beam and/or an updated transmission beam. In this application, the beam information of the plurality of CCs may be updated by using one piece of signaling, in other words, the terminal device may update reception beams and/or transmission beams of the plurality of CCs by using one piece of signaling, so that not only repeated signaling sending and a redundant configuration can be reduced, but also overheads and a delay of a beam indication can be reduced, thereby improving communication performance.

With reference to the first aspect, in some implementations of the first aspect, before the receiving beam update information of a first CC, the method further includes: receiving beam configuration information and indication information of the first CC, where the indication information is used to indicate that the one or more second CCs are associated with the first CC.

Based on the foregoing technical solution, when the plurality of CCs (namely, the one or more second CCs and the first CC) are associated with each other, a beam configuration may be performed only for one or some of the CCs (namely, the first CC). In this way, a redundant configuration can be reduced and a resource can be saved.

With reference to the first aspect, in some implementations of the first aspect, that the one or more second CCs are associated with the first CC includes: the one or more second CCs and the first CC use a same beam configuration.

Optionally, the indication information indicates that the one or more second CCs and the first CC use a same beam configuration.

With reference to the first aspect, in some implementations of the first aspect, the method further includes: receiving information about a time-frequency tracking reference signal resource configured for the first CC and information about a time-frequency tracking reference signal resource configured for the one or more second CCs; and the updating beam information of one or more second CCs based on the beam update information of the first CC includes: updating beam information of the time-frequency tracking reference signal resource of the one or more second CCs based on the beam update information of the first CC.

The updating beam information of the time-frequency tracking reference signal resource of the one or more second CCs represents updating the beam information corresponding to the time-frequency tracking reference signal resource of the one or more second CCs.

Optionally, the terminal device may update a reception beam of the time-frequency tracking reference signal resource of the second CC based on the beam update information of the first CC.

Optionally, the network device may configure the time-frequency tracking reference signal resource for the first CC, and/or the network device may configure the time-frequency tracking reference signal resource for the one or more second CCs.

With reference to the first aspect, in some implementations of the first aspect, the beam update information of the first CC includes information about an active transmission configuration indicator (TCI) state TCI-state of the first CC; and the updating beam information of one or more second CCs and beam information of the first CC includes: activating a TCI-state of the one or more second CCs and a TCI-state of the first CC, where an active TCI-state of the one or more second CCs is the same as the active TCI-state of the first CC.

Based on the foregoing technical solution, the terminal device may determine, based on the beam update information of the first CC, one TCI-state selected (or activated) for the first CC. The terminal device may further determine the active TCI-state of the one or more second CCs based on the beam update information of the first CC. It may be understood that the network device no longer needs to indicate the active TCI-state of the one or more second CCs to the terminal device, so that the overheads and the delay of the beam indication can be reduced. For example, the terminal device may determine, based on the beam update information of the first CC, that the TCI-state activated for the first CC is a TCI-state #2. In this case, the terminal device may further determine, based on the beam update information of the first CC, that the active TCI-state of the one or more second CCs is the TCI-state #2.

Optionally, the beam update information of the first CC is carried in medium access control-control element (MAC-CE) signaling.

With reference to the first aspect, in some implementations of the first aspect, the updating beam information of one or more second CCs and beam information of the first CC further includes: updating a mapping relationship, of the one or more second CCs, between a TCI-state identifier TCI-state ID and a TCI field value and a mapping relationship, of the first CC, between a TCI-state ID and a TCI field value, where an updated mapping relationship, of the one or more second CCs, between a TCI-state ID and a TCI field value is the same as an updated mapping relationship, of the first CC, between a TCI-state ID and a TCI field value.

It may be understood that both a mapping relationship, of the one or more second CCs, between an active TCI-state and a TCI field value and the mapping relationship, of the one or more second CCs, between a TCI-state ID and a TCI field value are updated to be the same as those of the first CC.

Optionally, a mapping relationship, of the one or more second CCs, between a TCI-state identifier TCI-state ID and a TCI field value that is in DCI and a mapping relationship, of the first CC, between a TCI-state ID and a TCI field value that is in DCI are updated, where an updated mapping relationship, of the one or more second CCs, between a TCI-state ID and a TCI field value that is in DCI is the same as an updated mapping relationship, of the first CC, between a TCI-state ID and a TCI field value that is in DCI.

Optionally, terminal capability information is sent, where the terminal capability information includes: whether the terminal device supports simultaneous updating of an active TCI-state and a mapping relationship between a TCI-state ID and a TCI field value.

Based on the foregoing technical solution, the mapping relationship of the one or more second CCs is simultaneously updated, that is, the mapping relationship, of the one or more second CCs, between a TCI state ID and a TCI field value that is in DCI is updated, so that both a mapping relationship, of the one or more second CCs, between an active TCI-state and a TCI field value and the mapping relationship, of the one or more second CCs, between a TCI-state ID and a TCI field value can be updated to be the same as those of the first CC. Therefore, it can be avoided that a data transmission beam of the terminal device is not aligned with that of the network device, so that impact on transmission performance is avoided.

With reference to the first aspect, in some implementations of the first aspect, the beam update information of the first CC includes information about an active TCI-state of the first CC; and the updating beam information of one or more second CCs includes: updating a spatial relationship of the one or more second CCs, where an updated spatial relationship of the one or more second CCs is associated with the active TCI-state of the first CC.

Optionally, after the updating, the second CC and the first CC have a same spatial relationship (SR). In other words, a transmission beam used for sending an uplink signal by the second CC is the same as that used for sending an uplink signal by the first CC.

Optionally, the spatial relationship of the second CC is associated with the TCI-state of the first CC, that is, the transmission beam of the second CC (namely, the spatial relationship of the second CC) is an uplink transmission beam corresponding to the downlink reception beam (namely, the TCI-state of the first CC).

Based on the foregoing technical solution, the terminal device may automatically update the spatial relationship of the second CC based on an indication of the active TCI-state of the first CC.

With reference to the first aspect, in some implementations of the first aspect, the beam update information of the first CC includes information about a reference signal resource corresponding to an active TCI-state of the first CC; and the updating beam information of one or more second CCs and beam information of the first CC includes: updating a reference signal resource corresponding to an active TCI-state of the one or more second CCs and the reference signal resource corresponding to the active TCI-state of the first CC, where an updated reference signal resource corresponding to the active TCI-state of the one or more second CCs is the same as an updated reference signal resource corresponding to the active TCI-state of the first CC.

The reference signal resource corresponding to the active TCI-state of the first CC represents a reference signal resource included in the active TCI-state of the first CC. The updating a reference signal resource corresponding to an active TCI-state of the one or more second CCs and the reference signal resource corresponding to the active TCI-state of the first CC represents updating a reference signal resource included in the active TCI-state of the one or more second CCs and a reference signal resource included in the active TCI-state of the first CC.

That an updated reference signal resource corresponding to the active TCI-state of the one or more second CCs is the same as an updated reference signal resource corresponding to the active TCI-state of the first CC represents that, after the reference signal resources are updated, a reference signal resource included in the active TCI-state of the one or more second CCs is the same as the reference signal resource included in the active TCI-state of the first CC.

Optionally, the beam update information of the first CC is carried in radio resource control (RRC) signaling.

Based on the foregoing technical solution, the terminal device may determine the reference signal resource of the active TCI-state of the first CC based on the beam update information of the first CC. The terminal device may further determine the reference signal resource of the active TCI-state of the one or more second CCs based on the beam update information of the first CC. It may be understood that the network device no longer needs to indicate the reference signal resource of the active TCI-state of the one or more second CCs to the terminal device, so that the overheads and the delay of the beam indication can be reduced. For example, the terminal device may determine, based on the beam update information of the first CC, that the reference signal resource of the active TCI-state of the first CC is updated to a channel state information reference signal (CSI-RS) #2. In this case, the terminal device may further determine, based on the beam update information of the first CC, that the reference signal resource of the active TCI-state of the one or more second CCs is updated to the CSI-RS #2 of the first CC.

With reference to the first aspect, in some implementations of the first aspect, that the one or more second CCs are associated with the first CC includes one or more of the following: the active TCI-state of the one or more second CCs is the same as the active TCI-state of the first CC; a reference signal resource included in the active TCI-state of the one or more second CCs is the same as a reference signal resource included in the active TCI-state of the first CC; a reference signal resource identifier (ID) included in the active TCI-state of the one or more second CCs is associated with an ID of the first CC and a reference signal resource ID included in the active TCI-state of the first CC; the one or more second CCs have a quasi-co-location (QCL) relationship with the first CC; or the one or more second CCs use a beam training result of the first CC.

Optionally, beam management is performed on the first CC, or the first CC is used for beam training.

Optionally, the first CC represents a CC that sends a beam management reference signal (such as a synchronization signal block (SSB), a CSI-RS, or a sounding reference signal (SRS)).

With reference to the first aspect, in some implementations of the first aspect, the beam update information of the first CC is carried in medium access control-control element (MAC-CE) signaling, and a reserved field in the MAC-CE signaling can be used to indicate whether to update the beam information of the one or more second CCs and the beam information of the first CC based on the beam update information of the first CC.

Optionally, when a value of the reserved field R in the MAC-CE signaling is 1, the beam information of the one or more second CCs and the beam information of the first CC are updated based on the beam update information of the first CC; or when a value of the reserved field R in the MAC-CE signaling is 0, only the beam information of the first CC is updated based on the beam update information of the first CC.

According to a second aspect, a method for updating beam information is provided. The method may be performed by a network device, or may be performed by a chip, a chip system, or a circuit configured in a network device. This is not limited in this application.

The method may include: generating beam update information of a first component carrier (CC), where the beam update information of the first CC can be used by a terminal device to update beam information of one or more second CCs and beam information of the first CC, and the one or more second CCs are associated with the first CC; and sending the beam update information of the first CC.

Based on the foregoing technical solution, when a plurality of CCs (namely, the one or more second CCs and the first CC) are associated with each other, the network device may update beam information of the plurality of CCs by using beam update information of one CC (namely, the beam update information of the first CC). In other words, the network device does not need to send beam update information for each CC to indicate the terminal device to update beam information of the corresponding CC. The terminal device updates the beam information. In other words, the terminal device updates a reception beam and/or a transmission beam. Alternatively, it may be understood as that the terminal device performs communication on the CC by using an updated reception beam and/or an updated transmission beam. In this application, the network device may enable, by using one piece of signaling, the terminal device to update the beam information of the plurality of CCs, so that not only repeated signaling sending and a redundant configuration can be reduced, but also overheads and a delay of a beam indication can be reduced, thereby improving communication performance.

With reference to the second aspect, in some implementations of the second aspect, before the sending the beam update information of the first CC, the method further includes: sending beam configuration information and indication information of the first CC, where the indication information is used to indicate that the one or more second CCs are associated with the first CC.

With reference to the second aspect, in some implementations of the second aspect, that the one or more second CCs are associated with the first CC includes: The one or more second CCs and the first CC use a same beam configuration.

With reference to the second aspect, in some implementations of the second aspect, the method further includes: sending information about a time-frequency tracking reference signal resource configured for the first CC and information about a time-frequency tracking reference signal resource configured for the one or more second CCs.

With reference to the second aspect, in some implementations of the second aspect, the beam update information of the first CC includes information about an active transmission configuration indicator (TCI) state TCI-state of the first CC.

Optionally, the beam update information of the first CC is carried in medium access control-control element (MAC-CE) signaling.

With reference to the second aspect, in some implementations of the second aspect, the beam update information of the first CC includes information about a reference signal resource corresponding to the active TCI-state of the first CC.

Optionally, the beam update information of the first CC is carried in radio resource control (RRC) signaling.

With reference to the second aspect, in some implementations of the second aspect, that the one or more second CCs are associated with the first CC includes one or more of the following: an active TCI-state of the one or more second CCs is the same as the active TCI-state of the first CC; a reference signal resource included in the active TCI-state of the one or more second CCs is the same as the reference signal resource included in the active TCI-state of the first CC; a reference signal resource identifier (ID) included in the active TCI-state of the one or more second CCs is associated with an ID of the first CC and a reference signal resource ID included in the active TCI-state of the first CC; the one or more second CCs have a quasi-co-location (QCL) relationship with the first CC; or the one or more second CCs use a beam training result of the first CC, where beam management is performed on the first CC.

With reference to the second aspect, in some implementations of the second aspect, the MAC-CE signaling is sent, where the MAC-CE signaling includes the beam update information of the first CC, and a reserved field in the MAC-CE signaling can be used to indicate the terminal device whether to update the beam information of the one or more second CCs and the beam information of the first CC based on the beam update information of the first CC.

Optionally, when a value of the reserved field R in the MAC-CE signaling is 1, the terminal device can update the beam information of the one or more second CCs and the beam information of the first CC based on the beam update information of the first CC; or when a value of the reserved field R in the MAC-CE signaling is 0, the terminal device updates only the beam information of the first CC based on the beam update information of the first CC.

According to a third aspect, a method for updating beam information is provided. The method may be performed by a terminal device, or may be performed by a chip, a chip system, or a circuit configured in a terminal device. This is not limited in this application.

The method may include: receiving beam configuration information of a first CC; and receiving indication information, where the indication information is used to indicate that one or more second CCs are associated with the first CC.

According to a fourth aspect, a method for updating beam information is provided. The method may be performed by a terminal device, or may be performed by a chip, a chip system, or a circuit configured in a terminal device. This is not limited in this application.

The method may include:

receiving first signaling, where the first signaling includes information about to-be-activated N transmission configuration indicator (TCI) states of a first component carrier (CC), the first signaling can be used to activate the N TCI states of the first CC and a second CC, and the second CC is associated with the first CC, where N is an integer greater than or equal to 1.

When one or more previously activated TCI states of the second CC include some or all of the N TCI states, a TCI deactivation command of the first CC does not take effect for the second CC.

It may be understood that the first signaling can be used to activate TCI states of a plurality of CCs (for example, the first CC and the second CC), in other words, the TCI states of the plurality of CCs can be activated by using one piece of signaling. For that the first signaling can be used to activate TCI states of a plurality of CCs (for example, the first CC and the second CC), refer to the method provided in any one of the first aspect to the third aspect.

Optionally, the first signaling may be MAC-CE signaling.

Information about to-be-activated N TCI states of the first CC represents information about a group of newly activated TCI states.

The first signaling may also be understood as the TCI deactivation command of the first CC. In other words, an original TCI state of the first CC is deactivated. In other words, for the original TCI state of the first CC, the first signaling may also be considered as a TCI deactivation command, that is, the original TCI state of the first CC is deactivated based on the first signaling.

That the first signaling can be used to activate the N TCI states of the first CC and the second CC may also be understood as that original TCI states of the second CC and the first CC are deactivated based on the first signaling. In other words, the first signaling may be used to deactivate the original TCI states of the first CC and the second CC. It may be understood that, based on the first signaling, the terminal device uses new beams and no longer uses old beams on the second CC and the first CC.

Optionally, that one or more previously activated TCI states of the second CC include all of the N TCI states may also be understood as that a set of TCI states activated based on the first signaling (that is, the set of TCI states includes the N TCI states) is a subset of a set of previously activated TCI states of the second CC, or may represent that a set of a group of newly activated TCI states is a subset of a set of previously activated TCI states of the second CC.

Optionally, that one or more previously activated TCI states of the second CC include some of the N TCI states may also be understood as that there is an intersection set between a set of TCI states activated based on the first signaling (that is, the set of TCI states includes the N TCI states) and a set of previously activated TCI states of the second CC, or may represent that there is an intersection set between a set of a group of newly activated TCI states and a set of previously activated TCI states of the second CC.

Optionally, the TCI deactivation command of the first CC does not take effect for the second CC, that is, the original TCI state of the second CC is not deactivated. Alternatively, it may be understood as that, in addition to the active TCI states indicated by the first signaling, the active TCI states of the second CC further include original previously activated TCI states. Alternatively, it may be understood that the TCI deactivation command of the first CC takes effect only for the first CC, and does not take effect for the second CC. Alternatively, it may be understood that the terminal device ignores the TCI deactivation command of the first CC.

Optionally, for that the second CC is associated with the first CC, refer to the method provided in any one of the first aspect to the third aspect.

It should be understood that one second CC is used as an example for description. This embodiment of this application is not limited thereto, and the first CC may be associated with one or more second CCs.

Based on the foregoing technical solution, when the TCI states of the plurality of CCs (namely, the one or more second CCs and the first CC) are updated by using a TCI activation command (namely, information about an active TCI state of the first CC) of one CC, whether the original TCI state of the second CC needs to be deactivated may be determined depending on whether the one or more previously activated TCI states of the second CC include some or all of the N TCI states, for example, whether a set of active TCI states of the first CC (for example, N TCI states) is a subset of a set of previously activated TCI states of the second CC, or whether there is an intersection set between a set of active TCI states of the first CC and a set of previously activated TCI states of the second CC. When the one or more previously activated TCI states of the second CC include some or all of the N TCI states, or when the set of active TCI states of the first CC is a subset of the set of previously activated TCI states of the second CC, or when there is an intersection set between the set of active TCI states of the first CC and the set of previously activated TCI states of the second CC, the original TCI state of the second CC is not deactivated. In this manner, when configurations of the TCI states are simultaneously updated for the plurality of CCs, impact of deactivation signaling on a TCI state of another CC is considered, and within a range of a capability of the terminal device, a relatively large quantity of active TCI states are included, to avoid an incorrect deactivation operation and ensure communication performance.

With reference to the fourth aspect, in some implementations of the fourth aspect, the method further includes: activating TCI states of the first CC and the second CC based on the first signaling, where active TCI states of the first CC and the second CC include the N TCI states.

TCI states of a plurality of CCs (for example, the first CC and the second CC) may be activated based on one piece of signaling. For details, refer to the method provided in any one of the first aspect to the third aspect.

With reference to the fourth aspect, in some implementations of the fourth aspect, when one or more previously activated TCI states of the second CC include some or all of the N TCI states, active TCI states of the second CC include the N TCI states and the previously activated TCI states of the second CC.

With reference to the fourth aspect, in some implementations of the fourth aspect, the first signaling is MAC-CE signaling, and a value of a reserved field R in the MAC-CE signaling is 1.

It may be understood that TCI states of a plurality of CCs or BWPs of a plurality of CCs may be activated or deactivated by using one piece of MAC-CE signaling. It should be understood that, if a set of a group of newly activated TCI states is a subset of the set of previously activated TCI states of the second CC, or there is an intersection set between a set of a group of newly activated TCI states and the set of previously activated TCI states of the second CC, a deactivation command of the MAC-CE does not take effect for the second CC.

Based on the foregoing technical solution, MAC-CE signaling whose value of R is 1 may be used to simultaneously update configurations of TCI states for a plurality of CCs.

With reference to the fourth aspect, in some implementations of the fourth aspect, information about the previously activated TCI states of the second CC is carried in second signaling, and a value of a reserved field R in the second signaling is 0.

Optionally, the second signaling is MAC-CE signaling. In other words, information about the set of previously activated TCI states of the second CC comes from MAC-CE signaling whose value of R is 0.

Based on the foregoing technical solution, it can be ensured that a quantity of active TCI states of the second CC is as large as possible, thereby ensuring communication performance.

According to a fifth aspect, a method for updating beam information is provided. The method may be performed by a terminal device, or may be performed by a chip, a chip system, or a circuit configured in a terminal device. This is not limited in this application.

The method may include:
receiving first signaling, where the first signaling includes information about to-be-activated N transmission configuration indicator (TCI) states of a first component carrier (CC), the first signaling can be used to activate the N TCI states of the first CC and a second CC, and the second CC is associated with the first CC, where N is an integer greater than or equal to 1.

When a union set of a set of previously activated TCI states of the second CC and a set of TCI states that includes the N TCI states is less than or equal to a capability of the terminal device, a TCI deactivation command of the first CC does not take effect for the second CC.

It may be understood that the first signaling can be used to activate TCI states of a plurality of CCs (for example, the first CC and the second CC), in other words, the TCI states of the plurality of CCs can be activated by using one piece of signaling.

Optionally, the first signaling may be MAC-CE signaling.

Information about to-be-activated N TCI states of the first CC represents information about a group of newly activated TCI states.

The first signaling may also be understood as the TCI deactivation command of the first CC. In other words, an original TCI state of the first CC is deactivated. In other words, for the original TCI state of the first CC, the first signaling may also be considered as a TCI deactivation command, that is, the original TCI state of the first CC is deactivated based on the first signaling.

That the first signaling can be used to activate the N TCI states of the first CC and the second CC may also be understood as that original TCI states of the second CC and the first CC are deactivated based on the first signaling. In other words, the first signaling may be used to deactivate the original TCI states of the first CC and the second CC. It may be understood that, based on the first signaling, the terminal device uses new beams and no longer uses old beams on the second CC and the first CC.

It may be understood that the set of TCI states that includes the N TCI states represents that the set of TCI states includes the N TCI states.

Optionally, the TCI deactivation command of the first CC does not take effect for the second CC, that is, the original TCI state of the second CC is not deactivated. Alternatively, it may be understood as that, in addition to the active TCI states indicated by the first signaling, the active TCI states of the second CC further include original previously activated TCI states. Alternatively, it may be understood that the TCI deactivation command of the first CC takes effect only for the first CC, and does not take effect for the second CC. Alternatively, it may be understood that the terminal device ignores the TCI deactivation command of the first CC.

Optionally, for that the second CC is associated with the first CC, refer to the method provided in any one of the first aspect to the third aspect.

It should be understood that one second CC is used as an example for description. This embodiment of this application is not limited thereto, and the first CC may be associated with one or more second CCs.

Based on the foregoing technical solution, when TCI states of a plurality of CCs (namely, the one or more second CCs and the first CC) are updated by using a TCI activation command of one CC (namely, information about an active TCI state of the first CC), whether to deactivate the original TCI state of the second CC may be determined by considering a quantity of TCI states that can be activated for the CC, for example, whether a union set of a set of active TCI states of the first CC (that is, the set of TCI states includes N TCI states) and the set of previously activated TCI states of the second CC is less than or equal to the capability of the terminal device. For example, when the union set of the set of active TCI states of the first CC and the set of previously activated TCI states of the second CC is less than or equal to the capability of the terminal device, the original TCI state of the second CC is not deactivated. In this manner, when configurations of the TCI states are simultaneously updated for the plurality of CCs, impact of deactivation signaling on a TCI state of another CC is considered, and within a range of the capability of the terminal device, a relatively large quantity of active TCI states are included, to avoid an incorrect deactivation operation and ensure communication performance.

With reference to the fifth aspect, in some implementations of the fifth aspect, the method further includes: activating TCI states of the first CC and the second CC based on the first signaling, where active TCI states of the first CC and the second CC include the N TCI states.

TCI states of a plurality of CCs (for example, the first CC and the second CC) may be activated based on one piece of signaling. For details, refer to the method provided in any one of the first aspect to the third aspect.

With reference to the fifth aspect, in some implementations of the fifth aspect, when the union set of the set of previously activated TCI states of the second CC and the set of TCI states that includes the N TCI states is less than or equal to the capability of the terminal device, active TCI states of the second CC include the N TCI states and the previously activated TCI states of the second CC.

With reference to the fifth aspect, in some implementations of the fifth aspect, the first signaling is MAC-CE signaling, and a value of a reserved field R in the MAC-CE signaling is 1.

With reference to the fifth aspect, in some implementations of the fifth aspect, information about the previously activated TCI states of the second CC is carried in second signaling, and a value of a reserved field R in the second signaling is 0.

Optionally, the second signaling is MAC-CE signaling. In other words, information about the set of previously activated TCI states of the second CC comes from MAC-CE signaling whose value of R is 0.

According to a sixth aspect, a method for updating beam information is provided. The method may be performed by a terminal device, or may be performed by a chip, a chip system, or a circuit configured in a terminal device. This is not limited in this application.

The method may include:

receiving medium access control-control element (MAC-CE) signaling, where the MAC-CE signaling includes beam update information of a first component carrier (CC), where when a transmission mode is single-transmission-point transmission, a reserved field in the MAC-CE signaling can be used to indicate whether to update beam information of one or more second CCs and beam information of the first CC based on the beam update information of the first CC; or when a transmission mode is multi-transmission-point transmission, a reserved field in the MAC-CE signaling can be used to indicate a transmission reception point corresponding to the MAC-CE signaling.

For example, the transmission reception point corresponding to the MAC-CE signaling, namely, a transmission reception point for which the MAC-CE signaling is used, is used to represent that, for the transmission reception point, the MAC-CE signaling is used for one or more of the following functions: activating a TCI-state, deactivating a TCI-state, indicating a mapping relationship between an active TCI-state and a TCI field value in DCI, or the like.

TCI states of a plurality of CCs (for example, the first CC and the second CC) may be activated based on one piece of signaling. For details, refer to the method provided in any one of the first aspect to the third aspect.

Based on the foregoing technical solution, the terminal device may determine a function of the MAC-CE signaling based on an indication of a network device about the multi-transmission-point mode. For example, in the case of multi-transmission-point transmission, the MAC-CE is applicable to a function of notifying an active TCI-state and a mapping relationship of each transmission reception point. Alternatively, it may be understood as that, in the case of multi-transmission reception point transmission, the MAC-CE is not applicable to a function of notifying to simultaneously perform updating for the first CC and the second CC. For another example, in the case of single-transmission-point transmission, the MAC-CE is applicable to notifying whether to update the beam information of one or more second CCs and the beam information of the first CC based on the beam update information of the first CC.

With reference to the sixth aspect, in some implementations of the sixth aspect, the method further includes:

receiving higher layer signaling, where the higher layer signaling includes a CORESETPoolIndex; and when a quantity of values of the CORESETPoolIndex is greater than 1, determining that the transmission mode is the multi-transmission-point transmission; or when a quantity of values of the CORESETPoolIndex is less than or equal to 1, determining that the transmission mode is the single-transmission-point transmission.

According to a seventh aspect, a method for updating beam information is provided. The method may be performed by a network device, or may be performed by a chip, a chip system, or a circuit configured in a network device. This is not limited in this application.

The method may include:

sending medium access control-control element (MAC-CE) signaling, where the MAC-CE signaling includes beam update information of a first component carrier (CC), where when a transmission mode is single-transmission-point transmission, a reserved field in the MAC-CE signaling can be used to indicate whether to update beam information of one or more second CCs and beam information of the first CC based on the beam update information of the first CC; or when a transmission mode is multi-transmission-point transmission, a reserved field in the MAC-CE signaling can be used to indicate a transmission reception point corresponding to the MAC-CE signaling.

With reference to the seventh aspect, in some implementations of the seventh aspect, the method further includes:

sending higher layer signaling, where the higher layer signaling includes a CORESETPoolIndex, where when a transmission mode is multi-transmission-point transmission, a quantity of values of the CORESETPoolIndex configured in the higher layer signaling is greater than 1; or when a transmission mode is single-transmission-point transmission, a quantity of values of the CORESETPoolIndex configured in the higher layer signaling is less than or equal to 1.

According to an eighth aspect, a method for updating beam information is provided. The method may be performed by a terminal device, or may be performed by a chip, a chip system, or a circuit configured in a terminal device. This is not limited in this application.

The method may include:

receiving medium access control-control element (MAC-CE) signaling, where the MAC-CE signaling includes beam update information of a first component carrier (CC);

determining, based on a reserved field in the MAC-CE signaling, whether to update beam information of one or more second CCs and beam information of the first CC based on the beam update information of the first CC; or determining, based on a reserved field in the MAC-CE signaling, that the MAC-CE signaling is used to notify a mapping relationship of a first mode or a mapping relationship of a second mode, where the mapping relationship of the first mode represents that two or more transmission configuration indicator (TCI) state identifiers TCI-state IDs can be mapped to a same TCI field value in downlink control information (DCI), and the mapping relationship of the second mode represents that two or more TCI-state IDs cannot be mapped to a same TCI field value in DCI.

TCI states of a plurality of CCs (for example, the first CC and the second CC) may be activated based on one piece of signaling. For details, refer to the method provided in any one of the first aspect to the third aspect.

Based on the foregoing technical solution, whether the MAC-CE signaling is used for the mapping relationship of the first mode or the mapping relationship of the second mode may be distinguished based on a reserved bit in the MAC-CE signaling. Alternatively, whether the MAC-CE signaling is applicable to a single CC or may be simultaneously used for a plurality of CCs (for example, the first CC and the second CC) may be distinguished based on a reserved bit in the MAC-CE signaling. Therefore, not only the reserved bit in the MAC-CE signaling can be flexibly used, but also signaling overheads can be reduced.

With reference to the eighth aspect, in some implementations of the eighth aspect, in the case of determining, based on a reserved field in the MAC-CE signaling, whether to update beam information of one or more second CCs and beam information of the first CC based on the beam update information of the first CC, the method further includes:

receiving higher layer signaling, where the higher layer signaling includes a CORESETPoolIndex; and determining, based on a quantity of values of the CORESETPoolIndex, that the MAC-CE signaling is used to notify a mapping relationship of a first mode or a mapping relationship of a second mode.

Based on the foregoing technical solution, whether the MAC-CE signaling is used for the mapping relationship of the first mode or the mapping relationship of the second mode and whether the MAC-CE signaling is applicable to a single CC or may be simultaneously used for a plurality of CCs (for example, the first CC and the second CC) may be distinguished by relying on the quantity of values of the CORESETPoolIndex and the reserved bit in the MAC-CE signaling. For example, whether the MAC-CE signaling is used for the mapping relationship of the first mode or the mapping relationship of the second mode may be distinguished based on the quantity of values of the CORESETPoolIndex, and whether the MAC-CE signaling is applicable to a single CC or may be simultaneously used for a plurality of CCs may be determined based on the reserved bit in the MAC-CE signaling.

With reference to the eighth aspect, in some implementations of the eighth aspect, in the case of determining, based on a reserved field in the MAC-CE signaling, that the MAC-CE signaling is used to notify a mapping relationship of a first mode or a mapping relationship of a second mode, the method further includes:

receiving higher layer signaling, where the higher layer signaling includes a CORESETPoolIndex; and determining, based on a quantity of values of the CORESETPoolIndex, whether to update beam information of one or more second CCs and beam information of the first CC based on the beam update information of the first CC.

Based on the foregoing technical solution, whether the MAC-CE signaling is used for the mapping relationship of the first mode or the mapping relationship of the second mode and whether the MAC-CE signaling is applicable to a single CC or may be simultaneously used for a plurality of CCs (for example, the first CC and the second CC) may be distinguished by relying on the quantity of values of the CORESETPoolIndex and the reserved bit in the MAC-CE signaling. For example, whether the MAC-CE signaling is used for the mapping relationship of the first mode or the mapping relationship of the second mode may be distinguished based on the reserved bit in the MAC-CE signaling, and whether the MAC-CE signaling is applicable to a single CC or may be simultaneously used for a plurality of CCs may be determined based on the quantity of values of the CORESETPoolIndex.

According to a ninth aspect, a method for updating beam information is provided. The method may be performed by a network device, or may be performed by a chip, a chip system, or a circuit configured in a network device. This is not limited in this application.

The method may include:

sending medium access control-control element (MAC-CE) signaling, where the MAC-CE signaling includes beam update information of a first component carrier (CC), where a reserved field in the MAC-CE signaling can be used to indicate that the MAC-CE signaling is used to notify a mapping relationship of a first mode or a mapping relationship of a second mode; or a reserved field in the MAC-CE signaling can be used to indicate whether to update beam information of one or more second CCs and beam information of the first CC based on the beam update information of the first CC, where the mapping relationship of the first mode represents that two or more transmission configuration indicator (TCI) state identifiers TCI-state IDs can be mapped to a same TCI field value in downlink control information (DCI), and the mapping relationship of the second mode represents that two or more TCI-state IDs cannot be mapped to a same TCI field value in DCI.

TCI states of a plurality of CCs (for example, the first CC and the second CC) may be activated based on one piece of signaling. For details, refer to the method provided in any one of the first aspect to the third aspect.

With reference to the ninth aspect, in some implementations of the ninth aspect, the reserved field in the MAC-CE signaling can be used to indicate whether to update the beam information of the one or more second CCs and the beam information of the first CC based on the beam update information of the first CC, and the method further includes:

sending higher layer signaling, where the higher layer signaling includes a CORESETPoolIndex, where a quantity of values of the CORESETPoolIndex is used to determine that the MAC-CE signaling is used to notify the mapping relationship of the first mode or the mapping relationship of the second mode.

With reference to the ninth aspect, in some implementations of the ninth aspect, the reserved field in the MAC-CE signaling can be used to indicate that the MAC-CE signaling is used to notify the mapping relationship of the first mode or the mapping relationship of the second mode, and the method further includes:

sending higher layer signaling, where the higher layer signaling includes a CORESETPoolIndex, where a quantity of values of the CORESETPoolIndex is used to determine whether to update the beam information of the one or more second CCs and the beam information of the first CC based on the beam update information of the first CC.

According to a tenth aspect, a communications apparatus is provided. The communications apparatus is configured to perform the method provided in the first aspect, the third aspect, the fourth aspect, the fifth aspect, the sixth aspect, or the eighth aspect. Specifically, the communications apparatus may include a module configured to perform the method provided in the first aspect, the third aspect, the fourth aspect, the fifth aspect, the sixth aspect, or the eighth aspect.

According to an eleventh aspect, a communications apparatus is provided. The communications apparatus is configured to perform the method provided in the second aspect, the seventh aspect, or the ninth aspect. Specifically, the communications apparatus may include a module configured to perform the method provided in the second aspect.

According to a twelfth aspect, a communications apparatus is provided, and includes a processor. The processor is coupled to a memory, and may be configured to execute instructions in the memory, to implement the method in any one of the first aspect, the third aspect, the fourth aspect, the fifth aspect, the sixth aspect, or the eighth aspect and the possible implementations of the first aspect, the third aspect, the fourth aspect, the fifth aspect, the sixth aspect, or the eighth aspect. Optionally, the communications apparatus further includes the memory. Optionally, the communications apparatus further includes a communications interface, the processor is coupled to the communications interface, and the communications interface is configured to input and/or output information. The information includes at least one of instructions and data.

In an implementation, the communications apparatus is a terminal device. When the communications apparatus is a terminal device, the communications interface may be a transceiver or an input/output interface.

In another implementation, the communications apparatus is a chip or a chip system. When the communications apparatus is a chip or a chip system, the communications interface may be an input/output interface, an interface circuit, an output circuit, an input circuit, a pin, a related circuit, or the like on the chip or the chip system. The processor may alternatively be embodied as a processing circuit or a logic circuit.

In another implementation, the communications apparatus is a chip or a chip system configured in a terminal device.

Optionally, the transceiver may be a transceiver circuit. Optionally, the input/output interface may be an input/output circuit.

According to a thirteenth aspect, a communications apparatus is provided, and includes a processor. The processor is coupled to a memory, and may be configured to execute instructions in the memory, to implement the method according to any one of the second aspect, the seventh aspect, or the ninth aspect and the possible implementations of the second aspect, the seventh aspect, or the ninth aspect. Optionally, the communications apparatus further includes the memory. Optionally, the communications apparatus further includes a communications interface, the processor is coupled to the communications interface, and the communications interface is configured to input and/or output information. The information includes at least one of instructions and data.

In an implementation, the communications apparatus is a network device. When the communications apparatus is a network device, the communications interface may be a transceiver or an input/output interface.

In another implementation, the communications apparatus is a chip or a chip system. When the communications apparatus is a chip or a chip system, the communications interface may be an input/output interface, an interface circuit, an output circuit, an input circuit, a pin, a related circuit, or the like on the chip or the chip system. The processor may alternatively be embodied as a processing circuit or a logic circuit.

In another implementation, the communications apparatus is a chip or a chip system configured in a network device.

Optionally, the transceiver may be a transceiver circuit. Optionally, the input/output interface may be an input/output circuit.

According to a fourteenth aspect, a communications apparatus is provided. The communications apparatus includes a processor, and the processor is coupled to a memory. When the processor executes a computer program or instructions in the memory, the method in any one of the first aspect, the third aspect, the fourth aspect, the fifth aspect, the sixth aspect, or the eighth aspect and the possible implementations of the first aspect, the third aspect, the fourth aspect, the fifth aspect, the sixth aspect, or the eighth aspect is performed.

According to a fifteenth aspect, a communications apparatus is provided. The communications apparatus includes a processor, and the processor is coupled to a memory. When the processor executes a computer program or instructions in the memory, the method in any one of the second aspect, the seventh aspect, or the ninth aspect and the possible implementations of the second aspect, the seventh aspect, or the ninth aspect is performed.

According to a sixteenth aspect, a communications apparatus is provided. The communications apparatus includes a processor and an interface, and the processor is coupled to a memory through the interface. When the processor executes a computer program or instructions in the memory, the method in any one of the first aspect, the third aspect, the fourth aspect, the fifth aspect, the sixth aspect, or the eighth aspect and the possible implementations of the first aspect, the third aspect, the fourth aspect, the fifth aspect, the sixth aspect, or the eighth aspect is performed.

According to a seventeenth aspect, a communications apparatus is provided. The communications apparatus includes a processor and an interface, and the processor is coupled to a memory through the interface. When the processor executes a computer program or instructions in the memory, the method in any one of the second aspect, the seventh aspect, or the ninth aspect and the possible implementations of the second aspect, the seventh aspect, or the ninth aspect is performed.

According to an eighteenth aspect, a chip is provided, and includes a processor and an interface, configured to: invoke, from a memory, a computer program stored in the memory and run the computer program, to perform the method in any one of the first aspect, the third aspect, the fourth aspect, the fifth aspect, the sixth aspect, or the eighth aspect and the possible implementations of the first aspect, the third aspect, the fourth aspect, the fifth aspect, the sixth aspect, or the eighth aspect.

According to a nineteenth aspect, a chip is provided, and includes a processor and an interface, configured to: invoke, from a memory, a computer program stored in the memory and run the computer program, to perform the method in any one of the second aspect, the seventh aspect, or the ninth aspect and the possible implementations of the second aspect, the seventh aspect, or the ninth aspect.

According to a twentieth aspect, a computer-readable storage medium is provided. The computer-readable storage medium stores a computer program. When the computer program is executed by a communications apparatus, the communications apparatus is enabled to implement the method in any one of the first aspect, the third aspect, the fourth aspect, the fifth aspect, the sixth aspect, or the eighth aspect and the possible implementations of the first aspect, the third aspect, the fourth aspect, the fifth aspect, the sixth aspect, or the eighth aspect.

According to a twenty-first aspect, a computer-readable storage medium is provided. The computer-readable storage medium stores a computer program. When the computer program is executed by a communications apparatus, the communications apparatus is enabled to implement the method in any one of the second aspect, the seventh aspect, or the ninth aspect and the possible implementations of the second aspect, the seventh aspect, or the ninth aspect.

According to a twenty-second aspect, a computer program product including instructions is provided. When the instructions are executed by a computer, a communications apparatus is enabled to implement the method provided in the first aspect, the third aspect, the fourth aspect, the fifth aspect, the sixth aspect, or the eighth aspect.

According to a twenty-third aspect, a computer program product including instructions is provided. When the instructions are executed by a computer, a communications apparatus is enabled to implement the method provided in the second aspect, the seventh aspect, or the ninth aspect.

According to a twenty-fourth aspect, a communications system is provided, and includes the foregoing network device and terminal device.

DESCRIPTION OF EMBODIMENTS

The following describes the technical solutions in this application with reference to the accompanying drawings.

Embodiments of this application may be used in a beam-based communications system, for example, a 5th generation (5G) system, a new radio (NR) system, a long term evolution (LTE) system, an LTE frequency division duplex (FDD) system, an LTE time division duplex (TDD) system, a universal mobile telecommunications system (UMTS), or another evolved communications system.

A communications system in which the embodiments of this application are used may include one or more network devices and one or more terminal devices. One network device may transmit data or control signaling to one or more terminal devices. Alternatively, a plurality of network devices may simultaneously transmit data or control signaling to one terminal device.

Figure 1:
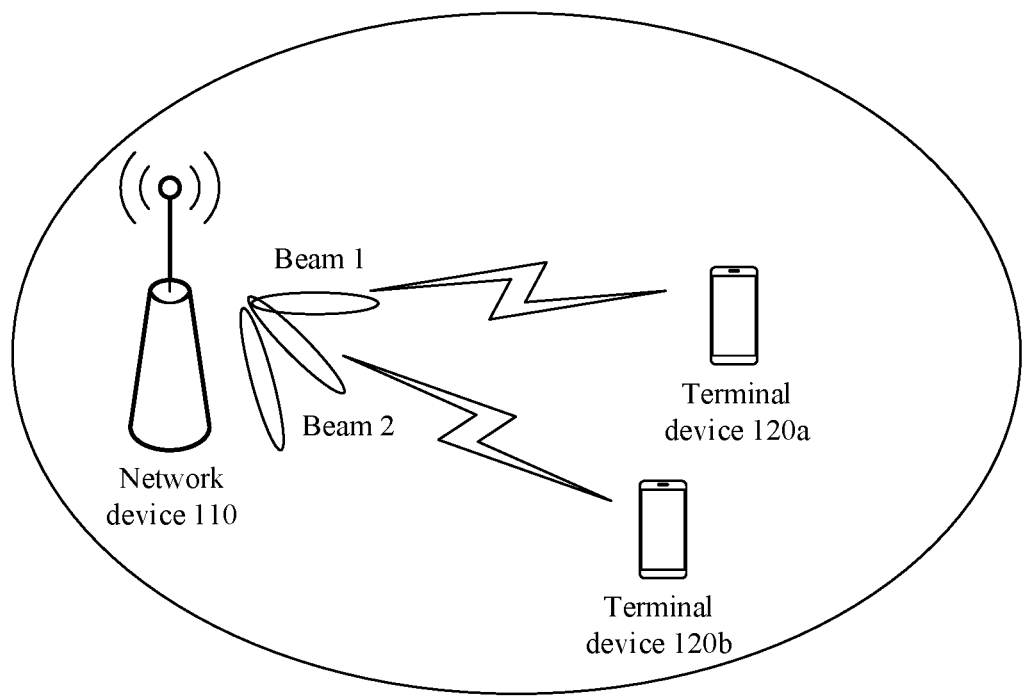
FIG. 1 and FIG. 2 are schematic diagrams of a communications system in which an embodiment of this application is used.

By way of example and not limitation, FIG. 1 is a schematic diagram of a communications system 100 in which an embodiment of this application is used.

The communications system 100 includes one network device 110 or a plurality of terminal devices 120 (for example, a terminal device 120*a* and a terminal device 120*b* shown in FIG. 1). The network device 110 may simultaneously send a plurality of analog beams on a plurality of radio frequency channels, to transmit data for a plurality of terminal devices. As shown in FIG. 1, the network device simultaneously sends a beam 1 and a beam 2, where the beam 1 is used to transmit data for the terminal device 120*a*, and the beam 2 is used to transmit data for the terminal device 120*b*. The beam 1 may be referred to as a serving beam of the terminal device 120*a*, and the beam 2 may be referred to as a serving beam of the terminal device 120*b*. The terminal device 120*a* and the terminal device 120*b* may belong to a same cell.

Figure 2:
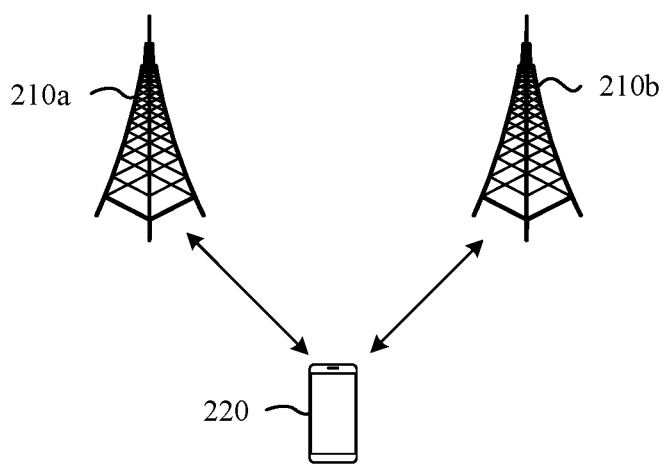

FIG. 2 is another schematic diagram of a communications system 200 applicable to an embodiment of this application.

As shown in FIG. 2, the communications system 200 may include at least two network devices, for example, network devices 210 shown in FIG. 2 (a network device 210*a* and a network device 210*b* shown in FIG. 2). The communications system 200 may further include at least one terminal device, for example, a terminal device 220 shown in FIG. 2. The terminal device 220 may establish radio links with the network device 210*a* and the network device 210*b* by using a dual connectivity (DC) technology or a multi-connectivity technology. The network device 210*a* may be, for example, a primary base station, and the network device 210*b* may be, for example, a secondary base station. In this case, the network device 210*a* is a network device initially accessed by the terminal device 220, and is responsible for radio resource control (RRC) communication with the terminal device 220. The network device 210*b* may be added during RRC reconfiguration, and is configured to provide an additional radio resource.

The terminal device in the embodiments of this application may also be referred to as user equipment (UE), a mobile station (MS), a mobile terminal (MT), an access terminal, a subscriber unit, a subscriber station, a mobile station, a remote station, a remote terminal, a mobile device, a user terminal, a terminal, a wireless communications device, a user agent, a user apparatus, or the like.

The terminal device is a device that provides a user with voice/data connectivity, for example, a handheld device or a vehicle-mounted device having a wireless connection function. Currently, examples of some terminals are: a mobile phone (mobile phone), a tablet computer, a notebook computer, a palmtop computer, a mobile internet device (MID), a wearable device, a virtual reality (VR) device, an augmented reality (AR) device, a wireless terminal in industrial control (industrial control), a wireless terminal in self driving (self driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), a cellular phone, a cordless phone, a session initiation protocol (SIP) phone, a wireless local loop (WLL) station, a personal digital assistant (PDA), a handheld device with a wireless communication function, a computing device, or another processing device connected to a wireless modem, a vehicle-mounted device, a terminal device in a 5G network, a terminal device in a future evolved public land mobile network (PLMN), and the like. This is not limited in the embodiments of this application.

By way of example and not limitation, in the embodiments of this application, the terminal device may alternatively be a wearable device. The wearable device may also be referred to as a wearable intelligent device, and is a general term for wearable devices, such as glasses, gloves, watches, clothes, and shoes that are developed by applying wearable technologies in intelligent designs of daily wear. The wearable device is a portable device that can be directly worn by a user or integrated into clothes or an accessory of a user. The wearable device is not only a hardware device, but is used to implement powerful functions through software support, data exchange, and cloud interaction. Generalized wearable intelligent devices include full-featured and large-size devices that can implement complete or partial functions without depending on smartphones, such as smart watches or smart glasses, and devices that focus on only one type of application and need to work with other devices such as smartphones, such as various smart bands or smart jewelry for monitoring physical signs In addition, the terminal device in the embodiments of this application may alternatively be a terminal device in an internet of things (IoT) system. IoT is an important part of future development of information technologies. A main technical feature of the IoT is connecting a thing to a network by using a communications technology, to implement an intelligent network for interconnection between a person and a machine or between one thing and another.

In addition, the network device in the embodiments of this application may be a device configured to communicate with a terminal device. The network device may also be referred to as an access network device or a radio access network device, and may be a transmission reception point (TRP), or may be an evolved NodeB (eNB or eNodeB) in an LTE system, or may be a home base station (for example, a home evolved NodeB, or a home NodeB, HNB) or a baseband unit (BBU), or may be a radio controller in a cloud radio access network (CRAN) scenario. Alternatively, the network device may be a relay station, an access point, a vehicle-mounted device, a wearable device, a network device in the 5G network, a network device in the future evolved PLMN network, or the like, or may be an access point (AP) in a WLAN, or may be a gNB in a new radio (NR) system. This is not limited in the embodiments of this application.

In a network structure, a network device may include a centralized unit (CU) node, or a distributed unit (DU) node, or a RAN device including a CU node and a DU node, or a RAN device including a control plane CU node (CU-CP node), a user plane CU node (CU-UP node), and a DU node.

The network device provides a service for a cell. The terminal device communicates with the cell on a transmission resource (for example, a frequency domain resource or a spectrum resource) allocated by the network device. The cell may belong to a macro base station (for example, a macro eNB or a macro gNB), or may belong to a base station corresponding to a small cell (small cell). The small cells herein may include: a metro cell (metro cell), a micro cell (micro cell), a pico cell (pico cell), a femto cell (femto cell), and the like. These small cells have features of small coverage and low transmit power, and are applicable to providing a high-rate data transmission service.

For ease of understanding of the embodiments of this application, the following first describes some terms used in the embodiments of this application.

1. Beam

The beam in an NR protocol may be embodied as a spatial domain filter (spatial domain filter) that is also referred to as a spatial filter (spatial filter) or a spatial parameter (spatial parameter). A beam used to send a signal may be referred to as a transmission beam (transmission beam, Tx beam), or may be referred to as a spatial domain transmission filter (spatial domain transmission filter) or a spatial domain transmission parameter (spatial domain transmission parameter). A beam used to receive a signal may be referred to as a reception beam (reception beam, Rx beam), or may be referred to as a spatial domain receive filter (spatial domain receive filter) or a spatial reception parameter (spatial Rx parameter).

The transmission beam may refer to distribution of signal strength formed in different directions in space after a signal is transmitted by using an antenna, and the reception beam may refer to distribution of signal strength that is of a radio signal received from an antenna and that is in different directions in space.

In addition, the beam may be a wide beam, a narrow beam, or a beam of another type. A technology for forming the beam may be a beamforming technology or another technology. The beamforming technology may be specifically a digital beamforming technology, an analog beamforming technology, a hybrid digital/analog beamforming technology, or the like A beam generally corresponds to a resource. For example, when performing beam measurement, a network device may send signals on different resources by using different beams, and a terminal device receives signals on different resources by using different beams. In addition, the terminal device may feed back quality of signals measured on different resources to the network device. In this way, the network device knows quality of a corresponding beam. During data transmission, beam information is also indicated by using a resource corresponding to the beam information. For example, the network device indicates information about a physical downlink shared channel (PDSCH) beam of the terminal device by using a transmission configuration indicator (TCI) resource in downlink control information (DCI).

Optionally, a plurality of beams whose communication features are the same or similar may be considered as one beam.

One beam corresponds to one or more antenna ports, and is used to transmit a data channel, a control channel, a sounding signal, and the like. The one or more antenna ports corresponding to one beam may also be considered as one antenna port set.

In beam measurement, each beam of the network device corresponds to one resource. Therefore, an identifier (or referred to as an index) of a resource may be used to uniquely identify a beam corresponding to the resource.

2. Resource

In beam measurement, an identifier of a resource may be used to uniquely identify a beam corresponding to the resource.

The resource may be an uplink signal resource, or may be a downlink signal resource.

An uplink signal includes but is not limited to an uplink random access sequence, a sounding reference signal (SRS), a demodulation reference signal (DMRS) (for example, an uplink control channel demodulation reference signal or an uplink data channel demodulation reference signal), and an uplink phase noise tracking signal.

A downlink signal includes but is not limited to: a channel state information reference signal (CSI-RS), a cell-specific reference signal (CS-RS), a UE specific reference signal (US-RS), a demodulation reference signal (DMRS) (for example, a downlink control channel demodulation reference signal or a downlink data channel demodulation reference signal), a downlink phase noise tracking signal, and a synchronization signal/physical broadcast channel block (SS/PBCH block). The SS/PBCH block may be referred to as a synchronization signal block (SSB).

The resource may be configured by using radio resource control (RRC) signaling.

In a configuration structure, one resource is one data structure, including a related parameter of an uplink/downlink signal corresponding to the resource, for example, a type of the uplink/downlink signal, a resource element that carries the uplink/downlink signal, a sending time and a sending periodicity of the uplink/downlink signal, and a quantity of ports used to send the uplink/downlink signal.

A resource of each uplink/downlink signal has a unique identifier, and the resource of the uplink/downlink signal is identified by using the identifier. It may be understood that the identifier of the resource may also be referred to as an index of the resource. This is not limited in the embodiments of this application.

In addition, a beam management resource may be a resource used for beam management, or may be embodied as a resource used to calculate and measure beam quality. The beam quality may include, for example, but is not limited to: layer 1 reference signal received power (L1-RSRP), layer 1 reference signal received quality (L1-RSRQ), and a layer 1 signal to interference plus noise ratio (L1-SINR). For example, the beam management resource may include a synchronization signal, a broadcast channel, a downlink channel measurement reference signal, a tracking signal, a downlink control channel demodulation reference signal, a downlink shared channel demodulation reference signal, an uplink sounding reference signal, an uplink random access signal, and the like.

3. Quasi-Co-Location (QCL)

The quasi-co-location (QCL) is also referred to as quasi-colocation. Signals corresponding to antenna ports that have a QCL relationship have a same parameter, or a parameter of one antenna port may be used to determine a parameter of another antenna port that has a QCL relationship with the antenna port, or two antenna ports have a same parameter, or a parameter difference between two antenna ports is less than a threshold. The parameter may include one or more of the following: delay spread (delay spread), Doppler spread (Doppler spread), Doppler shift (Doppler shift), an average delay (average delay), an average gain, and a spatial reception parameter (spatial Rx parameter). The spatial reception parameter may include one or more of the following: an angle of arrival (AOA), an average AOA, AOA spread, an angle of departure (AOD), an average angle of departure (AOD), AOD spread, a receive antenna spatial correlation parameter, a transmit antenna spatial correlation parameter, a transmission beam, a reception beam, and a resource identifier.

The foregoing angles may be decomposition values at different dimensions or a combination of decomposition values at different dimensions. The antenna ports are antenna ports having different antenna port numbers, antenna ports that have a same antenna port number and that are used to send or receive information at different times, on different frequencies, and/or on different code domain resources, and/or antenna ports that have different antenna port numbers and that are used to send or receive information at different times, on different frequencies, and/or on different code domain resources. The resource identifier may include: a CSI-RS resource identifier, an SRS resource identifier, an SSB resource identifier, a resource identifier of a preamble sequence transmitted on a physical random access channel (PRACH), or a resource identifier of a demodulation reference signal (DMRS), used to indicate a beam that is on a resource.

In the NR protocol, the QCL relationship may be classified into the following four types based on different parameters:

type A (type A): the Doppler shift, the Doppler spread, the average delay, and the delay spread;

type B (type B): the Doppler shift and the Doppler spread;

type C (type C): the Doppler shift and the average delay; and type D (type D): the spatial reception parameter.

The QCL in the embodiments of this application is QCL of the type D. Unless otherwise specified in the following, the QCL may be understood as the QCL of the type D, namely, QCL defined based on the spatial reception parameter.

When the QCL relationship is a QCL relationship of the type D, the QCL relationship may be considered as spatial QCL. When the antenna ports satisfy the spatial QCL relationship, a QCL relationship between a port for a downlink signal and a port for a downlink signal or between a port for an uplink signal and a port for an uplink signal may be that the two signals have a same AOA or AOD, and is used to represent that the two signals have a same reception beam or transmission beam. For another example, a QCL relationship between a downlink signal and an uplink signal or between a port for an uplink signal and a port for a downlink signal may be that there is a correspondence between AOAs and AODs of the two signals, or that there is a correspondence between AODs and AOAs of the two signals. To be specific, beam reciprocity may be used to determine an uplink transmission beam based on a downlink reception beam or determine a downlink reception beam based on an uplink transmission beam.

From a perspective of the transmit end, if two antenna ports are spatial QCLed, it may mean that corresponding beam directions of the two antenna ports are consistent in space. From a perspective of the receive side, if two antenna ports are spatial QCLed, it may mean that the receive side can receive, in a same beam direction, signals sent by using the two antenna ports.

Signals transmitted on ports having a spatial QCL relationship may further have corresponding beams. The corresponding beam includes at least one of the following: a same reception beam, a same transmission beam, a transmission beam corresponding to a reception beam (corresponding to a reciprocity scenario), or a reception beam corresponding to a transmission beam (corresponding to a reciprocity scenario).

Signals transmitted on ports having a spatial QCL relationship may alternatively be understood as signals received or sent by using a same spatial filter (spatial filter). The spatial filter may be at least one of the following: precoding, a weight of an antenna port, a phase deflection of the antenna port, and an amplitude gain of the antenna port.

Signals transmitted on ports having a spatial QCL relationship may alternatively be understood as having corresponding beam pair links (BPL). The corresponding BPL includes at least one of the following: a same downlink BPL, a same uplink BPL, an uplink BPL corresponding to a downlink BPL, or a downlink BPL corresponding to an uplink BPL.

Therefore, the spatial reception parameter (namely, the QCL of the type D) may be understood as a parameter used to indicate direction information of a reception beam.

4. Spatial Relationship (SR)

The spatial relationship may also be referred to as an uplink transmission configuration indicator (UL TCI). The spatial relationship may be used to determine a transmission beam of an uplink signal. The spatial relationship may be determined through beam training. A reference signal used for beam training may be, for example, an uplink reference signal such as an SRS, or may be a downlink reference signal such as an SSB or a CSI-RS.

In a communication process, the terminal device may determine a transmission beam based on a spatial relationship indicated by the network device, and the network device may determine a reception beam based on the same spatial relationship.

Optionally, the spatial relationship may further include a related parameter of uplink transmit power control, including one or more of the following: a path loss estimation reference signal (PathlossReferenceRS), a reference power, a compensation coefficient (Alpha), an open-loop or closed-loop power control indication, a closed-loop power control index (closedLoopIndex), or the like.

The SR is configured by the network device for terminal devices. The following is a format of the SR.

```
SpatialRelationInfo ::= SEQUENCE {
    SpatialRelationInfoId        SpatialRelationInfoId,
    servingCellId                ServCellIndex
    referenceSignal              CHOICE {
        ssb-Index                SSB-Index,
        csi-RS-Index             NZP-CSI-RS-ResourceId,
        srs                      SEQUENCE {
            resource                 SRS-ResourceId,
            uplinkBWP                BWP-Id
        }
    },
    PathlossReferenceRS-Id       PathlossReferenceRS-Id,
    p0-Id?                       P0-Id,
    closedLoopIndex              ENUMERATED { i0, i1 }
}
```

5. TCI State (TCI-State)

The TCI-state may be used to indicate a QCL relationship between two reference signals. Each TCI-state may include a serving cell index (ServeCellIndex), a bandwidth part (BWP) identifier (ID), and a reference signal resource identifier. The reference signal resource identifier may be, for example, at least one of the following: a non-zero power (NZP) CSI-RS reference signal resource identifier (NZP-CSI-RS-ResourceId), a non-zero power CSI-RS reference signal resource set identifier (NZP-CSI-RS-ResourceSetId), or an SSB index (SSB-Index).

Information about a transmission beam (namely, a transmission beam of a network device or a reception beam of a terminal device) may be indicated by using a TCI-state. Each TCI-state includes one index (tci-StateId) of the TCI-state and two pieces of QCL information (QCL information, QCL-Info). Each QCL-Info may include one reference signal resource (referenceSignal), representing that a resource in the TCI-state and a reference signal resource included in the QCL-Info form a QCL relationship. For example, if one TCI-state is configured for a resource 1, and a resource included in QCL-Info included in the TCI-state is a resource 2, it represents that the resource 1 and the resource 2 are QCLed.

TCI-states are configured by the network device for terminal devices. The following is a format of the TCI-state.

```
TCI-State ::=        SEQUENCE {
    tci-StateId      TCI-StateId,
    qcl-Type1        QCI-Info,
    qcl-Type2        QCI-Info
```

```
...
}
QCI-Info ::=         SEQUENCE {
    cell                 ServCellIndex
    bwp-Id               BWP-Id,
    referenceSignal      CHOICE{
    csi-rs               NZP-CSI-RS-ResourceSetId
    ssb                  SSB-Index
    }
    qcl-Type             ENUMERATED{typeA,TypeB,TypeC,TypeD},
...
}
```

In a subsequent communication process, the terminal device may determine a reception beam based on a TCI-state indicated by the network device, and the network device may determine a transmission beam based on the same TCI-state.

In addition, a TCI-state may be globally configured. In TCI-states configured for different cells (cell) and different BWPs, if indexes of the TCI-states are the same, configurations of the corresponding TCI-states are also the same.

The cell is described by a higher layer from a perspective of resource management, mobility management, or a service unit. Coverage of each network device may be divided into one or more serving cells, and the serving cell may be considered to include a frequency domain resource.

In the embodiments of this application, a component carrier (component carrier, CC, or referred to as a carrier, or the like) may be replaced with a serving cell, a cell, a transmission reception point, or a physical cell. The "cell", "serving cell", "transmission reception point", and "CC" may be used alternately, and meanings to be expressed by them are the same when differences are not emphasized. Similarly, an "index of the serving cell", an "identifier (ID) of the serving cell", a "cell identifier (cell ID)", a "physical cell identity (Physical Cell Identity)", a "transmission reception point identifier (or transmission reception point index)", and a "CC identifier (CC ID)" are used alternately, and meanings to be expressed by them are the same when differences are not emphasized.

6. TCI

The TCI may be used to indicate a TCI-state. In an implementation, a network device may configure a TCI-state list (list) for a terminal device by using higher layer signaling (for example, a radio resource control (RRC) message). For example, the network device may configure the TCI-state list for the terminal device by using a tci-StatesToAddModList (tci-StatesToAddModList) in the RRC message. The TCI-state list may include a plurality of TCI-states. For example, the network device may configure a maximum of 64 TCI-states for each BWP in each cell.

Then, the network device may activate one or more TCI-states by using higher layer signaling (for example, a medium access control-control element (MAC-CE)). An activated TCI-state is a subset of the TCI-state list configured by using the RRC message. For example, the network device may activate a maximum of eight TCI-states for each BWP in each cell.

Then, the network device may further indicate a selected TCI-state by using a TCI field in physical layer signaling (for example, downlink control information (DCI)). The DCI may be, for example, DCI applicable to scheduling a physical downlink resource.

Configuration information of one TCI-state may include one or two reference signal resource identifiers and a QCL type associated with the reference signal resource identifier. When a QCL relationship is configured to be of one of the type A, the type B, or the type C, the terminal device may demodulate a physical downlink control channel (PDCCH) or a physical downlink shared channel (PDSCH) based on an indication of a TCI-state. When a QCL relationship is configured to be of the type D, the terminal device may learn of a transmission beam used by the network device to send a signal, and may further determine, based on the beam pairing relationship determined through the channel measurement described above, a reception beam used to receive a signal. The terminal device may determine, based on a TCI field in DCI on the PDCCH, the reception beam for receiving the PDSCH.

7. Control Resource Set (CORESET)

The CORESET is a resource set used to transmit downlink control information, and may also be referred to as a control resource area or a physical downlink control channel resource set. Each CORESET may be a set of a group of resource element groups (REG). The REG is a basic unit used by downlink control signaling to allocate a physical resource, and is used to define mapping from the downlink control signaling to an RE. For example, one REG may include four consecutive resource elements (RE) of a non-reference signal (RS) in frequency domain. It should be understood that the REG is merely a unit used for resource allocation, and shall not constitute any limitation on this application. This application does not exclude that a new resource allocation unit is defined in a future protocol to implement a same or similar function.

For a network device, a CORESET may be understood as a set of resources that may be used to send a PDCCH. For a terminal device, a resource corresponding to a PDCCH search space of each terminal device belongs to the CORESET. In other words, the network device may determine, in the CORESET, the resource used to send the PDCCH, and the terminal device may determine the PDCCH search space based on the CORESET.

The CORESET may include a time-frequency resource. For example, in frequency domain, the time-frequency resource may be a bandwidth segment, or one or more sub-bands. In time domain, the time-frequency resource may be one or more symbols. In time-frequency domain, a control resource set may be consecutive or inconsecutive resource units, for example, consecutive resource blocks (RB) or inconsecutive RBs.

In addition, the CORESET may further include a TCI-state. The CORESET may include a plurality of TCI-states, and an active TCI-state may be one of the plurality of TCI-states. In other words, the resource used to transmit the PDCCH may specifically use one of the plurality of TCI-states, and a specific TCI-state to be used is specified by the network device. For example, the network device sends a MAC-CE to the terminal device, where the MAC-CE carries an index of one TCI-state, and the index of the TCI-state is used to indicate that a PDCCH corresponding to the CORESET uses the TCI-state. In addition, the network device may also modify the TCI-state of the PDCCH by using the MAC-CE. The network device may configure one or more CORESETs for the terminal device, to transmit different types of PDCCHs.

The CORESET may be configured, for example, by using a ControlResourceSet information element (control resource set information element) in a higher-layer parameter. The higher-layer parameter may include, for example, an identifier (ID) of the CORESET, a frequency domain resource, and a quantity of symbols included in duration (duration). A specific parameter used to configure the CORESET is not limited in this application.

8. Beam Indication

For each physical channel or physical signal, a network device may perform a beam indication for a terminal device by using different signaling, to direct the terminal device how to receive a downlink physical channel or physical signal, and to direct the terminal device how to send an uplink physical channel or physical signal.

An example in which beam indication information represents indicating a beam used for transmission is used. The beam indication information may include but is not limited to one or more of the following: a beam number, a beam management resource number, a resource number of an uplink signal, a resource number of a downlink signal, an absolute index of a beam, a relative index of a beam, a logical index of a beam, an index of an antenna port corresponding to a beam, an index of an antenna port group corresponding to a beam, an index of a downlink signal corresponding to a beam, a time index of a downlink synchronization signal block corresponding to a beam, beam pair link (BPL) information, a transmission parameter (Tx parameter) corresponding to a beam, a reception parameter (Rx parameter) corresponding to a beam, a transmit weight corresponding to a beam, a weight matrix corresponding to a beam, a weight vector corresponding to a beam, a receive weight corresponding to a beam, an index of a transmit weight corresponding to a beam, an index of a weight matrix corresponding to a beam, an index of a weight vector corresponding to a beam, an index of a receive weight corresponding to a beam, a receive codebook corresponding to a beam, a transmit codebook corresponding to a beam, an index of a receive codebook corresponding to a beam, an index of a transmit codebook corresponding to a beam, or the like. The network device may further allocate a QCL identifier to beams that have a QCL relationship and that are in beams associated with a frequency resource group. The beam indication information may also be embodied as TCI, and the TCI may include a plurality of parameters, for example, a cell ID, a BWP ID, a reference signal identifier, a synchronization signal block identifier, and a QCL type.

The network device may perform a beam indication for the terminal device by using signaling, for example, higher layer signaling (such as RRC and a MAC-CE) or physical layer signaling (such as DCI).

A PDSCH is used as an example. The network device may perform a beam indication of the PDSCH by using a three-level signaling structure of RRC signaling, MAC-CE signaling, and DCI signaling.

The network device may configure a TCI-state for the terminal device by using higher layer signaling (for example, RRC signaling). For example, the network device may configure a maximum of 128 TCI-states by using RRC signaling. Then, the network device may activate one or more TCI-states by using higher layer signaling (for example, MAC-CE signaling), for example, may activate a maximum of eight TCI-states. An activated TCI-state is a subset in the TCI-states configured by using the RRC signaling. Then, the network device may further indicate a selected TCI-state by using a TCI field in physical layer signaling (for example, DCI), and the selected TCI-state is used for current PDSCH transmission. The DCI may be, for example, DCI applicable to scheduling a physical downlink resource (for example, a PDSCH).

9. Beam Configuration Related to a CC or a BWP

Each carrier in multi-carrier aggregation may be referred to as a "CC". The terminal device may receive data on a plurality of CCs. Each carrier includes one or more physical resource blocks (PRB), and each carrier may have a corresponding PDCCH, to schedule a PDSCH of a respective CC.

It should be understood that, in the embodiments of this application, a reference signal of a CC or sending a reference signal on a CC is mentioned for a plurality of times, and unless otherwise specified, this represents that the reference signal occupies a frequency domain resource of the CC.

It should be understood that, in the embodiments of this application, in some scenarios, a CC may be replaced with a BWP, or a CC may be replaced with a CC and a BWP, or a CC may be replaced with a CC or a BWP. Similarly, in the embodiments of this application, in some scenarios, a CC ID may be replaced with a BWP ID, or a CC ID may be replaced with a CC ID and a BWP ID, or a CC ID may be replaced with a CC ID or a BWP ID.

In NR, different terminal devices in a same cell may have different transmitting or receiving capabilities. Therefore, a system may configure a corresponding bandwidth for each terminal device. The bandwidth configured for the terminal device is referred to as a BWP, and the terminal device performs transmission in the BWP of the terminal device. The BWP may be a group of consecutive frequency domain resources on a carrier, for example, a physical resource block (PRB). Frequency domain resources that may be occupied by different BWPs may partially overlap (overlap), or may not overlap each other. The different BWPs may occupy frequency domain resources in a same bandwidth or different bandwidths. This is not limited in this application. A minimum granularity of the BWP in frequency domain may be one PRB.

In a scenario of a single carrier, one terminal device may have only one active BWP at a same moment, and the terminal device receives data/a reference signal or send data/a reference signal only in the active BWP. The terminal device may be configured to work on a plurality of CCs, and each CC may have a working (or active) BWP at a same moment. To ensure normal working of each CC or BWP, for each BWP of each CC, a related beam configuration is performed, and beam-related signaling is sent.

A PDSCH is used as an example. A network device configures a TCI-state of each BWP of each CC for the terminal device by using RRC signaling, and the network device activates the TCI-state for each BWP of each CC of the terminal device by using MAC-CE signaling.

Figure 3:
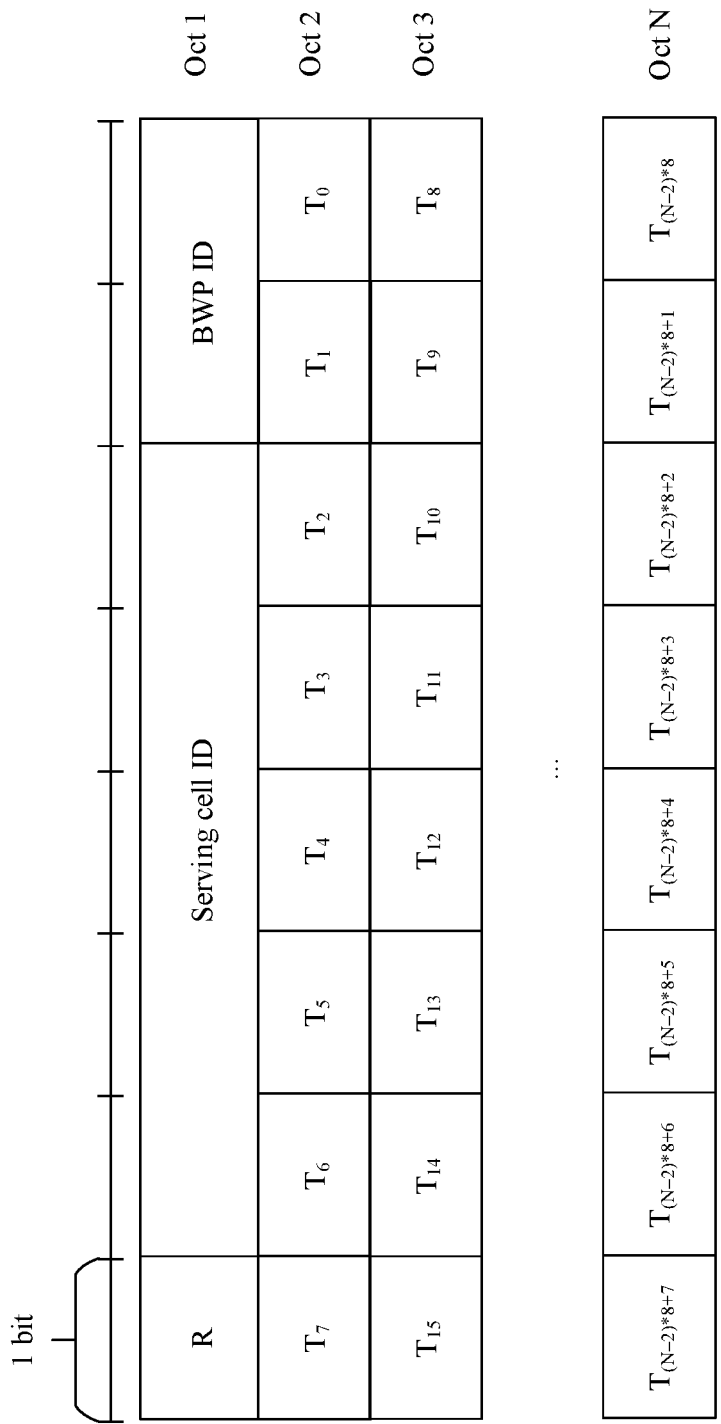
FIG. 3 and FIG. 4 are schematic diagrams of a format of a MAC-CE applicable to an embodiment of this application.

FIG. 3 is a schematic diagram of a format of a MAC-CE applicable to an embodiment of this application. As shown in FIG. 3, an octet (Oct) in FIG. 3 represents one byte (byte) of 8 bits (bits). The MAC-CE may be used to configure a TCI-state for a PDSCH in an indicated serving cell. Specifically, the MAC-CE includes an identifier (ID) of the serving cell (serving cell), an ID of a BWP, and indication bits used to indicate whether TCI-states are activated. Ti in the MAC-CE is used to indicate whether the TCI states are activated. Each Ti may occupy one bit, and i may correspond to an $i^{th}$ TCI-state in a TCI-state list configured by using a tci-StatesToAddModList in an RRC message. For example, i is equal to a value of a TCI-state ID (TCI-StateId). An activated TCI state indicated by the MAC CE may be understood as a TCI-state configured for a serving cell and a BWP that are indicated by the MAC CE. In other words, when the PDSCH is transmitted in the BWP in the serving cell, a transmission beam and a reception beam may be determined based on information indicated by the TCI-state.

In this embodiment of this application, a network device may indicate an active TCI-state of a first CC to a terminal device by using the MAC-CE format shown in FIG. 3.

Figure 4:
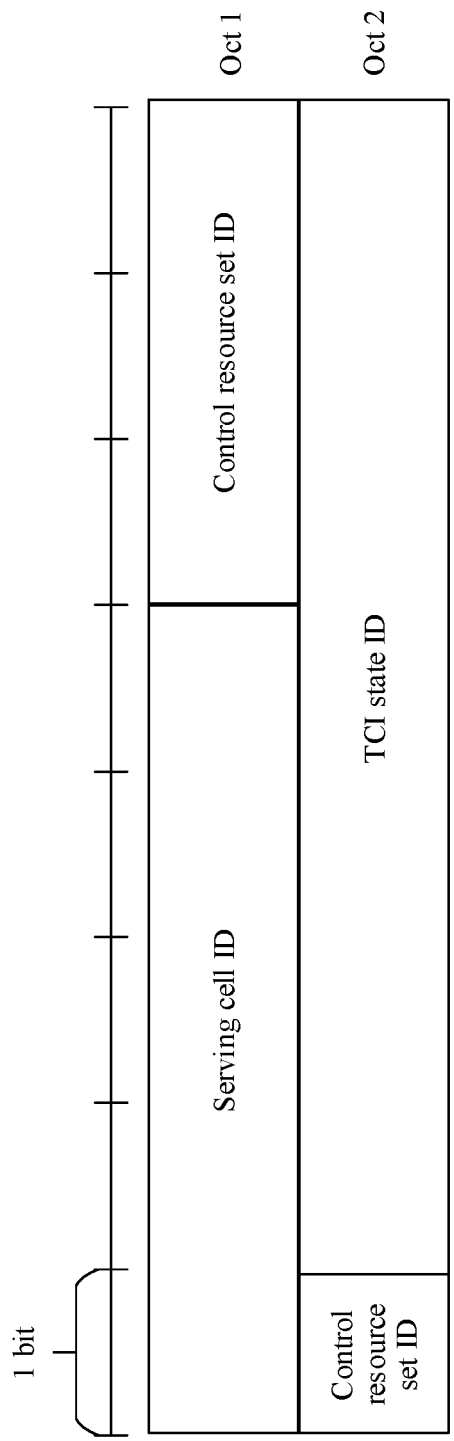

FIG. 4 is a schematic diagram of a format of a MAC-CE applicable to an embodiment of this application. As shown in FIG. 4, the MAC-CE may be used to configure a TCI-state for a PDCCH in an indicated serving cell. Specifically, the MAC-CE includes an identifier (ID) of a serving cell (serving cell), an ID of a CORESET, and an ID of an active TCI-state. An activated TCI state indicated by the MAC CE may be understood as a TCI-state configured for a serving cell and a BWP that are indicated by the MAC CE. In other words, when the PDCCH is transmitted in the BWP in the serving cell, a transmission beam and a reception beam may be determined based on information indicated by the TCI-state.

A PDCCH is used as an example. A network device configures a TCI-state of a CORESET of each BWP of each CC for a terminal device by using RRC signaling, and the network device indicates, for each CORESET of each BWP of each CC of the terminal device by using MAC-CE signaling, one TCI-state used for transmission of a target CORESET. It should be noted that a number of a CORESET is unique in a CC.

In a communication process, for example, in high-frequency communication, different CCs may use a same analog beam, or may use different analog beams. To reduce beam management overheads, in an actually deployed high-frequency communications system, a beam management reference signal is usually configured only for one CC or a few CCs, and beam management results of these CCs, including beam indications, may be used for another CC. In this case, beam configurations of all the CCs should be the same, and when a beam of one CC changes, beams of all the other CCs should change.

In one manner, to notify such a beam change case, same signaling needs to be sent on all the CCs, for example, RRC signaling (where for example, only identifiers (ID) of the CCs are different) and MAC-CE signaling (where for example, only IDs of the CCs are different). This notification method incurs huge signaling overheads.

In view of this, an embodiment of this application provides a method for updating beam information, to reduce signaling overheads of a beam indication.

In this embodiment of this application, a network device may indicate an active TCI-state of a first CC to a terminal device by using the MAC-CE format shown in FIG. 4. There are at least the following two cases.

In one possible case, TCI-states of all control resource sets of all serving cells are updated.

In the other possible case, TCI-states of control resource sets, of all serving cells, with a same control resource set ID are updated.

The following describes in detail the embodiments provided in this application with reference to the accompanying drawings.

Figure 5:
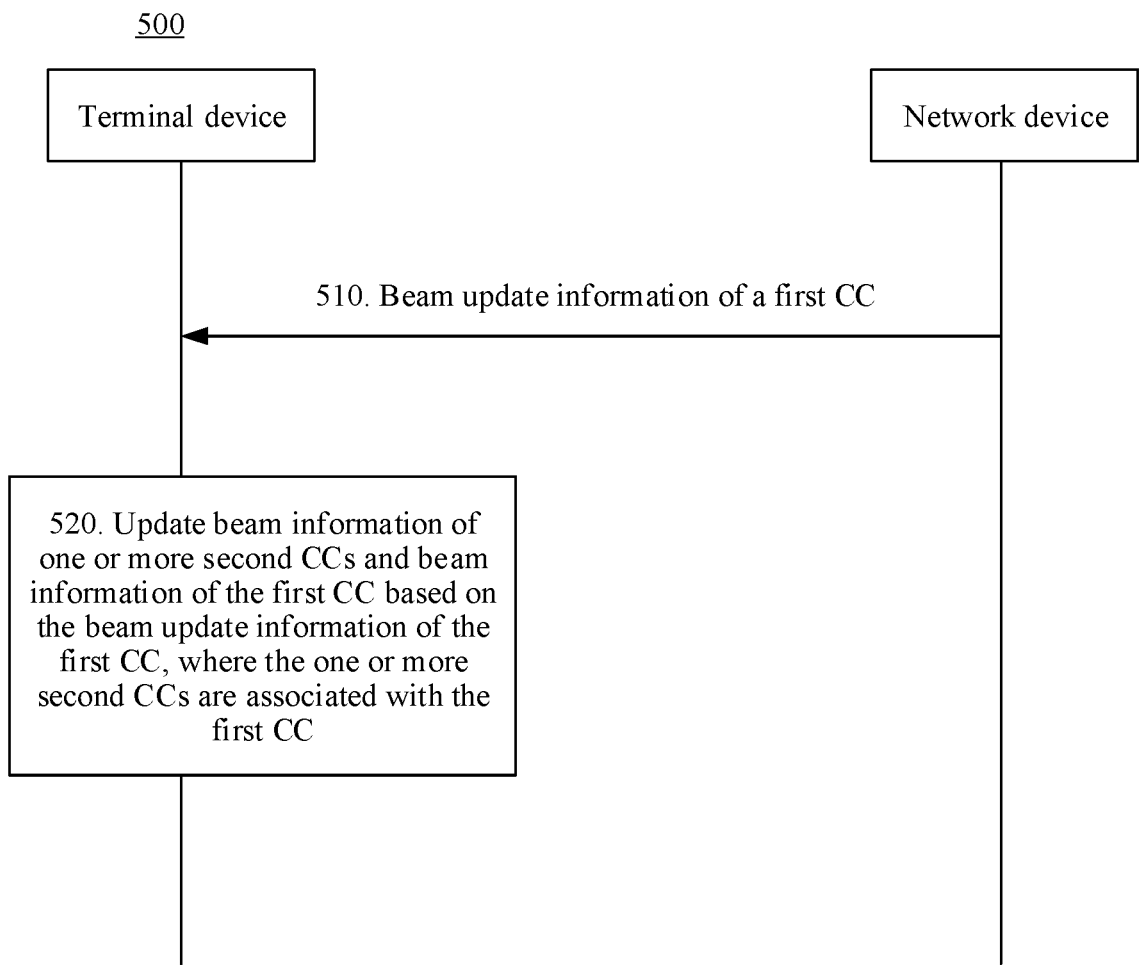
FIG. 5 is a schematic interaction diagram of a method for updating beam information according to an embodiment of this application.

FIG. 5 is a schematic interaction diagram of a method 500 for updating beam information according to an embodiment of this application. The method 500 may include the following steps.

510. A network device sends beam update information of a first CC to a terminal device, and accordingly, the terminal device receives the beam update information of the first CC.

It may be understood that the network device sends the beam update information of the first CC to the terminal device, to update beam information of the first CC.

It should be understood that the first CC is merely a name, and does not limit the protection scope of the embodiments of this application. For example, the first CC may represent any one or more CCs. For another example, the first CC may represent a CC used for beam management or beam training. The first CC represents the CC used for beam management or beam training. Specifically, for example, the first CC represents a CC that sends a beam management reference signal (such as an SSB, a CSI-RS, or an SRS).

For ease of understanding, in the following embodiment, an example in which the first CC is one CC is used for description.

Optionally, for example, beam information of a CC may be embodied as information about a reception beam of the CC, namely, a reception beam used in a communication process, or a reception beam used when the terminal device receives a signal or data on a frequency domain resource of the CC. Alternatively, for example, beam information of a CC may be embodied as information about a transmission beam of the CC, namely, a transmission beam used in a communication process, or a transmission beam used when the terminal device sends a signal or data on a frequency domain resource of the CC. For ease of understanding, first, a reception beam of a CC is mainly used as an example for description.

For example, beam information of the CC may be embodied as a TCI. The TCI may be a TCI used for a PDCCH (namely, a PDCCH transmitted on a frequency domain resource of the CC). Alternatively, the TCI may be a TCI used for a PDSCH (namely, a PDSCH transmitted on a frequency domain resource of the CC). Alternatively, the TCI may be a TCI applicable to a reference signal (namely, a reference signal, such as a CSI-RS, transmitted on a frequency domain resource of the CC). The TCI may include a plurality of parameters, for example, a cell ID, a BWP ID, a reference signal identifier, a synchronization signal block identifier, and a QCL type. The beam information of the CC may be replaced with information about a TCI of the CC, or may be replaced with information about one TCI-state of the CC.

For example, the beam information of the CC may include a TCI of a PDSCH.

Descriptions are provided with reference to FIG. 3. The network device sends a MAC-CE to the terminal device, where Ti in the MAC CE is used to indicate whether TCI-states are activated. A value of Ti may be 1 or 0. 1 may represent that a TCI-state is selected to be activated, and 0 may represent that a TCI-state is not selected to be activated.

The network device sends the beam update information of the first CC to the terminal device, to update the beam information of the first CC. For example, the network device may send a MAC-CE to the terminal device, to indicate a specific active TCI-state of the PDSCH. In other words, when the PDSCH is transmitted in the BWP in the first CC, a transmission beam and a reception beam may be determined based on information indicated by the TCI-state.

For example, the beam information of the CC may include a TCI of a PDCCH.

Descriptions are provided with reference to FIG. 4. The network device sends a MAC-CE to the terminal device, where the MAC-CE includes an ID of a serving cell, an ID of a CORESET, and an ID of an active TCI-state. An activated TCI state indicated by the MAC CE may be understood as a TCI-state configured for a serving cell and a BWP that are indicated by the MAC CE. In other words, when the PDCCH is transmitted in the BWP in the serving cell, a transmission beam and a reception beam may be determined based on information indicated by the TCI-state.

The network device sends the beam update information of the first CC to the terminal device, to update the beam information of the first CC. For example, the network device may send a MAC-CE to the terminal device, to indicate a specific active TCI-state of the PDCCH. In other words, when the PDCCH is transmitted in the BWP in the first CC, a transmission beam and a reception beam may be determined based on information indicated by the TCI-state.

The following provides descriptions with reference to two cases.

Case 1: The beam update information of the first CC includes information about an active TCI-state of the first CC.

In other words, the network device sends the beam update information of the first CC to the terminal device, to activate one or more TCI-states for the first CC.

For ease of understanding, an example in which one TCI-state is activated is used below for description.

As shown in FIG. 3, the network device sends the beam update information of the first CC to the terminal device, to update the beam information of the first CC. For example, the network device may send a MAC-CE to the terminal device, to indicate an active TCI-state of a PDSCH transmitted on the first CC.

Optionally, the updating the beam information of the first CC may include: activating one TCI-state for the first CC. In other words, in this embodiment of this application, updating beam information of a CC may be replaced with activating one TCI-state for the CC.

Optionally, the beam update information of the first CC may be carried in MAC-CE signaling.

For example, the network device selects (or activates) one TCI-state for the first CC by using MAC-CE signaling.

For example, the network device updates the active TCI-state of the first CC from a TCI-state #1 to a TCI-state #2 by using MAC-CE signaling.

For example, first CC, BWP #1 (namely, current active BWP), active TCI-state #1::{qcl-TypeD: CSI-RS #1}→active TCI-state #2::{qcl-TypeD: CSI-RS #2}.

It should be understood that the foregoing descriptions are merely examples, and this embodiment of this application is not limited thereto. For example, only content of the qcl-TypeD is considered in the foregoing, and content of a qcl-TypeA, a qcl-TypeB, and a qcl-TypeC is not limited herein.

It should be further understood that, in this embodiment of this application, if an ID of a CC does not exist in a related configuration of the qcl-TypeD, it indicates that a corresponding reference signal is sent on a frequency domain resource of the CC. For example, in the foregoing example, for the first CC, there is no ID of the CC in a related configuration of the qcl-TypeD. Therefore, the CSI-RS #1 is sent on a frequency domain resource of the CC, that is, sent on the frequency domain resource of the first CC.

A manner of activating a TCI-state has been described in the foregoing term explanation, and details are not described herein again.

Case 2: The beam update information of the first CC includes information about a reference signal resource corresponding to a TCI-state of the first CC.

In other words, the network device sends the beam update information of the first CC to the terminal device, to update a reference signal resource of a qcl-TypeD of one TCI-state of the first CC.

For example, the beam update information of the first CC includes information about a reference signal resource corresponding to the active TCI-state of the first CC.

Optionally, the updating the beam information of the first CC may include: updating a reference signal resource of a qcl-TypeD of one TCI-state of the first CC. For example, a reference signal resource type may be updated, or a reference signal resource identifier may be updated.

Optionally, the updating the beam information of the first CC may further include: updating an uplink spatial relationship of the first CC.

Optionally, the beam update information of the first CC may be carried in RRC signaling.

For example, the network device updates a reference signal resource ID of a qcl-TypeD of one TCI-state of the first CC by using RRC signaling.

For example, first CC, BWP #1, TCI LIST, TCI-state #1::{qcl-TypeD:CSI-RS #1}→TCI-state #1::{qcl-TypeD: CSI-RS #2}

It should be understood that the foregoing descriptions are merely examples, and this embodiment of this application is not limited thereto.

520. The terminal device updates beam information of one or more second CCs and the beam information of the first CC based on the beam update information of the first CC, where the one or more second CCs are associated with the first CC.

Optionally, in this embodiment of this application, a value of a reserved field R in the MAC-CE signaling may be used to indicate the terminal device whether to update the beam information of the one or more second CCs and the beam information of the first CC based on the beam update information of the first CC. For example, a reserved field in the MAC-CE signaling may be used to indicate whether the MAC-CE signaling may be used to simultaneously activate TCI states for a plurality of CCs.

For example, when a value of a reserved field R in the MAC-CE signaling is 1, the terminal device updates the beam information of the one or more second CCs and the beam information of the first CC based on the beam update information of the first CC. For example, the MAC-CE signaling may be used to simultaneously activate TCI states for a plurality of CCs. When the value of the reserved field R in the MAC-CE signaling is 0, the terminal device updates only the beam information of the first CC based on the beam update information of the first CC. For example, the MAC-CE signaling does not allow to be used to simultaneously activate TCI states for a plurality of CCs.

Optionally, that the one or more second CCs are associated with the first CC includes: The one or more second CCs and the first CC use a same beam configuration. Alternatively, that the one or more second CCs are associated with the first CC may include: The beam information of the one or more second CCs is associated with the beam information of the first CC. For example, a reference signal resource ID of a qcl-TypeD of one TCI-state of one or more second CCs is associated with a reference signal resource ID of a qcl-TypeD of one TCI-state of the first CC and an ID of the first CC.

Optionally, this embodiment of this application may be applicable to a terminal device that simultaneously supports one active beam. In other words, when the terminal device supports one active beam at a same moment, the beam information of the one or more second CCs and the beam information of the first CC may be updated based on the beam update information of the first CC.

For example, an active beam may represent an active transmission beam. A person skilled in the art may understand a meaning of the active beam, and the active beam is used to represent indicating a transmission beam, or represent a transmission beam indication, or may represent a spatial relationship indication. In other words, the active beam indicates a transmission beam used in a communication process. That the terminal device supports one active beam at a same moment may be represented as that the terminal device uses a same transmission beam on the one or more second CCs and the first CC at the same moment.

For example, an active beam may further represent an active reception beam. A person skilled in the art may understand a meaning of the active beam, and the active beam is used to represent indicating a reception beam, or represent a reception beam indication, or may represent a QCL indication. In other words, the active beam indicates a reception beam used in a communication process. That the terminal device supports one active beam at a same moment may be represented as that the terminal device uses a same reception beam on the one or more second CCs and the first CC at the same moment.

The following uses one active beam as an example for description.

Optionally, the terminal device may report, by using a UE capability, that a maximum quantity of active TCIs and/or a maximum quantity of active spatial relationships are/is 1. Further, optionally, the TCI and the spatial relationship may correspond to a same beam, namely, a transmission beam corresponding to a same reception beam, or a reception beam corresponding to a same transmission beam.

After receiving the beam update information of the first CC, the terminal device not only updates the beam information of the first CC, but also may update the beam information of the one or more second CCs that are associated with the first CC (for example, use a same beam configuration as that used by the first CC). It may be understood that the network device no longer needs to send the beam update information of the one or more second CCs, so that signaling overheads can be reduced, and signaling overheads and a delay of a beam indication are reduced.

It should be understood that the first CC and the second CC are only names for differentiation, and do not constitute any limitation on the protection scope of the embodiments of this application. That the one or more second CCs are associated with the first CC is used to represent that there may be one or more CCs associated with the first CC, or in other words, there may be a plurality of CCs associated with each other. This is not limited in the embodiments of this application.

Optionally, the one or more second CCs and the first CC may be a plurality of CCs in one cell group (cell group). Alternatively, the one or more second CCs and the first CC may be a plurality of CCs in a band (band). Alternatively, the one or more second CCs and the first CC may be a plurality of CCs in a band group (a band group or a band combination). This is not limited.

The second CC is associated with the first CC (for example, the second CC and the first CC use a same beam configuration). For example, the first CC performs beam training and the second CC uses a beam training result of the first CC, and in this case, the second CC is associated with the first CC (for example, the second CC and the first CC use a same beam configuration).

The following uses a specific example for description.

It is assumed that the terminal device supports eight high-frequency CCs, and the eight high-frequency CCs are denoted as a CC #0, a CC #1, a CC #2, a CC #3, a CC #4, a CC #5, a CC #6, and a CC #7 for differentiation. It is assumed that the first CC is a CC #0, and the second CC includes seven CCs, to be specific, a CC #1, a CC #2, a CC #3, a CC #4, a CC #5, a CC #6, and a CC #7. The CC #0 performs beam training, and the CC #1, CC #2, CC #3, CC #4, CC #5, CC #6, and CC #7 use a beam training result of the CC #0.

An RRC configuration includes:

cell group configuration (cell group configuration, Cell-GroupConfig)→ . . . →serving cell configuration (serving cell configuration, ServingCellConfig)→* . . . →* BWP→* . . . →*PDSCH-Config . . . →*tci-StatesToAddModList/tci-StatesToReleaseList.

The tci-StatesToAddModList/tci-StatesToReleaseList may be jointly used to determine TCIs finally configured for the CC/BWP. A possible format of the tci-StatesToAddModList/tci-StatesToReleaseList is as follows:

| tci-StatesToAddModList States)) OF TCI-State | SEQUENCE (SIZE(1..maxNrofTCI- |
|---|---|
| tci-StatesToReleaseList States)) OF TCI-StateId | SEQUENCE (SIZE(1..maxNrofTCI- |

It should be understood that in the foregoing RRC configuration, " . . . " in the middle represents that there may be another configuration in the middle. This is not limited.

It should be further understood that, the foregoing mainly lists a related configuration (PDSCH-Config) related to a data channel. For a TCI-state list of a PDCCH/CORESET, a possible format is as follows:

| tci-StatesPDCCH-ToAddList StatesPDCCH)) OF TCI-StateId | SEQUENCE(SIZE (1..maxNrofTCI- |
|---|---|
| tci-StatesPDCCH-ToReleaseList StatesPDCCH)) OF TCI-StateId | SEQUENCE(SIZE (1..maxNrofTCI- |

It can also be seen from the above that elements in the TCI-state list of the PDCCH/CORESET include only IDs of TCI-states, and elements in a TCI-state list of the PDSCH include specific configurations of TCI-states.

If a TCI-state is configured for each CC, the same TCI-state may be repeatedly configured for each BWP of each CC, that is, the CC #1, CC #2, CC #3, CC #4, CC #5, CC #6, CC #7, and CC #0 use a same configuration. For example:

CC #0, BWP #1, TCI LIST, TCI-state #1::{qcl-TypeD: CSI-RS #1}

CC #1, BWP #1, TCI LIST, TCI-state #1::{qcl-TypeD: CSI-RS #1 of CC #0}

CC #2, BWP #1, TCI LIST, TCI-state #1::{qcl-TypeD: CSI-RS #1 of CC #0}

CC #3, BWP #1, TCI LIST, TCI-state #1::{qcl-TypeD: CSI-RS #1 of CC #0}

CC #4, BWP #1, TCI LIST, TCI-state #1::{qcl-TypeD: CSI-RS #1 of CC #0}

CC #5, BWP #1, TCI LIST, TCI-state #1::{qcl-TypeD: CSI-RS #1 of CC #0}

CC #6, BWP #1, TCI LIST, TCI-state #1::{qcl-TypeD: CSI-RS #1 of CC #0}

CC #7, BWP #1, TCI LIST, TCI-state #1::{qcl-TypeD: CSI-RS #1 of CC #0}

It should be understood that TCI LIST may represent PDSCH-Config . . . →tci-StatesToAddModList in the foregoing RRC configuration.

It can be learned from the foregoing that, in the CC #1, CC #2, CC #3, CC #4, CC #5, CC #6, and CC #7, reference signal resources of qcl-TypeDs are all the CSI-RS #1 of the CC #0. Alternatively, it may be understood that the same qcl-TypeD is configured for the CC #1, CC #2, CC #3, CC #4, CC #5, CC #6, CC #7, and CC #0.

It can be seen that, when the reference signal resource of the qcl-TypeD of the TCI-state #1 of the CC #0 is updated, the reference signal resources of the qcl-TypeDs of the TCI-state #1s of the CC #1, CC #2, CC #3, CC #4, CC #5, CC #6, and CC #7 are also updated.

That the second CC is associated with the first CC or that the second CC and the first CC use a same beam configuration may represent that the second CC and the first CC use a same beam; or may represent that in the beam configuration of the second CC and the beam configuration of the first CC, all information except IDs of the CCs is the same; or may represent that an active TCI-state of the second CC is the same as an active TCI-state of the first CC; or may represent that a reference signal resource identifier included in an active TCI-state of the second CC is associated with the ID of the first CC and a reference signal resource identifier included in an active TCI-state of the first CC; or may represent that a same qcl-TypeD is configured for the second CC and the first CC; or may represent that the one or more second CCs have a QCL relationship with the first CC.

It should be understood that, configuring a same qcl-TypeD or qcl-TypeDs of active TCI-states being the same may represent that related configurations of the qcl-TypeDs are the same, and reference signal resources in the qcl-TypeDs are the same (where for example, reference signal identifiers are the same, and resource types are the same). A same qcl-TypeD is configured in the following description.

Optionally, a beam configuration for the second CC and the first CC may include the following two possible manners.

Manner 1: The network device performs a beam configuration for both the second CC and the first CC.

For example, the network device separately configures a TCI-state list with a qcl-TypeD for the first CC and the second CC. A same TCI-state is configured for the first CC and the second CC, in other words, an active TCI-state configured for the first CC by the network device is the same as an active TCI-state configured for the second CC by the network device.

Manner 2: The network device performs a beam configuration only for the first CC.

For example, the network device configures a TCI-state list with a qcl-TypeD only for the first CC, and sends beam configuration information and indication information of the first CC to the terminal device. The indication information is used to indicate that the second CC is associated with the first CC.

That the second CC is associated with the first CC means that, the second CC and the first CC use a same beam configuration, in other words, the second CC uses (or replicates) a beam configuration of the first CC.

It should be understood that in the manner 2, that the network device performs a beam configuration only for the first CC is relative to the second CC (namely, another CC that is associated with the first CC (for example, uses a same beam configuration as that used by the first CC)). In other words, for the first CC and the second CC, the network device performs a beam configuration for the first CC, and does not perform a beam configuration for the second CC.

The foregoing two manners are described in detail below with reference to embodiments shown in FIG. 6 and FIG. 7.

The second CC is associated with (for example, uses a same beam configuration as that used by) the first CC. It may be understood that when a beam of the first CC is updated, a beam of the second CC is also updated, to maintain association (or use a same beam configuration).

The following provides detailed descriptions with reference to the foregoing two cases.

Case 1: The beam update information of the first CC includes information about an active TCI-state of the first CC.

After receiving the information about the active TCI-state of the first CC, the terminal device not only updates the active TCI-state of the first CC, but also automatically updates the active TCI-state of the second CC. After the updating, the active TCI-state of the first CC is the same as the active TCI-state of the second CC.

In other words, the terminal device receives the information about the active TCI-state of the first CC, and automatically activates the TCI-state of the second CC, so that the active TCI-state of the first CC is the same as the active TCI-state of the second CC. A reference signal resource of a qcl-TypeD configured for the second CC is the same as that of a qcl-TypeD configured for the first CC.

Alternatively, it may be understood that one piece of MAC-CE signaling can be used to activate TCI-states of a plurality of CCs. TCI-states of a plurality of CCs are activated by using the MAC-CE signaling, and accordingly, original TCI-states of the plurality of CCs are deactivated. For example, an original TCI-state of the second CC is deactivated. It may be understood that on the second CC, the terminal device uses a new beam and no longer uses an old beam. In other words, the MAC-CE signaling can be used to activate TCI-states of a plurality of CCs, and can also be used to deactivate original TCI-states of a plurality of CCs.

In other words, TCI-states of a plurality of CCs (such as the first CC and the second CC) may be deactivated by using one piece of signaling.

It may be understood that, for original TCI-states of a plurality of CCs, the MAC-CE signaling may also be considered as deactivation signaling, that is, the original TCI-states of the plurality of CCs are deactivated based on the MAC-CE signaling.

The foregoing eight high-frequency CCs are still used as an example.

The network device sends MAC-CE signaling to the terminal device, where an ID of a cell in the MAC-CE signaling is 0, and the MAC-CE signaling indicates that an active TCI-state of the CC #0 is a TCI-state #2. For the CC #1 to the CC #7, the network device does not need to send MAC-CE signaling to the terminal device to respectively indicate that active TCI-states of the CC #1 to the CC #7 are the TCI-state #2. The CC #1 to the CC #7 are associated with (for example, use a same beam configuration as that used by) the CC #0, that is, configurations of qcl-TypeDs of TCI-states of the CC #1 to the CC #7 are the same as a configuration of a qcl-TypeD of a TCI-state of the CC #0. For example, reference signal resource identifiers are the CSI-RS #1 of the CC #0. Therefore, the terminal device may automatically determine the active TCI-states of the CC #1 to the CC #7. In other words, the terminal device may determine that the active TCI-states of the CC #1 to the CC #7 are the TCI-state #2.

One possible manner is as follows:

CC #0, current BWP #, active TCI-state #1::{qcl-TypeD: CSI-RS #1}→active TCI-state #2::{qcl-TypeD: CSI-RS #2}

CC #1, current BWP #, active TCI-state #1::{qcl-TypeD: CSI-RS #1 of CC #0}→active TCI-state #2::{qcl-TypeD: CSI-RS #2 of CC #0}

CC #2, current BWP #, active TCI-state #1::{qcl-TypeD: CSI-RS #1 of CC #0}→active TCI-state #2::{qcl-TypeD: CSI-RS #2 of CC #0}

CC #3, current BWP #, active TCI-state #1::{qcl-TypeD: CSI-RS #1 of CC #0}→active TCI-state #2::{qcl-TypeD: CSI-RS #2 of CC #0}

CC #4, current BWP #, active TCI-state #1::{qcl-TypeD: CSI-RS #1 of CC #0}→active TCI-state #2::{qcl-TypeD: CSI-RS #2 of CC #0}

CC #5, current BWP #, active TCI-state #1::{qcl-TypeD: CSI-RS #1 of CC #0}→active TCI-state #2::{qcl-TypeD: CSI-RS #2 of CC #0}

CC #6, current BWP #, active TCI-state #1::{qcl-TypeD: CSI-RS #1 of CC #0}→active TCI-state #2::{qcl-TypeD: CSI-RS #2 of CC #0}

CC #7, current BWP #, active TCI-state #1::{qcl-TypeD: CSI-RS #1 of CC #0}→active TCI-state #2::{qcl-TypeD: CSI-RS #2 of CC #0}

It should be understood that, that the terminal device automatically updates the active TCI-states of the CC #1 to the CC #7 represents that MAC-CE signaling used to indicate the active TCI-states of the CC #1 to the CC #7 does not need to be sent. After receiving MAC-CE signaling used to indicate the active TCI-state of the CC #0, the terminal device may determine the active TCI-states of the CC #1 to the CC #7. In other words, after receiving the MAC-CE signaling used to indicate the active TCI-state of the CC #0, the terminal device may determine that the active TCI-state of the CC #0 is the active TCI-states of the CC #1 to the CC #7. It may also be understood that, after receiving the MAC-CE signaling used to indicate the active TCI-state of the CC #0, the terminal device automatically activates a TCI-state of another CC for which a same qcl-TypeD is configured.

It should be further understood that, that the terminal device activates a TCI-state of a CC represents that the active TCI-state is used for current data transmission (for example, PDSCH transmission). For example, when data (for example, a PDSCH) is transmitted in a BWP of the CC, a transmission beam and a reception beam may be determined based on information indicated by the active TCI-state.

Case 2: The beam update information of the first CC includes information about a reference signal resource corresponding to the active TCI-state of the first CC.

After receiving information for updating a reference signal resource of one TCI-state of the first CC, the terminal device not only updates the reference signal resource of the TCI-state of the first CC, but also automatically updates a reference signal resource of one TCI-state of the second CC. After the updating, the reference signal resource of the TCI-state of the first CC is the same as a reference signal resource of one TCI-state of the second CC.

In other words, after receiving information for updating a reference signal resource of one TCI-state of the first CC, the terminal device automatically updates information about a reference signal resource of a second CC for which a same qcl-TypeD is originally configured, so that the reference signal resource of the TCI-state of the first CC is the same as a reference signal resource of one TCI-state of the second CC.

Alternatively, it may be understood that one piece of RRC signaling may be used to update beam information of a plurality of CCs.

The foregoing eight high-frequency CCs are still used as an example.

The network device sends RRC signaling to the terminal device, where an ID of a cell in the RRC signaling is 0, and the RRC signaling indicates to update a reference signal resource identifier of a qcl-TypeD of one TCI-state of the CC #0 from the CSI-RS #1 to the CSI-RS #2. For the CC #1 to the CC #7, the network device does not need to send RRC reconfiguration signaling to the terminal device to respectively indicate to update reference signal resource identifiers of the qcl-TypeDs of the TCI-states of the CC #1 to the CC #7 from the CSI-RS #1 to the CSI-RS #2. The CC #1 to the CC #7 are associated with (for example, use a same beam configuration as that used by) the CC #0, that is, the configurations of the qcl-TypeDs of the TCI-states of the CC #1 to the CC #7 are the same as the configuration of the qcl-TypeD of the TCI-state of the CC #0. For example, reference signal resource identifiers are the CSI-RS #1 of the CC #0. Therefore, the terminal device may automatically update the reference signal resource identifiers of the qcl-TypeDs of the TCI-states of the CC #1 to the CC #7, in other words, the terminal device may determine that the reference signal resource identifiers of the qcl-TypeDs of the TCI-states of the CC #1 to the CC #7 are the CSI-RS #2 of the CC #0.

One possible manner is as follows:

CC #0, BWP #1, TCI LIST, TCI-state #1::{qcl-TypeD: CSI-RS #1}→TCI-state #1::{qcl-TypeD: CSI-RS #2}

CC #1, BWP #1, TCI LIST, TCI-state #1::{qcl-TypeD: CSI-RS #1 of CC #0}→TCI-state #1::{qcl-TypeD: CSI-RS #2 of CC #0}

CC #2, BWP #1, TCI LIST, TCI-state #1::{qcl-TypeD: CSI-RS #1 of CC #0}→TCI-state #1::{qcl-TypeD: CSI-RS #2 of CC #0}

CC #3, BWP #1, TCI LIST, TCI-state #1::{qcl-TypeD: CSI-RS #1 of CC #0}→TCI-state #1::{qcl-TypeD:CSI-RS #2 of CC #0}

CC #4, BWP #1, TCI LIST, TCI-state #1::{qcl-TypeD: CSI-RS #1 of CC #0}→TCI-state #1::{qcl-TypeD: CSI-RS #2 of CC #0}

CC #5, BWP #1, TCI LIST, TCI-state #1::{qcl-TypeD: CSI-RS #1 of CC #0}→TCI-state #1::{qcl-TypeD:CSI-RS #2 of CC #0}

CC #6, BWP #1, TCI LIST, TCI-state #1::{qcl-TypeD: CSI-RS #1 of CC #0}→TCI-state #1::{qcl-TypeD: CSI-RS #2 of CC #0}

CC #7, BWP #1, TCI LIST, TCI-state #1::{qcl-TypeD: CSI-RS #1 of CC #0}→TCI-state #1::{qcl-TypeD:CSI-RS #2 of CC #0}

It can also be seen from the above that, the reference signal resource identifiers of the qcl-TypeDs of the TCI-states of the CC #1 to the CC #7 are associated with an ID of the CC #0 and the reference signal resource identifier of the qcl-TypeD of the TCI-state of the CC #0. For example, after the updating, the reference signal resource identifiers of the qcl-TypeDs of the TCI-states of the CC #1 to the CC #7 are the CSI-RS #2 of the CC #0.

It should be understood that, that the terminal device automatically updates the reference signal resource identifiers of the qcl-TypeDs of the TCI-states of the CC #1 to the CC #7 represents that there is no need to send RRC signaling used to indicate to update the reference signal resource identifiers of the qcl-TypeDs of the TCI-states of the CC #1 to the CC #7. After receiving RRC signaling used to indicate to update a reference signal resource identifier of a qcl-TypeD of one TCI-state of the CC #0, the terminal device may automatically update the reference signal resource identifiers of the qcl-TypeDs of the TCI-states of the CC #1 to the CC #7, that is, automatically update a reference signal resource identifier of a qcl-TypeD of a TCI-state of a CC for which the same qcl-TypeD is configured.

It should be understood that the automatic updating represents that beam update information used to indicate the second CC no longer needs to be sent to the terminal device. In other words, beam update information used to indicate the first CC may be used to update the beam information of the first CC and the beam information of the second CC.

With reference to the two cases, the foregoing describes in detail that the terminal device automatically updates a TCI of the second CC (in other words, the terminal device automatically updates a reception beam of the second CC). For example, the terminal device activates a TCI-state of the second CC, or the terminal device automatically updates a reference signal resource of a qcl-TypeD in a TCI-state. It should be understood that this embodiment of this application is not limited thereto. When the first CC is associated with the one or more second CCs (where for example, the first CC and the one or more second CCs use a same beam configuration), the terminal device may automatically update the beam information of the one or more second CCs based on the beam update information of the first CC. The following uses one second CC as an example to briefly describe several other possible cases.

1. The terminal device may automatically update a transmission beam of a time-frequency tracking reference signal resource of the second CC.

Optionally, the network device sends, to the terminal device, information about a time-frequency tracking reference signal resource configured for the first CC and information about the time-frequency tracking reference signal resource configured for the second CC.

It may be understood that the network device configures, for the first CC, a reference signal resource used for time-frequency tracking. For example, the time-frequency tracking reference signal resource is configured, in a TCI-state of the first CC, as a reference signal resource of the qcl-TypeA. Similarly, the network device configures, for the second CC, a reference signal resource used for time-frequency tracking, and configures the time-frequency tracking reference signal resource, in a TCI-state of the second CC, as a reference signal resource of the qcl-TypeA.

It should be understood that, even if the manner 2 is used, to be specific, the network device performs a beam configuration only for the first CC, the network device still configures, for the second CC, the reference signal resource used for time-frequency tracking.

Optionally, the terminal device may update beam information of the time-frequency tracking reference signal resource of the second CC based on the beam update information of the first CC. In other words, the terminal device may update the transmission beam of the time-frequency tracking reference signal resource of the second CC based on the beam update information of the first CC.

For example, when the reference signal resource identifier of the qcl-TypeD of the active TCI-state of the first CC is updated from the CSI-RS #1 to the CSI-RS #2, and the active TCI-state changes from the TCI-state #1 to the TCI-state #2, the network device automatically updates the transmission beam of the time-frequency tracking reference signal resource (for example, denoted as a CSI-RS #x) of the second CC, and the terminal device also accordingly automatically updates the reception beam of the second CC.

TCI-state #1::{qcl-TypeA: CSI-RS #x of second CC, qcl-TypeD: CSI-RS #1 of first CC}
TCI-state #2::{qcl-TypeA: CSI-RS #x of second CC, qcl-TypeD: CSI-RS #2 of first CC}

2. The terminal device updates a TCI of the first CC, and automatically updates a spatial relationship of the second CC.

In other words, the terminal device updates a reception beam of the first CC, and automatically updates a transmission beam of the second CC.

Optionally, after the updating, the second CC and the first CC have a same spatial relationship. In other words, a transmission beam used for sending an uplink signal by the second CC is the same as that used for sending an uplink signal by the first CC.

The spatial relationship of the second CC is associated with the TCI-state of the first CC, that is, the transmission beam of the second CC (namely, the spatial relationship of the second CC) is an uplink transmission beam corresponding to the downlink reception beam (namely, the TCI-state of the first CC).

That the terminal device updates a downlink reception beam of the first CC based on the beam update information of the first CC may be understood as that the terminal device determines the reception beam of the first CC based on a reception beam indication of the first CC. The spatial relationship of the second CC is associated with the TCI-state of the first CC. Therefore, the terminal device also updates the spatial relationship of the second CC, to correspond to the active TCI-state of the first CC, in other words, correspond to an updated reception beam of the first CC.

It should be understood that the reception beam indication may also be replaced with a QCL indication. The reception beam indication represents a reception beam used in a communication process. For example, the reception beam of the first CC represents a reception beam used when the terminal device receives a signal on a frequency domain resource of the first CC.

Optionally, that the terminal device updates a transmission beam of the second CC further includes changing uplink transmit power. Alternatively, it may be said that a path loss estimation reference signal varies with the TCI of the first CC.

For example, the network device sends signaling to the terminal device to update a TCI of one or more downlink channels/downlink signals of the first CC, and the terminal device may automatically update a transmission beam of one or more uplink channels/uplink signals of the second CC.

The following lists several possible scenarios as an example.

(1) Downlink: a TCI of a PDCCH/CORESET; uplink: a transmission beam of a physical uplink shared channel (PUSCH)/an SRS/a random access channel (RACH) scheduled or triggered by the PDCCH.

In other words, the network device sends signaling to the terminal device to update a TCI of a PDCCH/CORESET of the first CC, and the terminal device may automatically update a transmission beam of a PUSCH/an SRS/a RACH that is scheduled or triggered by the PDCCH and that is of the second CC.

It should be understood that a person skilled in the art should understand a meaning of the PUSCH/SRS/RACH that is scheduled or triggered by the PDCCH and that is of the second CC. A PUSCH that is scheduled by the PDCCH and that is of the second CC is used as an example, and represents a PUSCH scheduled by the PDCCH and transmitted on a frequency domain resource of the second CC. In other words, the terminal device sends, on the frequency domain resource of the second CC, the PUSCH scheduled by the PDCCH. The other two are similar, and details are not described herein again.

(2) Downlink: a TCI of a PDSCH; uplink: a transmission beam of a physical uplink control channel (PUCCH) that performs acknowledgment (ACK) or negative acknowledgment (NACK) on the PDSCH. The ACK represents that the PDSCH is correctly received or that the PDSCH is successfully received, and the ACK may be a hybrid automatic repeat request (HARQ) acknowledgment (HARQ ACK). The NACK represents that the PDSCH is not received correctly or that the PDSCH fails to be received, and the NACK may be HARQ NACK.

In other words, the network device sends signaling to the terminal device to update a TCI of a PDSCH of the first CC, and the terminal device may automatically update a transmission beam of a PUCCH of the second CC. The PUCCH is a PUCCH used to perform ACK or NACK on the PDSCH of the first CC.

For example, the terminal device successfully receives a PDSCH, in other words, correctly receives the PDSCH, and in this case, downlink: a TCI of the PDSCH; uplink: a transmission beam of a PUCCH for reporting HARQ ACK for the PDSCH.

In other words, the network device sends signaling to the terminal device to update a TCI of a PDSCH of the first CC, and the terminal device may automatically update a transmission beam of a PUCCH, of the second CC, for reporting HARQ ACK for the PDSCH.

It should be understood that, a person skilled in the art should understand a meaning of the PUCCH, of the second CC, for reporting HARQ ACK for the PDSCH. To be specific, it represents that the PUCCH for reporting HARQ ACK for the PDSCH is transmitted on a frequency domain resource of the second CC. In other words, the terminal device sends the PUCCH on the frequency domain resource of the second CC, to report the HARQ ACK that is for the PDSCH.

For another example, the terminal device fails to receive a PDSCH, in other words, does not correctly receive the PDSCH, and in this case, downlink: a TCI of the PDSCH; uplink: a transmission beam of a PUCCH for reporting HARQ NACK for the PDSCH.

In other words, the network device sends signaling to the terminal device to update a TCI of a PDSCH of the first CC, and the terminal device may automatically update a transmission beam of a PUCCH, of the second CC, for reporting HARQ NACK for the PDSCH.

It should be understood that, a person skilled in the art should understand a meaning of the PUCCH, of the second CC, for reporting HARQ NACK for the PDSCH. To be specific, it represents that the PUCCH for reporting HARQ NACK for the PDSCH is transmitted on a frequency domain resource of the second CC. In other words, the terminal device sends the PUCCH on the frequency domain resource of the second CC, to report the HARQ NACK that is for the PDSCH.

(3) Downlink: a TCI of a CSI-RS; uplink: a transmission beam of a PUCCH/PUSCH for reporting CSI.

In other words, the network device sends signaling to the terminal device to update a TCI of a CSI-RS of the first CC, and the terminal device may automatically update a transmission beam that is of the second CC and of a PUCCH/PUSCH for reporting CSI.

It should be understood that the foregoing merely lists several scenarios as examples, and this embodiment of this application is not limited thereto. Any variation falling within the foregoing several scenarios falls within the protection scope of the embodiments of this application.

3. The terminal device updates a spatial relationship of the first CC, and automatically updates a spatial relationship of the second CC.

In other words, the terminal device updates a transmission beam of the first CC, and automatically updates a transmission beam of the second CC.

After the updating, the second CC and the first CC have a same spatial relationship. In other words, a transmission beam used for sending an uplink signal by the second CC is the same as that used for sending an uplink signal by the first CC.

The terminal device updates the spatial relationship of the first CC based on the beam update information of the first CC. In other words, the terminal device determines the transmission beam of the first CC based on a transmission beam indication of the first CC. The spatial relationship of the second CC is associated with the spatial relationship of the first CC. Therefore, the terminal device also updates the spatial relationship of the second CC, so that the spatial relationship of the second CC is the same as an updated spatial relationship of the first CC.

It should be understood that the transmission beam indication may alternatively be replaced with a spatial relationship indication or a spatial filter indication. The transmission beam indication represents a transmission beam used in a communication process. For example, the transmission beam of the first CC represents a transmission beam used when the terminal device sends a signal or data on a frequency domain resource of the first CC.

4. The terminal device updates a spatial relationship of the first CC, and automatically updates a TCI of the second CC.

In other words, the terminal device updates a transmission beam of the first CC, and automatically updates a reception beam of the second CC.

After the updating, the second CC and the first CC have a same TCI configuration. In other words, the second CC has a same reception beam for receiving a signal as that of the first CC.

The terminal device updates the spatial relationship of the first CC based on the beam update information of the first CC. In other words, the terminal device determines the transmission beam of the first CC based on a transmission beam indication of the first CC. A TCI-state of the second CC is associated with the spatial relationship of the first CC. Therefore, the terminal device also updates the TCI-state of the second CC, to correspond to an updated spatial relationship of the first CC. In other words, the terminal device automatically updates the reception beam of the second CC, to correspond to the updated transmission beam of the first CC.

It should be understood that the foregoing lists other four possible cases as examples, and this embodiment of this application is not limited thereto. When the first CC is associated with the second CC (where for example, the first CC and the second CC use a same beam configuration), regardless of a scenario, the terminal device may automatically update beam information of the second CC based on the beam update information of the first CC, so that the second CC and the first CC keep using the same beam configuration.

For example, when the first CC is associated with one or more second CCs (where for example, the first CC and the one or more second CCs use a same beam configuration), the terminal device may update a mapping relationship, of the one or more second CCs, between a TCI-state ID and a TCI field value and a mapping relationship, of the first CC, between a TCI-state ID and a TCI field value. An updated mapping relationship, of the one or more second CCs, between a TCI-state ID and a TCI field value is the same as an updated mapping relationship, of the first CC, between a TCI-state ID and a TCI field value.

For example, the terminal device updates a mapping relationship, of the one or more second CCs, between a TCI-state identifier TCI-state ID and a TCI field value that is in DCI and a mapping relationship, of the first CC, between a TCI-state identifier TCI-state ID and a TCI field value that is in DCI. An updated mapping relationship, of the one or more second CCs, between a TCI-state ID and a TCI field value that is in DCI is the same as an updated mapping relationship, of the first CC, between a TCI-state ID and a TCI field value that is in DCI.

In other words, in this embodiment of this application, both a mapping relationship, of the one or more second CCs, between an active TCI-state and a TCI field value and the mapping relationship, of the one or more second CCs, between a TCI-state ID and a TCI field value are updated to be the same as those of the first CC. Therefore, it can be avoided that a data transmission beam of the terminal device is not aligned with that of the network device, so that impact on transmission performance can be reduced.

Optionally, in this example, the terminal device may send related information about a terminal capability to the network device. The related terminal capability may include: whether the terminal device supports simultaneous updating of a mapping relationship between an active TCI-state and a TCI field value (for example, a TCI field value in DCI) and a mapping relationship between a TCI-state ID and a TCI field value.

For example, when the terminal device supports the simultaneous updating of a mapping relationship between an active TCI-state and a TCI field value (for example, a TCI field value in DCI) and a mapping relationship between a TCI-state ID and a TCI field value, the network device sends the beam update information of the first CC to the terminal device, and the terminal device may update, based on the beam update information of the first CC, the mapping relationship, of the one or more second CCs, between an active TCI-state and a TCI field value (for example, a TCI field value in DCI) and the mapping relationship, of the one or more second CCs, between a TCI-state ID and a TCI field value.

It should be understood that in some of the foregoing embodiments, the first CC and the second CC are used as an example for description. This embodiment of this application is not limited thereto. For example, the terminal device may automatically update, based on the beam update information of the first CC, beam information of another CC (for example, a CC that uses a same beam configuration as that used by the first CC) that is associated with the first CC. For another example, a plurality of CCs are associated with each other (for example, the plurality of CCs use a same beam configuration), and the terminal device also automatically updates, based on received beam update information of some of the plurality of CCs, beam information of a remaining CC in the plurality of CCs.

It should be further understood that in some of the foregoing embodiments, an example in which one TCI-state is activated for a CC is used for description. This embodiment of this application is not limited thereto.

It should be further understood that updating beam information of a CC is used as an example for description in the foregoing, and the CC may alternatively be replaced with a BWP or a BWP of the CC. Alternatively, the CC may be replaced with a CC and a BWP, or the CC may be replaced with a CC or a BWP. Similarly, in the embodiments of this application, in some scenarios, a CC ID may be replaced with a BWP ID, or a CC ID may be replaced with a CC ID and a BWP ID, or a CC ID may be replaced with a CC ID or a BWP ID.

It should be further understood that in some of the foregoing embodiments, an example in which the one or more second CCs and the first CC use a same beam configuration is used for description. "The one or more second CCs and the first CC use a same beam configuration" may be replaced with "the one or more second CCs are associated with the first CC".

It should be further understood that updating beam information represents updating a transmission beam or a reception beam. For example, a reception beam of the terminal device changes. A transmission beam of the network device and a reception beam of the terminal device form a downlink. It may be understood that, that the reception beam of the terminal device changes means that the transmission beam of the network device also changes. In other words, when the transmission beam of the network device changes, the reception beam of the corresponding terminal device also changes accordingly. For another example, a transmission beam of the terminal device changes. A reception beam of the network device and a transmission beam of the terminal device form an uplink. It may be understood that, that the transmission beam of the terminal device changes means that the reception beam of the network device also changes. In other words, when the reception beam of the network device changes, the transmission beam of the corresponding terminal device also changes accordingly.

Based on the foregoing embodiment, when a plurality of CCs are associated with each other (for example, the plurality of CCs use a same beam configuration), beam information of the plurality of CCs may be updated by using beam update information of one CC, in other words, the terminal device can update reception beams and/or transmission beams of the plurality of CCs by using one piece of signaling. For example, transmission beams of a plurality of CCs are updated. For example, TCI-states are activated for a plurality of CCs. Alternatively, reference signal resources (for example, reference signal resource identifiers or reference signal resource types) of qcl-TypeDs of TCI-states of a plurality of CCs are updated. For another example, transmission beams of a plurality of CCs are updated. Therefore, not only repeated signaling sending and a redundant configuration can be reduced, but also overheads and a delay of a beam indication can be reduced, thereby improving communication performance.

Figure 6:
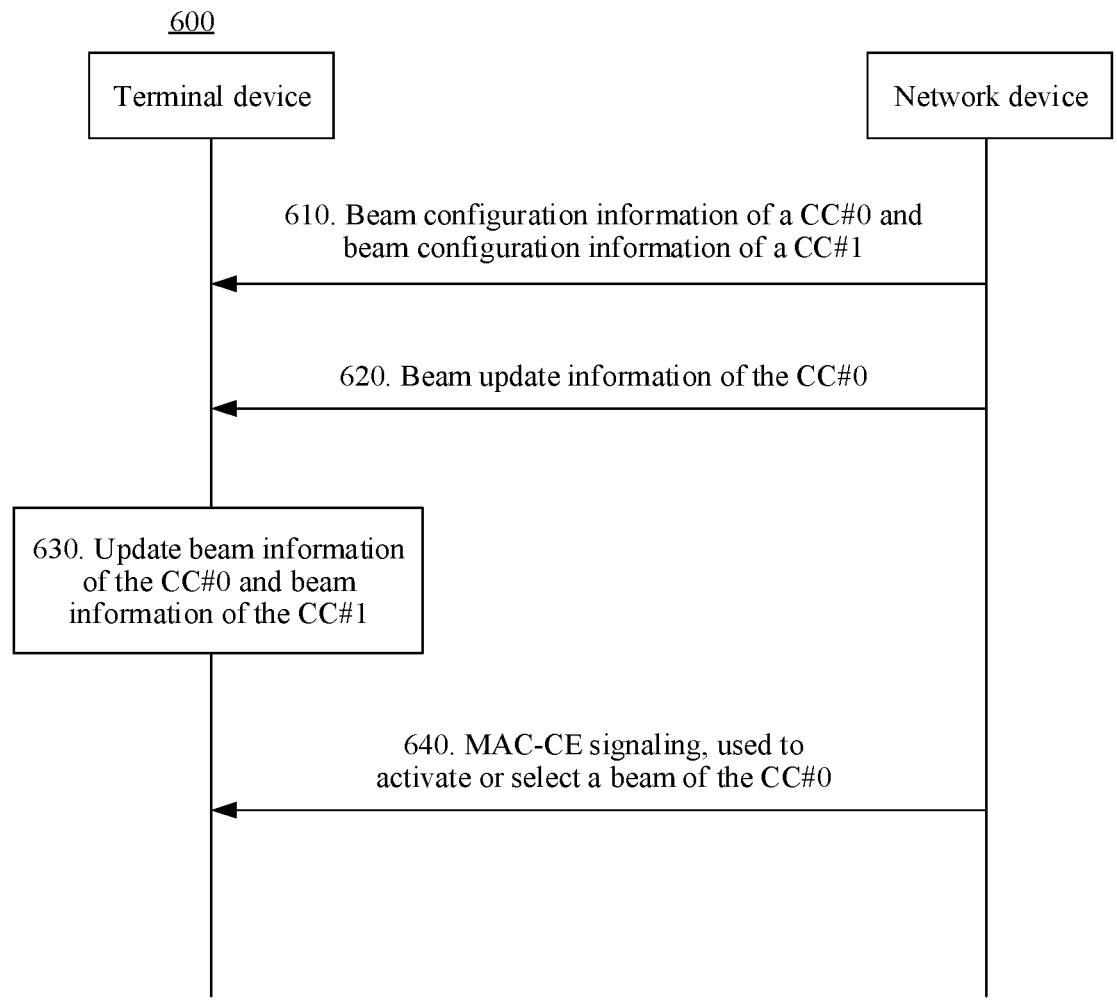
FIG. 6 is a schematic interaction diagram of a method for updating beam information according to another embodiment of this application.
Figure 7:
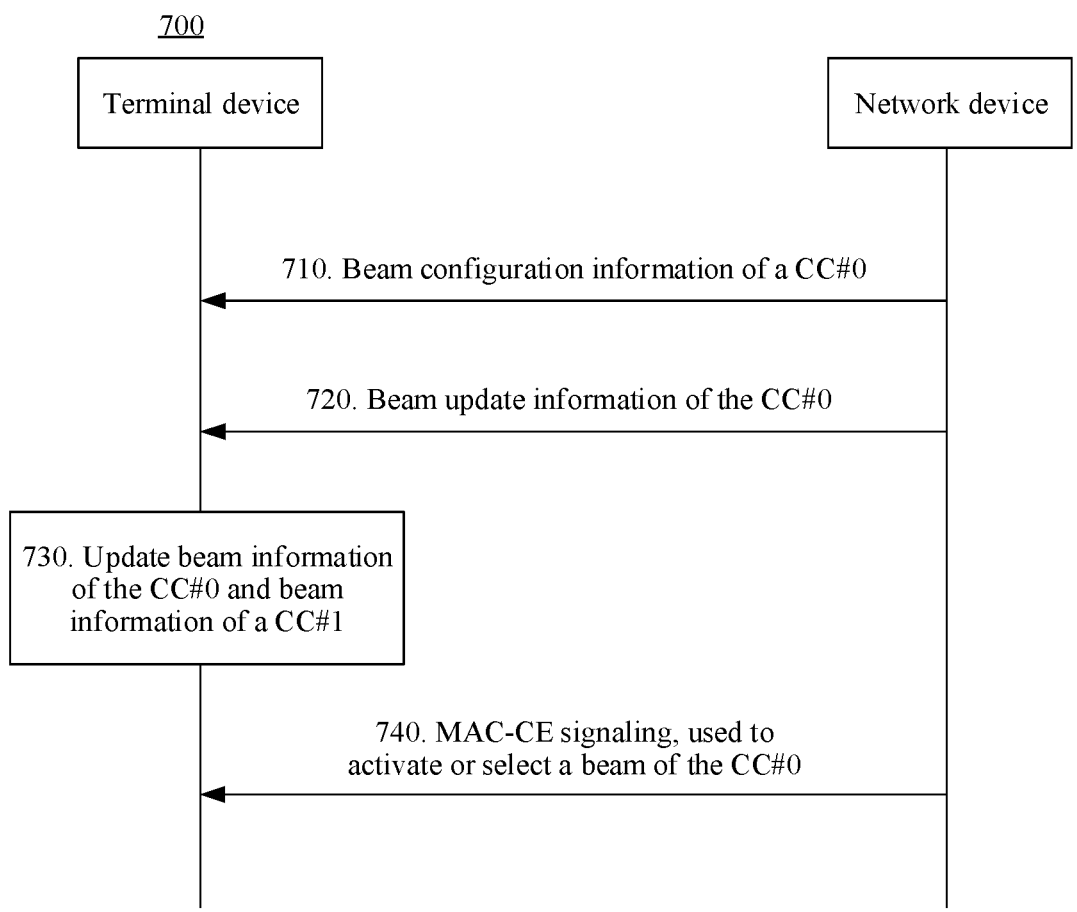
FIG. 7 is a schematic interaction diagram of a method for updating beam information according to still another embodiment of this application.

The following separately describes the foregoing manner 1 and manner 2 with reference to FIG. 6 and FIG. 7 by using an example in which the first CC is a CC #0 and the one or more second CCs are a CC #1. For content that is not described in detail in FIG. 6 and FIG. 7, refer to the descriptions in the method 500.

FIG. 6 is a schematic interaction diagram of a method 600 for updating beam information according to another embodiment of this application. The method 600 may include the following steps.

610. A network device sends beam configuration information of a CC #0 and beam configuration information of a CC #1 to a terminal device.

For example, the network device sends RRC signaling to the terminal device, to configure beam information for each CC or a BWP of each CC.

That is, in the manner 1 described in the method 500, the network device performs a related beam configuration for both the CC #0 and the CC #1.

An RRC configuration includes:
CellGroupConfig→* . . . →*ServingCell Config→* . . . →*BWP→* . . . →*PDSCH-Config . . . →*tci-StatesToAddModList.

For the CC #0 and the CC #1, a same TCI-state is repeatedly configured. For example:

CC #0, BWP #1, TCI LIST, TCI-state #1::{qcl-TypeD: CSI-RS #1}

CC #1, BWP #1, TCI LIST, TCI-state #1::{qcl-TypeD: CSI-RS #1 of CC #0}

Step 610 is similar to an existing configuration manner, and details are not described herein again.

Optionally, the CC #0 may be a CC used for beam training or beam management.

620. The network device sends beam update information of the CC #0 to the terminal device.

For example, the network device sends RRC signaling to the terminal device, to update a reference signal resource identifier of a qcl-TypeD of one TCI-state of the CC #0.

For example, the network device sends RRC signaling to the terminal device, where an ID of a cell in the RRC signaling is 0, and the RRC signaling indicates to update a reference signal resource identifier of a qcl-TypeD of one TCI-state of the CC #0 from the CSI-RS #1 to a CSI-RS #2.

630. The terminal device updates beam information of the CC #0 and beam information of the CC #1.

After the terminal device receives the RRC signaling for the CC #0, the terminal device considers that beam information of another CC (a CC that is associated with the CC #0, for example, a CC that uses a same beam configuration as that used by the CC #0) is updated simultaneously. Specifically, a TCI of another CC for which a same reference signal resource ID of a qcl-typeD is originally configured is updated.

After receiving the RRC signaling, the terminal device updates reference signal resource identifiers of qcl-TypeDs of TCI-states of the CC #0 and the CC #1.

For example, for the CC #0, the reference signal resource identifier of the qcl-TypeD of the TCI-state of the CC #0 is updated from the CSI-RS #1 to the CSI-RS #2.

CC #0, BWP #1, TCI LIST, TCI-state #1::{qcl-TypeD: CSI-RS #1}→TCI-state #1::{qcl-TypeD: CSI-RS #2}

CC #1, BWP #1, TCI LIST, TCI-state #1::{qcl-TypeD: CSI-RS #1 of CC #0}→TCI-state #1::{qcl-TypeD:CSI-RS #2 of CC #0}

It can also be seen from the above that, the reference signal resource identifier of the qcl-TypeD of the TCI-state of the CC #1 is associated with an ID of the CC #0 and the reference signal resource identifier of the qcl-TypeD of the TCI-state of the CC #0. For example, before the updating, the reference signal resource identifier of the qcl-TypeD of the TCI-state of the CC #1 is the CSI-RS #1 of the CC #0. For another example, after the updating, the reference signal resource identifier of the qcl-TypeD of the TCI-state of the CC #1 is the CSI-RS #2 of the CC #0.

According to this embodiment of this application, RRC reconfiguration signaling of the CC #1 does not need to be sent, and the terminal device automatically updates the beam information of the CC #1, so that repeated signaling sending and a redundant configuration can be reduced, thereby reducing overheads and a delay of a beam indication.

640. The network device sends MAC-CE signaling to the terminal device, where the MAC-CE signaling is used to activate or select a beam of the CC #0.

After receiving the MAC-CE signaling, the terminal device considers that the beam information of the CC #1 is updated simultaneously.

Specifically, another TCI for which a same reference signal resource ID of a qcl-typeD is originally configured is activated/selected. For example:

CC #0, current BWP #, active TCI-state #1::{qcl-TypeD: CSI-RS #1}→active TCI-state #2::{qcl-TypeD: CSI-RS #2}

CC #1, current BWP #, active TCI-state #1::{qcl-TypeD: CSI-RS #1 of CC #0}→active TCI-state #2::{qcl-TypeD: CSI-RS #2 of CC #0}.

According to this embodiment of this application, MAC-CE signaling of the CC #1 does not need to be sent, and the terminal device automatically updates the beam information of the CC #1, thereby reducing the overheads and the delay of the beam indication.

Optionally, only one time-frequency offset tracking reference signal (for example, a CSI-RS #x is used as a reference for a qcl-TypeA) may be configured for the CC #1, and there is no need to configure a QCL indication for the time-frequency offset tracking reference signal (that is, there is no need to configure QCL information for the CSI-RS #x, which is a downlink physical signal). The network device may automatically update a transmission beam of the time-frequency offset tracking reference signal, and the terminal device also automatically updates a reception beam of the time-frequency offset tracking reference signal.

TCI-state #1::{qcl-TypeA: CSI-RS #x of CC #1, qcl-TypeD: CSI-RS #1 of CC #0}

TCI-state #2::{qcl-TypeA: CSI-RS #x of CC #1, qcl-TypeD: CSI-RS #2 of CC #0}

According to this embodiment of this application, when an active TCI-state changes from the TCI-state #1 to the TCI-state #2, the network device automatically updates a transmission beam of the CSI-RS #x of the CC #1, and the terminal device accordingly automatically updates a reception beam of the CSI-RS #x of the CC #1.

FIG. 7 is a schematic interaction diagram of a method 700 for updating beam information according to still another embodiment of this application. The method 700 may include the following steps.

710. A network device sends beam configuration information of a CC #0 to a terminal device.

For example, the network device sends RRC signaling to the terminal device, to configure beam information for the CC #0 or a BWP of the CC #0.

An RRC configuration includes:
CellGroupConfig→* . . . →*ServingCell Config→* . . . →*BWP→* . . . →PDSCH-Config . . . →*tci-StatesToAddModList.

For example, for a plurality of CCs (for example, the CC #0 and a CC #1), RRC is used to configure, for only one of the CCs (for example, the CC #0), a TCI-state list with a qcl-TypeD, and the configuration is reused for another CC (for example, the CC #1). Same TCI qcl-TypeD content does not need to be replicated for each CC, and there is only a need to simply indicate that the CC #1 has a qcl-TypeD association relationship with the CC #0.

That is, in the manner 2 described in the method 500, the network device performs a related beam configuration for the CC #0.

The plurality of CCs may be a plurality of CCs in one cell group (cell group). Alternatively, the plurality of CCs may be a plurality of CCs in one frequency band. Alternatively, the plurality of CCs may be a plurality of CCs in one frequency band group. This is not limited.

Optionally, the indicating that the CC #1 and the CC #0 have a qcl-TypeD association relationship may be implemented in any one of the following manners.

For example, the CC #1 and the CC #0 have a qcl-TypeD association relationship by default. Specifically, the network device pre-specifies or a protocol pre-specifies or pre-agrees on that a plurality of CCs in one cell group have such an association relationship, or a plurality of CCs in one frequency band have such an association relationship, or a plurality of CCs in one frequency band group have such an association relationship.

For another example, the terminal device feeds back that the CC #1 has a qcl-TypeD association relationship with the CC #0. Specifically, the terminal device may feed back, to the network device, whether the plurality of CCs have such an association relationship. The network device may perform a corresponding configuration based on the feedback of the terminal device. Alternatively, the terminal device may determine, depending on whether the plurality of CCs have such an association relationship, whether to automatically update beam information of the CC #1 based on beam update information of the CC #0.

For example, the network device sends the beam configuration information and indication information of the CC #0 to the terminal device, where the indication information is used to indicate that the CC #1 is associated with the CC #0. In other words, the CC #1 uses a beam configuration of the CC #0.

Optionally, when a reference signal (for example, for type A) used for time-frequency tracking is configured for the CC #1, the CC #1 still has a TCI-state list, but content of the qcl-TypeD is the same.

Optionally, the CC #0 may be a CC used for beam training or beam management. Specifically, reference may be made to the descriptions about the first CC in the method 500.

720. The network device sends the beam update information of the CC #0 to the terminal device.

For example, the network device sends RRC signaling to the terminal device, to update a reference signal resource identifier of a qcl-TypeD of one TCI-state of the CC #0.

This step is similar to step 620 in the method 600, and details are not described herein again.

730. The terminal device updates the beam information of the CC #0 and the beam information of the CC #1.

Based on the association relationship between the CC #1 and the CC #0, the terminal device may automatically update the beam information of the CC #1 after receiving the RRC signaling.

According to this embodiment of this application, the terminal device automatically updates the beam information of the CC #1, so that repeated signaling sending and a redundant configuration can be reduced, thereby reducing overheads and a delay of a beam indication.

This step is similar to step 630 in the method 600, and details are not described herein again.

740. The network device sends MAC-CE signaling to the terminal device, where the MAC-CE signaling is used to activate or select a beam of the CC #0.

Based on the association relationship between the CC #1 and the CC #0, the terminal device may automatically update the beam information of the CC #1 after receiving the MAC-CE signaling.

According to this embodiment of this application, MAC-CE signaling of the CC #1 does not need to be sent, and the terminal device automatically updates the beam information of the CC #1, thereby reducing the overheads and the delay of the beam indication.

This step is similar to step 640 in the method 600, and details are not described herein again.

It should be understood that, in some of the foregoing embodiments, updating a reference signal resource of a qcl-TypeD of a TCI-state of a CC is mentioned for a plurality of times. Herein, the TCI-state of the CC may represent an active TCI-state of the CC.

It should be further understood that in some of the foregoing embodiments, an example in which one TCI-state is activated for a CC is used for description. It should be understood that the solution in this embodiment of this application may also be used when a plurality of TCI-states are activated for a CC.

It should be further understood that, in some of the foregoing embodiments, a qcl-TypeD with a same configuration is mentioned for a plurality of times. The qcl-TypeD with a same configuration may be replaced with a same configured reference signal resource of the qcl-TypeD.

It should be further understood that, automatically updating beam information of a CC by the terminal device is mentioned for a plurality of times in the foregoing, and represents that the network device does not need to send beam update indication information (for example, MAC-CE signaling for indicating to activate a TCI-state, or RRC reconfiguration signaling for indicating to update a reference signal resource of a qcl-TypeD) for the CC. In other words, a plurality of CCs use a same beam configuration, and the terminal device may automatically update, based on beam update information of one or some of the plurality of CCs, beam information of a remaining CC in the plurality of CCs.

It should be further understood that in some of the foregoing embodiments, the first CC and the second CC or the CC #0 and the CC #1 are used as an example for description. This embodiment of this application is not limited thereto. For example, a plurality of CCs are associated with each other (for example, the plurality of CCs use a same beam configuration), and the terminal device also automatically updates, based on received beam update information of some of the plurality of CCs, beam information of a remaining CC in the plurality of CCs.

Based on the foregoing technical solution, when a plurality of CCs are associated with each other (for example, the plurality of CCs use a same beam configuration), beam information of the plurality of CCs may be updated by using beam update information of one CC. In other words, the terminal device may update reception beams and/or transmission beams of a plurality of CCs by using one piece of signaling. For example, TCI-states are activated for a plurality of CCs by using one piece of signaling (such as MAC-CE signaling). For another example, reference signal resources (for example, a reference signal resource identifier or a reference signal resource type) of qcl-TypeDs of TCI-states of a plurality of CCs are updated by using one piece of signaling (for example, RRC signaling). Therefore, not only repeated signaling sending and a redundant configuration can be reduced, but also overheads and a delay of a beam indication can be reduced, thereby improving communication performance.

In addition, in this application, when the network device and the terminal device communicate with a same group of beams on a plurality of CCs (for example, including one or more second CCs and a first CC), by using a Rel-15 beam indication solution, the network device needs to configure identical beam information (for example, a TCI indication or a spatial relationship indication) on each CC through RRC, and activate a same beam set on each CC through a MAC-CE. For example, if the network device needs to notify to change an active beam, the network device may send up to (32*12) MAC-CEs (where 32 is a maximum quantity of supported CCs, 12 is a maximum quantity of CORESETs of each CC, and * represents a multiplication operation). Each MAC-CE is for one piece of identical beam change information, in other words, notification content is the same (except that CC IDs are different). Consequently, not only redundant signaling is increased, but also beam indication overheads are increased. Therefore, this application proposes that the terminal device may automatically update beam information of the plurality of CCs by using one piece of signaling, for example, support simultaneous activation of the beam information of the plurality of CCs, so that the beam indication overheads, signaling redundancy, and a delay can be reduced.

In addition, in this application, that the terminal device may automatically update beam information of the plurality of CCs by using one piece of signaling may alternatively be understood as that active beams (for example, PDCCH beams) need to allow to be simultaneously updated across all CCs (or BWPs). Using one piece of signaling represents that, when simultaneous updating is supported, the network device needs to send, for one CC, only one explicit TCI activation/deactivation command and one explicit TCI selection command, and the terminal device can adjust, for all other related CCs, activated and selected TCI and a spatial relationship.

It is considered that a set of TCI-states simultaneously activated for a plurality of CCs may be only a subset of a set of active TCI-states of each CC, or there may be an intersection set or a union set between a set of TCI-states simultaneously activated for a plurality of CCs and a set of active TCI-states of each CC. An embodiment of this application further provides a solution. Details are described below.

The following provides descriptions by still using an example in which a first CC is a CC #0 and one or more second CCs are a CC #1. Similarly, the CC #0 is associated with the CC #1.

Figure 8:
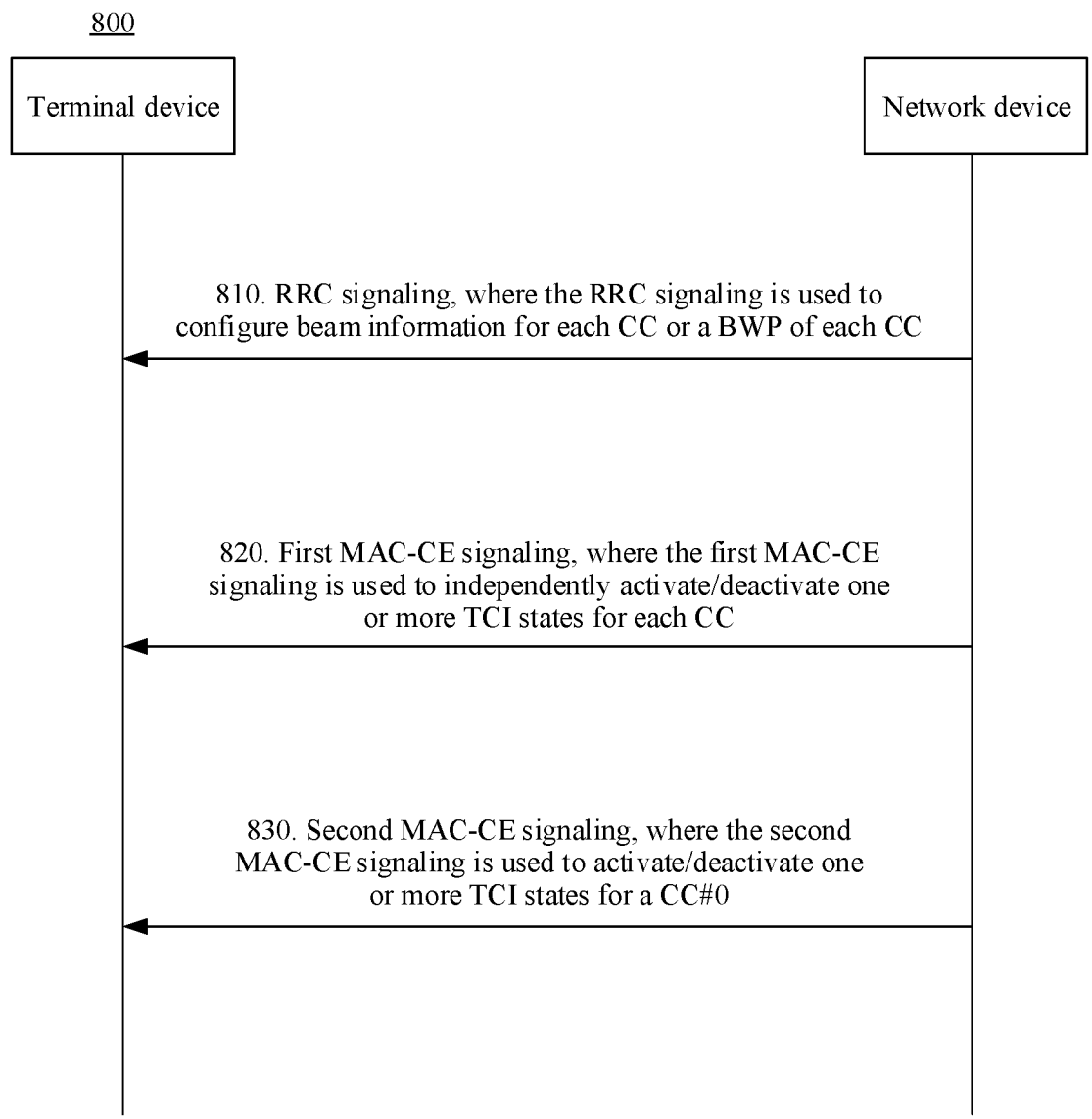
FIG. 8 is a schematic interaction diagram of a method for updating beam information according to still another embodiment of this application.

FIG. 8 is a schematic interaction diagram of a method 800 for updating beam information according to yet another embodiment of this application. The method 800 may include the following steps.

810. A network device sends RRC signaling to a terminal device, where the RRC signaling is used to configure beam information for each CC or a BWP of each CC.

For example, the network device sends beam configuration information of a CC #0 and beam configuration information of a CC #1 to the terminal device. For details, reference may be made to step 610 in the method 600.

For another example, the network device sends beam configuration information of a CC #0 to the terminal device. For details, reference may be made to step 710 in the method 700.

Step 810 is similar to step 610 in the method 600, or step 810 is similar to step 710 in the method 700. For details, reference may be made to the descriptions in the method 600 or the method 700. Details are not described herein again.

820. The network device sends first MAC-CE signaling to the terminal device, where the first MAC-CE signaling is used to independently activate/deactivate one or more TCI-states for each CC.

It should be understood that a first MAC-CE is only a name for differentiation, and does not constitute any limitation on the protection scope of the embodiments of this application.

It should be further understood that the first MAC-CE signaling is used to activate/deactivate one or more TCI-states for a CC, and this represents that the first MAC-CE signaling is used to activate one or more TCI-states for the CC, and accordingly, an original TCI-state of the CC is deactivated.

In this embodiment of this application, a value of a reserved field R in MAC-CE signaling may be used to indicate the terminal device whether to update beam information of the CC #1 and beam information of the CC #0 based on beam update information of the CC #0.

Optionally, when the value of the reserved field R in the MAC-CE signaling is 1, the terminal device updates the beam information of the CC #1 and the beam information of the CC #0 based on the beam update information of the CC #0. When the value of the reserved field R in the MAC-CE signaling is 0, the terminal device updates only the beam information of the CC #0 based on the beam update information of the CC #0.

It should be understood that, an alternative may be that when the value of R in the MAC-CE signaling is 0, the terminal device updates the beam information of the CC #1 and the beam information of the CC #0 based on the beam update information of the CC #0; or when the value of the reserved field R in the MAC-CE signaling is 1, the terminal device updates only the beam information of the CC #0 based on the beam update information of the CC #0. This is not limited.

The following provides descriptions by mainly using an example in which when the value of R in the MAC-CE signaling is 1, the terminal device updates the beam information of the CC #1 and the beam information of the CC #0 based on the beam update information of the CC #0. When the value of the reserved field R in the MAC-CE signaling is 0, the terminal device updates only the beam information of the CC #0 based on the beam update information of the CC #0.

In step 820, the network device independently activates/deactivates one or more TCI-states for each CC.

Therefore, a reserved field R in the first MAC-CE signaling may be set to 0, to represent independent activation/deactivation. For example:

CC #0, current active BWP, active TCI-states include: TCI-state #0, TCI-state #1, TCI-state #2, TCI-state #3;

CC #1, current active BWP, active TCI-states include: TCI-state #1, TCI-state #2, TCI-state #3, TCI-state #4, TCI-state #5, TCI-state #6, TCI-state #7, TCI-state #8.

830. The network device sends second MAC-CE signaling to the terminal device, where the second MAC-CE signaling is used to independently activate/deactivate one or more TCI-states for the CC #0.

It should be understood that a second MAC-CE is only a name for differentiation, and does not constitute any limitation on the protection scope of the embodiments of this application.

It should be further understood that the second MAC-CE signaling is used to activate/deactivate one or more TCI-states for the CC #0, and this represents that the second MAC-CE signaling is used to activate one or more TCI-states for the CC #0, and accordingly, an original TCI-state of the CC #0 is deactivated.

For example, the TCI-state #5, TCI-state #6, TCI-state #7, and TCI-state #8 are activated for the CC #0 by using the second MAC-CE signaling. Accordingly, the other TCI-states of the CC #1 are deactivated. For example, after step 830, active TCI states of the CC #0 include the TCI-state #5, TCI-state #6, TCI-state #7, and TCI-state #8.

As described above, a reserved field in MAC-CE signaling may be used to indicate whether the MAC-CE signaling can be used to simultaneously activate TCI-states for a plurality of CCs.

A reserved field R in the second MAC-CE signaling may be used to indicate that the second MAC-CE signaling is used to simultaneously activate TCI-states for a plurality of CCs. For example, the reserved field R in the second MAC CE signaling may be set to 1, representing that the MAC-CE signaling is used to simultaneously activate TCI-states of another CC (for example, the CC #1): the TCI-state #5, TCI-state #6, TCI-state #7, and TCI-state #8.

The network device sends the second MAC-CE signaling, and the R field being 1 represents that the second MAC-CE signaling is used to simultaneously activate TCI-states for a plurality of CCs. That is, the TCI-states of the plurality of CCs are activated based on the second MAC-CE signaling.

Accordingly, original TCI-states of the plurality of CCs are deactivated. That is, the second MAC-CE may be used to deactivate the original TCI-states of the plurality of CCs.

In the following at least three cases, a TCI deactivation command for the CC #0 (namely, a TCI deactivation function of the second MAC-CE) does not take effect for the CC #1.

Case 1: A set of active TCI-states of the CC #0 is a subset of a set of previously activated TCI-states of the CC #1.

Case 2: There is an intersection set between a set of previously activated TCI-states of the CC #0 and a set of active TCI-states of the CC #1.

Case 3: A union set of a set of active TCI-states of the CC #0 and a set of previously activated TCI-states of the CC #1 is less than or equal to a capability of the terminal device.

For example, a TCI-state of a PDSCH of a plurality of CCs or of a plurality of BWPs may be activated and deactivated by using one piece of MAC-CE signaling. When any one of the foregoing cases occurs, a deactivation command does not take effect or is not applicable. For example, when a group of newly activated TCI-states is a subset of a set of previously activated TCI-states of one CC or BWP, for the CC or BWP, a deactivation command does not take effect or is not applicable. For another example, when there is an intersection set between a group of newly activated TCI-states and a set of previously activated TCI-states of one CC or BWP, for the CC or BWP, a deactivation command does not take effect or is not applicable. For another example, when a union set of a group of newly activated TCI-states and a set of previously activated TCI-states of one CC or BWP is less than or equal to a capability of the terminal device, for the CC or BWP, a deactivation command does not take effect or is not applicable.

It should be understood that, in this embodiment of this application, a plurality of TCI-states may be considered as a set of TCI-states, or a set of TCI-states may be used to represent a set including a plurality of TCI-states. For example, if active TCI-states of the CC #0 include the TCI-state #5, TCI-state #6, and TCI-state #7, the TCI-state #5, TCI-state #6, TCI-state #7 may be considered as a set of TCI-states.

The following separately describes the foregoing three cases by using an example in which the TCI-state #5, TCI-state #6, TCI-state #7, TCI-state #8 are activated for the CC #0 by using the second MAC-CE signaling and it is indicated that the second MAC-CE signaling is used to simultaneously activate the TCI-state for the CC #0 and the CC #1.

Case 1: A set of previously activated TCI-states of the CC #0 is a subset of a set of active TCI-states of the CC #1.

In other words, one or more previously activated TCI-states of the CC #1 include all active TCI-states of the CC #0.

To be specific, when TCI states of a plurality of CCs are updated by using a TCI activation command of one CC, whether a TCI deactivation command of the first CC takes effect for the second CC or whether to deactivate an original TCI state of the second CC may be determined depending on whether a set of active TCI states of the first CC is a subset of a set of previously activated TCI states of the second CC. When the set of active TCI states of the first CC is the subset of the set of previously activated TCI states of the second CC, the TCI deactivation command of the first CC does not take effect for the second CC, or the original TCI state of the second CC is not deactivated. Alternatively, it may be understood as that, in addition to the active TCI states of the CC #0, the active TCI states of the second CC further include original previously activated TCI states.

The set of active TCI states of the first CC may be carried in MAC-CE signaling (for example, the second MAC-CE signaling) in which R=1, and the MAC-CE signaling may also be considered as a deactivation command of the first CC. Information about the set of previously activated TCI states of the second CC may be from MAC-CE signaling (for example, the first MAC-CE signaling) in which R=0.

As shown in step 820, the previously activated TCI-states of the CC #1 include: the TCI-state #1, TCI-state #2, TCI-state #3, TCI-state #4, TCI-state #5, TCI-state #6, TCI-state #7, and TCI-state #8.

The set of active TCI-states of the CC #0 is a subset of the set of previously activated TCI-states of the CC #1, that is, the previously activated TCI-states of the CC #1 include the TCI-state #5, TCI-state #6, TCI-state #7, and TCI-state #8. Therefore, the TCI deactivation command of the CC #0 does not take effect for the CC #1. To be specific, the TCI-state #1, TCI-state #2, TCI-state #3, and TCI-state #4 of the CC #1 should not be deactivated.

For example, after step 830, the active TCI-states of the CC #1 include the TCI-state #1, TCI-state #2, TCI-state #3, TCI-state #4, TCI-state #5, TCI-state #6, TCI-state #7, and TCI-state #8.

Case 2: There is an intersection set between a set of active TCI-states of the CC #0 and a set of previously activated TCI-states of the CC #1.

In other words, one or more previously activated TCI-states of the CC #1 include some active TCI-states of the CC #0.

To be specific, when TCI states of a plurality of CCs are updated by using a TCI activation command of one CC, whether a TCI deactivation command of the first CC takes effect for the second CC or whether to deactivate an original TCI state of the second CC may be determined depending on whether there is an intersection set between a set of active TCI states of the first CC and a set of previously activated TCI states of the second CC. When there is an intersection set between the set of active TCI states of the first CC and the set of previously activated TCI states of the second CC, the TCI deactivation command of the first CC does not take effect for the second CC, or the original TCI state of the second CC is not deactivated. Alternatively, it may be understood as that, in addition to the active TCI states of the CC #0, the active TCI states of the second CC further include original previously activated TCI states.

The set of active TCI states of the first CC may be carried in MAC-CE signaling (for example, the second MAC-CE signaling) in which R=1, and the MAC-CE signaling may also be considered as a deactivation command of the first CC. Information about the set of previously activated TCI states of the second CC may be from MAC-CE signaling (for example, the first MAC-CE signaling) in which R=0.

It is assumed that in step 820, the previously activated TCI-states of the CC #1 include the TCI-state #1, TCI-state #2, TCI-state #3, TCI-state #4, TCI-state #5, TCI-state #6, and TCI-state #7.

There is an intersection set between the set of active TCI-states of the CC #0 and the set of previously activated TCI-states of the CC #1, that is, the previously activated TCI-states of the CC #1 include the TCI-state #5, TCI-state #6, and TCI-state #7. Therefore, the TCI deactivation command of the CC #0 does not take effect for the CC #1. To be specific, the TCI-state #1, TCI-state #2, TCI-state #3, and TCI-state #4 of the CC #1 should not be deactivated.

For example, after step 830, the active TCI-states of the CC #1 include the TCI-state #1, TCI-state #2, TCI-state #3, TCI-state #4, TCI-state #5, TCI-state #6, TCI-state #7, and TCI-state #8.

It should be understood that the case 2 is used when it is assumed that a capability of the terminal device is met.

Case 3: A union set of a set of active TCI-states of the CC #0 and a set of previously activated TCI-states of the CC #1 is less than or equal to a capability of the terminal device.

To be specific, when TCI states of a plurality of CCs are updated by using a TCI activation command of one CC, a capability of the terminal device may be considered. For example, whether a TCI deactivation command of the first CC takes effect for the second CC or whether to deactivate an original TCI state of the second CC is determined depending on whether a union set of a set of active TCI states of the first CC and a set of previously activated TCI states of the second CC is less than or equal to the capability of the terminal device. When the union set of the set of active TCI states of the first CC and the set of previously activated TCI states of the second CC is less than or equal to the capability of the terminal device, the TCI deactivation command of the first CC does not take effect for the second CC, or the original TCI state of the second CC is not deactivated. Alternatively, it may be understood as that, in addition to the active TCI states of the CC #0, the active TCI states of the second CC further include original previously activated TCI states.

The set of active TCI states of the first CC may be carried in MAC-CE signaling (for example, the second MAC-CE signaling) in which R=1, and the MAC-CE signaling may also be considered as a deactivation command of the first CC. Information about the set of previously activated TCI states of the second CC may be from MAC-CE signaling (for example, the first MAC-CE signaling) in which R=0.

When whether the TCI deactivation command of the CC #0 takes effect on the CC #1 is determined, the capability of the terminal device further needs to be considered.

It is assumed that the terminal device can monitor a maximum of eight TCI-states on each CC, that is, a maximum of eight TCI-states can be activated on each CC.

It is assumed that in step 820, the previously activated TCI-states of the CC #1 include the TCI-state #1, TCI-state #2, TCI-state #3, TCI-state #4, TCI-state #5, TCI-state #6, and TCI-state #7.

The union set of the set of active TCI-states of the CC #0 and the set of previously activated TCI-states of the CC #1 includes eight TCI-states, namely, the TCI-state #1, TCI-state #2, TCI-state #3, TCI-state #4, TCI-state #5, TCI-state #6, TCI-state #7, and TCI-state #8. The union set of the set of active TCI-states of the CC #0 and the set of previously activated TCI-states of the CC #1 is equal to the capability of the terminal device. Therefore, the TCI deactivation command of the CC #0 does not take effect for the CC #1. To be specific, the TCI-state #1, TCI-state #2, TCI-state #3, and TCI-state #4 of the CC #1 should not be deactivated.

For example, after step 830, the active TCI-states of the CC #1 include the TCI-state #1, TCI-state #2, TCI-state #3, TCI-state #4, TCI-state #5, TCI-state #6, TCI-state #7, and TCI-state #8.

This embodiment of this application imposes no limitation on a case in which the union set of the set of active TCI-states of the CC #0 and the set of previously activated TCI-states of the CC #1 is greater than the capability of the terminal device. For example, some previously activated TCI-states of the CC #1 may be deactivated.

For example, it is assumed that in step 820, the previously activated TCI-states of the CC #1 include the TCI-state #0, TCI-state #1, TCI-state #2, TCI-state #3, TCI-state #4, TCI-state #5, TCI-state #6, and TCI-state #7.

The union set of the set of active TCI-states of the CC #0 and the set of previously activated TCI-states of the CC #1 includes nine TCI-states, namely, the TCI-state #0, TCI-state #1, TCI-state #2, TCI-state #3, TCI-state #4, TCI-state #5, TCI-state #6, TCI-state #7, and TCI-state #8. The union set of the set of active TCI-states of the CC #0 and the set of previously activated TCI-states of the CC #1 is greater than the capability of the terminal device. In this case, some previously activated TCI-states of the CC #1 may be deactivated.

For example, when it is ensured that the active TCI-states of the CC #1 include the active TCI-states of the CC #0, some previously activated TCI-states of the CC #1 are deactivated.

For example, after step 830, the active TCI-states of the CC #1 include the TCI-state #1, TCI-state #2, TCI-state #3, TCI-state #4, TCI-state #5, TCI-state #6, TCI-state #7, and TCI-state #8. Alternatively, after step 830, the active TCI-states of the CC #1 include the TCI-state #0, TCI-state #2, TCI-state #3, TCI-state #4, TCI-state #5, TCI-state #6, TCI-state #7, and TCI-state #8. Alternatively, after step 830, the active TCI-states of the CC #1 include the TCI-state #0, TCI-state #1, TCI-state #3, TCI-state #4, TCI-state #5, TCI-state #6, TCI-state #7, and TCI-state #8. Alternatively, after step 830, the active TCI-states of the CC #1 include the TCI-state #0, TCI-state #1, TCI-state #2, TCI-state #4, TCI-state #5, TCI-state #6, TCI-state #7, and TCI-state #8. Alternatively, after step 830, the active TCI-states of the CC #1 include the TCI-state #0, TCI-state #1, TCI-state #2, TCI-state #3, TCI-state #5, TCI-state #6, TCI-state #7, and TCI-state #8.

The foregoing describes an example in which original TCI states of a plurality of CCs (for example, the CC #0 and the CC #1) may be deactivated by using one piece of signaling (for example, the second MAC-CE signaling). In the foregoing three cases, the TCI deactivation command of the CC #0 does not take effect for the CC #1.

In the method 800, for a manner in which TCI states of a plurality of CCs may be activated by using one piece of signaling, refer to the descriptions in the method 500 to the method 700. Details are not described herein again.

Optionally, the terminal device may report one or more of the following capabilities by using a terminal capability:

whether the terminal device supports simultaneously activating, for a plurality of CCs/BWPs, a TCI state of one or more PDSCHs by using one piece of signaling;

whether the terminal device supports simultaneously deactivating, for a plurality of CCs/BWPs, a TCI state of one or more PDSCHs by using one piece of signaling;

whether the terminal device supports simultaneously updating, for a plurality of CCs/BWPs, a TCI state of one or more PDSCHs by using one piece of signaling;

a quantity, supported by the terminal device, of CCs/BWPs for which PDSCH TCI states are activated/deactivated;

a quantity, supported by the terminal device, of CCs/BWPs for which PDCCH TCIs are updated;

an identifier, supported by the terminal device, of a CC/BWP for which a PDSCH TCI state is activated/deactivated;

an identifier, supported by the terminal device, of a CC/BWP for which a PDCCH TCI is updated;

whether the terminal device simultaneously supports two modes: one mode in which one piece of signaling is used to activate/deactivate a PDSCH TCI state only for a CC/BWP indicated in the signaling, and the other mode in which one piece of signaling is used to activate/deactivate PDSCH TCI states for a plurality of CCs/BWPs; or whether the terminal device simultaneously supports two modes: one mode in which one piece of signaling is used to update a PDCCH TCI only for a CC/BWP indicated in the signaling, and the other mode in which one piece of signaling is used to update PDCCH TCIs for a plurality of CCs/BWPs.

Optionally, the terminal device may alternatively notify the network device of one or more of the foregoing information in an implicit manner. For example, a notification manner includes but is not limited to implicitly notifying the network device by reporting messages, for example, a quantity of CCs/BWPs supported by the terminal device, whether the terminal device supports a multi-transmission-point transmission mode, and the terminal device supports the multi-transmission-point mode on which CCs/BWPs.

Optionally, the network device may notify one or more of the following configurations by using RRC signaling:

whether a current working mode of signaling is a mode in which one piece of signaling is used to activate/deactivate a PDSCH TCI state only for a CC/BWP indicated in the signaling, or a mode in which one piece of signaling is used to activate/deactivate PDSCH TCI states for a plurality of CCs/BWPs;

whether a current working mode of signaling is a mode in which one piece of signaling is used to update a PDCCH TCI only for a CC/BWP indicated in the signaling, or a mode in which one piece of signaling is used to update PDCCH TCIs for a plurality of CCs/BWPs;

which CCs/BWPs may be in the mode in which one piece of signaling is used to activate/deactivate PDSCH TCI states for a plurality of CCs/BWPs;

which CCs/BWPs are not allowed to be in the mode in which one piece of signaling is used to activate/deactivate PDSCH TCI states for a plurality of CCs/BWPs;

which CCs/BWPs may be in the mode in which one piece of signaling is used to update PDCCH TCIs for a plurality of CCs/BWPs; or which CCs/BWPs are not allowed to be in the mode in which one piece of signaling is used to update PDCCH TCIs for a plurality of CCs/BWPs.

Optionally, the network device may alternatively notify the terminal device of one or more of the foregoing information in an implicit manner. For example, the implicit manner includes but is not limited to implicitly notifying the terminal device by using messages, for example, whether a current working mode is the multi-transmission-point mode, and the network device performs multi-transmission-point transmission on which CCs/BWPs.

In this embodiment of this application, one piece of signaling may be used to simultaneously activate/deactivate PDSCH TCI states or update PDCCH TCIs for a plurality of CCs/BWPs. For the plurality of CCs/BWPs, at least the following several optional solutions may be included.

Optionally, when one piece of signaling is used to simultaneously activate/deactivate PDSCH TCI states or update PDCCH TCIs for a plurality of CCs/BWPs, a CC/BWP on which multi-transmission-point transmission is performed is excluded.

Optionally, when one piece of signaling is used to simultaneously activate/deactivate PDSCH TCI states or update PDCCH TCIs for a plurality of CCs/BWPs, an inactive CC/BWP is excluded.

Optionally, when one piece of signaling is used to simultaneously activate/deactivate PDSCH TCI states for a plurality of CCs/BWPs, the activation/deactivation is performed for a CC/BWP on which transmission is performed by a transmission reception point that sends the signaling; or the activation/deactivation is performed for a CC/BWP on which transmission is performed by a transmission reception point indicated by the signaling.

Optionally, when one piece of signaling is used to simultaneously update PDCCH TCIs for a plurality of CCs/BWPs, the updating is performed for a CC/BWP on which transmission is performed by a transmission reception point that sends the signaling; or the updating is performed for a CC/BWP on which transmission is performed by a transmission reception point indicated by the signaling.

Optionally, an association relationship between a transmission reception point and a TCI state may be pre-stored. For example, the network device configures the association relationship between a transmission reception point and a TCI state. For example, when one piece of signaling is used to simultaneously activate/deactivate PDSCH TCI states for a plurality of CCs/BWPs, a TCI state associated with a transmission reception point that sends the signaling is updated, or a TCI state associated with a transmission reception point indicated by the signaling is updated. For another example, when one piece of signaling is used to simultaneously update PDCCH TCIs for a plurality of CCs/BWPs, a TCI state associated with a transmission reception point that sends the signaling is updated, or a TCI state associated with a transmission reception point indicated by the signaling is updated.

Optionally, when TCI states of a plurality of CCs are updated by using a TCI activation/deactivation command of one CC, whether to activate/deactivate an original TCI state of the second CC may be determined depending on whether a set of configured/previously activated TCI states of the first CC is the same as a set of configured/previously activated TCI states of the second CC.

That the set of configured/previously activated TCI states of the first CC is the same as the set of configured/previously activated TCI states of the second CC may represent that TCI state IDs in the set of configured/previously activated TCI states of the first CC are the same as or associated with TCI state IDs in the set of configured/previously activated TCI states of the second CC, or may represent that reference signal resources in the TCI states in the set of the first CC are the same as or associated with reference signal resources in the TCI states in the set of the second CC.

Optionally, when PDCCH TCIs of a plurality of CCs are updated by using a PDCCH TCI update command of one CC, whether to update an original PDCCH TCI of the second CC may be determined depending on whether the set of configured/previously activated TCI states of the first CC is the same as the set of configured/previously activated TCI states of the second CC, or depending on whether a set of configured/selected PDCCH TCI states is the same as a set of configured/selected TCI states of the second CC.

That the set of configured/previously activated TCI states of the first CC is the same as the set of configured/previously activated TCI states of the second CC may represent that TCI state IDs in the set of configured/previously activated TCI states of the first CC are the same as TCI state IDs in the set of configured/previously activated TCI states of the second CC, or may represent that reference signal resources in the TCI states in the set of the first CC are the same as reference signal resources in the TCI states in the set of the second CC.

That the set of configured/selected PDCCH TCI states of the first CC is the same as the set of configured/selected PDCCH TCI states of the second CC may represent that TCI state IDs in the set of configured/selected PDCCH TCI states of the first CC are the same as or associated with TCI state IDs in the set of configured/selected PDCCH TCI states of the second CC, or may represent that reference signal resources in the TCI states in the set of the first CC are the same as or associated with reference signal resources in the TCI states in the set of the second CC.

For ease of understanding, the following describes, by using an example, a solution related to multi-point transmission.

Optionally, the terminal device may be notified of a related mode by using higher layer signaling. For example, the terminal device is notified that a transmission mode is a multi-transmission-point transmission mode or a single-transmission-point transmission mode. It is assumed that the higher layer signaling is denoted as a CORESETPoolIndex, and the CORESETPoolIndex is associated with a CORESET. It should be understood that naming of the signaling does not limit the protection scope of the embodiments of this application. In a future protocol, all names used to represent a same function are applicable to the embodiments of this application. The following uses a CORESETPoolIndex as an example.

For example, a CORESETPoolIndex value may be 0, or may be 1.

For example, a CORESET whose CORESETPoolIndex is equal to 0 and data scheduled by the CORESET may be considered to be sent/received by a first transmission reception point, and a CORESET whose CORESETPoolIndex is equal to 1 and data scheduled by the CORESETPoolIndex may be considered to be sent/received by a second transmission reception point. For another example, a CORESET whose CORESETPoolIndex is equal to 1 and data scheduled by the CORESET may be considered to be sent/received by a first transmission reception point, and a CORESET whose CORESETPoolIndex is equal to 0 and data scheduled by the CORESETPoolIndex may be considered to be sent/received by a second transmission reception point.

It should be understood that the first transmission reception point and the second transmission reception point are only names for differentiation, and do not constitute any limitation on the protection scope of the embodiments of this application.

Optionally, it may be simply considered that the CORESETPoolIndex value is an identifier of a transmission reception point.

Optionally, the transmission mode may be implicitly indicated by using a CORESETPoolIndex. For example, when the network device configures more than one CORESETPoolIndex value (for example, two CORESETPoolIndex values) for the terminal device, it indicates that the multi-transmission-point mode is enabled.

The following uses MAC-CE signaling as an example for description with reference to two different formats applicable to the MAC-CE signaling.

Format 1: a signaling format based on Rel-15 or similar to Rel-15, for example, the signaling format shown in FIG. 3.

In a case, if more than one CORESETPoolIndex value is configured by using higher layer signaling, a transmission reception point for which the MAC-CE signaling is used may be determined by using a reserved field.

It may be understood that, when the multi-transmission-point mode is enabled, a transmission reception point for which the MAC-CE signaling is used may be determined based on an indication of an R bit.

For example, when R=0, the MAC-CE signaling is used for the first transmission reception point. When R=1, the MAC-CE signaling is used for the second transmission reception point. Alternatively, when R=1, the MAC-CE signaling is used for the first transmission reception point. When R=0, the MAC-CE signaling is used for the second transmission reception point.

In another case, if no CORESETPoolIndex is configured by using higher layer signaling, whether the MAC-CE signaling is used for a single CC or a plurality of CCs may be determined by using a reserved field.

It may be understood that, when the single-transmission-point mode is enabled, whether the MAC-CE signaling is used for a single CC or a plurality of CCs may be determined based on an indication of an R bit.

For example, when R=0, the MAC-CE signaling is used for the first CC. When R=1, the MAC-CE signaling is used for the first CC and the second CC. Alternatively, when R=1, the MAC-CE signaling is used for the first CC. When R=0, the MAC-CE signaling is used for the first CC and the second CC.

It should be understood that the foregoing "MAC-CE signaling is used for" represents that the MAC-CE signaling is used for one or more of the following functions: activating a TCI-state, deactivating a TCI-state, indicating a mapping relationship between an active TCI-state and a TCI field value in DCI, or the like.

In this embodiment of this application, when the foregoing format 1 is used, the terminal device may determine a function of the MAC-CE signaling based on an indication of the network device about the multi-transmission-point mode.

For example, in the case of multi-transmission-point transmission, the MAC-CE signaling is applicable to a function of notifying an active TCI-state and a mapping relationship of each transmission reception point. Alternatively, it may be understood that, in the case of multi-transmission-point transmission, the MAC-CE signaling is not applicable to a function of notifying to simultaneously perform updating for the first CC and the second CC, or it may be understood that the MAC-CE signaling is a specific implementation of the foregoing excluding a CC/BWP on which multi-transmission-point transmission is performed.

In addition, as described above, if only one CORESETPoolIndex value is configured by using higher layer signaling, for example, CORESETPoolIndex=0 or CORESETPoolIndex=1, it may be considered that only one transmission reception point serves the terminal device. Therefore, the foregoing method for the single-transmission-point mode may still be used. For example, when R=0, the MAC-CE signaling is used for the first CC. When R=1, the MAC-CE signaling is used for the first CC and the second CC.

Optionally, considering that the network device may temporarily use only the single-transmission-point mode, the foregoing method for the multi-transmission-point mode may still be used. For example, when R=0, the MAC-CE signaling is used for the first transmission reception point. When R=1, the MAC-CE signaling is used for the second transmission reception point.

Figures 9, 10:
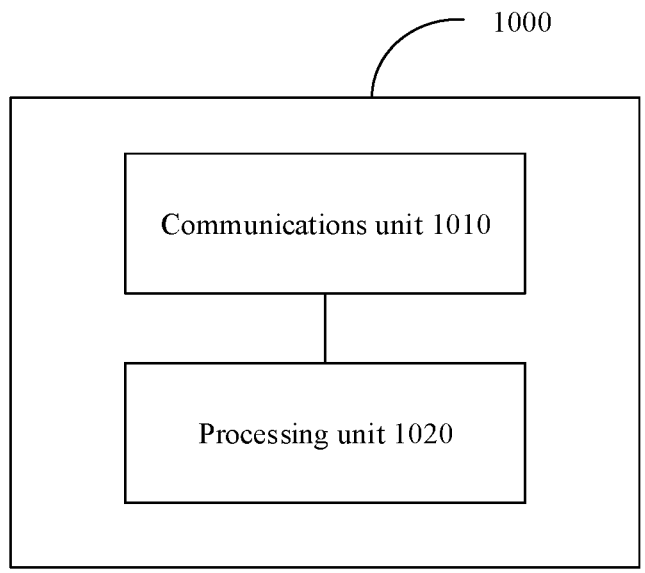
FIG. 9 is a schematic diagram of a format of a MAC-CE applicable to an embodiment of this application.
FIG. 10 is a schematic block diagram of a communications apparatus according to an embodiment of this application.

Format 2: a signaling format based on Rel-16 or similar to Rel-16, for example, a signaling format shown in FIG. 9.

In this format, a plurality of possible implementations may be included. For ease of understanding, two modes are first defined: a first mode and a second mode.

(1) First Mode

The first mode, which may also be referred to as a single-DCI mode, represents that two TCI-state IDs are allowed to be mapped to a same TCI field value in DCI.

Signaling shown in FIG. 9 is used as an example. TCI-states whose TCI-state IDs have subscripts (N,1) and (N,2) are mapped to a TCI field value N in DCI, where N is an integer greater than or equal to 0.

(2) Second Mode

The second mode, which may also be referred to as a multi-DCI mode, represents that two TCI-state IDs are not allowed to be mapped to a same TCI field value in DCI.

Signaling shown in FIG. 9 is used as an example. A TCI-state whose TCI-state ID has a subscript (N,1) is mapped to a TCI field value N in DCI of the first transmission reception point, and a TCI-state whose TCI-state ID has a subscript (N,2) is mapped to a TCI field value N in DCI of the second transmission reception point.

For example, a TCI-state whose TCI-state ID has a subscript (i,1) is mapped to a TCI field value in the DCI of the first transmission reception point. All TCI-states whose TCI-state ID has the subscript (i,1) are mapped to the TCI field value in the DCI based on a value of i or based on values of the TCI-state IDs. For another example, a TCI-state whose TCI-state ID has a subscript (j,2) is mapped to a TCI field value in the DCI of the second transmission reception point. All TCI-states whose TCI-state ID has the subscript (j,2) are mapped to the TCI field value in the DCI based on a value of j or values of the TCI-state IDs. i and j are integers greater than or equal to 0.

The foregoing briefly describes the two modes. It should be understood that the foregoing two modes are defined only for ease of understanding, and do not constitute a limitation on the protection scope of the embodiments of this application.

The following describes several possible implementations in the format 2.

Implementation 1: A mapping relationship of the first mode and a mapping relationship of the second mode may be distinguished between by using a preset field R bit.

For example, if more than one CORESETPoolIndex value is configured by using higher layer signaling, when R=0, it may represent that the MAC-CE signaling is used to notify the mapping relationship of the first mode; or when R=1, it may represent that the MAC-CE signaling is used to notify the mapping relationship of the second mode. Alternatively, when R=1, it may represent that the MAC-CE signaling is used to notify the mapping relationship of the first mode; or when R=0, it may represent that the MAC-CE signaling is used to notify the mapping relationship of the second mode.

Implementation 2: The mapping relationship of the first mode and the mapping relationship of the second mode may be distinguished between by using a quantity of CORESETPoolIndex values.

For example, if more than one CORESETPoolIndex value is configured by using higher layer signaling, the MAC-CE signaling may be used to notify the mapping relationship of the first mode. If one CORESETPoolIndex value or no CORESETPoolIndex value is configured by using higher layer signaling, the MAC-CE signaling may be used to notify the mapping relationship of the second mode.

Implementation 3: Whether the MAC-CE signaling is used for the mapping relationship of the first mode or the mapping relationship of the second mode may be distinguished by using a quantity of CORESETPoolIndex values. In addition, whether the MAC-CE signaling is applicable to a single CC or may be simultaneously used for a plurality of CCs (for example, the first CC and the second CC) may be distinguished by using a reserved field.

For example, if more than one CORESETPoolIndex value is configured by using higher layer signaling, when R=0, the MAC-CE signaling may be used to notify the mapping relationship of the first mode and used for a single CC, for example, the first CC; or when R=1, the MAC-CE signaling may be used to notify the mapping relationship of the first mode and used for a plurality of CCs, for example, the first CC and the second CC.

For another example, if one CORESETPoolIndex value or no CORESETPoolIndex is configured by using higher layer signaling, when R=0, the MAC-CE signaling may be used to notify the mapping relationship of the second mode and used for a single CC, for example, the first CC; or when R=1, the MAC-CE signaling may be used to notify the mapping relationship of the second mode and used for a plurality of CCs, for example, the first CC and the second CC.

Based on the implementation 3, whether the MAC-CE signaling is used for the mapping relationship of the first mode or the mapping relationship of the second mode may be distinguished by relying on the quantity of CORESETPoolIndex values. In addition, whether the MAC-CE signaling is applicable to a single CC or may be simultaneously used for a plurality of CCs (for example, the first CC and the second CC) may be distinguished by using an R bit. It may be understood that, the method may also be considered as a specific implementation of the foregoing excluding a CC/BWP on which multi-transmission-point transmission is performed.

Implementation 4: Whether the MAC-CE signaling is used for the mapping relationship of the first mode or the mapping relationship of the second mode may be distinguished by using a reserved field. In addition, whether the MAC-CE signaling is applicable to a single CC or may be simultaneously used for a plurality of CCs (for example, the first CC and the second CC) may be distinguished by using a quantity of CORESETPoolIndex values.

For example, if more than one CORESETPoolIndex value is configured by using higher layer signaling, when R=0, the MAC-CE signaling may be used to notify the mapping relationship of the first mode and used for a single CC, for example, the first CC; or when R=1, the MAC-CE signaling may be used to notify the mapping relationship of the second mode and used for a single CC, for example, the first CC.

For another example, if one CORESETPoolIndex value or no CORESETPoolIndex is configured by using higher layer signaling, when R=0, the MAC-CE signaling may be used to notify the mapping relationship of the first mode and used for a plurality of CCs, for example, the first CC and the second CC; or when R=1, the MAC-CE signaling may be used to notify the mapping relationship of the second mode and used for a plurality of CCs, for example, the first CC and the second CC.

Based on the implementation 4, whether the MAC-CE signaling is applicable to a single CC or may be simultaneously used for a plurality of CCs (for example, the first CC and the second CC) may be distinguished by relying on the quantity of CORESETPoolIndex values. In addition, whether the MAC-CE signaling is used for the mapping relationship of the first mode or the mapping relationship of the second mode may be distinguished by using an R bit. It may be understood that, the method may also be considered as a specific implementation of the foregoing excluding a CC/BWP on which multi-transmission-point transmission is performed.

It should be understood that the foregoing listed implementations are merely examples for description, and this embodiment of this application is not limited thereto.

Optionally, the format shown in FIG. 9 is used as an example. Only a TCI-state ID corresponding to a TCI-state ID subscript i,1 or i,2 may be activated.

In an example, it may be considered that i,1 and i,2 respectively correspond to the first transmission reception point and the second transmission reception point. Therefore, whether to activate the TCI-state $ID_{i,1}$ or the TCI-state $ID_{i,2}$ may be distinguished based on a transmission reception point that sends the MAC-CE signaling. For example, the MAC-CE signaling sent by the first transmission reception point is used to update a TCI-state of the first transmission reception point, namely, the TCI-state $ID_{i,1}$. For another example, a TCI-state of the second transmission reception point, namely, the TCI-state $ID_{i,2}$ is updated by using the MAC-CE signaling sent by the second transmission reception point.

In another example, it may be considered that i,1 and i,2 respectively correspond to a first antenna panel and a second antenna panel of the terminal device, and whether to activate the TCI-state III,' or the TCI-state $ID_{i,2}$ is distinguished based on an antenna panel that receives the MAC-CE signaling. For example, a TCI-state of the first antenna panel, namely, the TCI-state is updated by using MAC-CE signaling received by the first antenna panel. For another example, a TCI-state of the second antenna panel, namely, the TCI-state $ID_{i,2}$, is updated by using MAC-CE signaling received by the second antenna panel.

It should be understood that the foregoing two examples are merely examples for description. This is not limited in the embodiments of this application.

It should be further understood that, in the format 1 and the format 2, R=0 and R=1, or that more than one CORESETPoolIndex value is configured and that one CORESETPoolIndex value or no CORESETPoolIndex value is configured are only for distinguishing between different representation meanings, and this is not limited in the embodiments of this application. For example, the implementation 3 is used as an example. If more than one CORESETPoolIndex value is configured by using higher layer signaling, when R=0, the MAC-CE signaling may be used to notify the mapping relationship of the first mode and used for a single CC, for example, the first CC; or when R=1, the MAC-CE signaling may be used to notify the mapping relationship of the first mode and used for a plurality of CCs, for example, the first CC and the second CC. Alternatively, if more than one CORESETPoolIndex value is configured by using higher layer signaling, when R=1, the MAC-CE signaling may be used to notify the mapping relationship of the first mode and used for a single CC, for example, the first CC; or when R=0, the MAC-CE signaling may be used to notify the mapping relationship of the first mode and used for a plurality of CCs, for example, the first CC and the second CC.

With reference to the two possible formats of the MAC-CE signaling, the foregoing describes in detail a possible manner in which the terminal device determines whether the multi-transmission-point mode is enabled, and provides detailed descriptions in which each transmission reception point may be responsible for updating a mapping relationship that is from a TCI-state to a DCI field in the DCI and that corresponds to the transmission reception point, so that impact on transmission performance can be reduced.

Based on the foregoing technical solution, when TCI states of a plurality of CCs are updated by using a TCI activation command of one CC, whether to deactivate an original TCI state of the second CC may be determined depending on whether a set of active TCI states of the first CC is a subset of a set of previously activated TCI states of the second CC. Alternatively, whether to deactivate an original TCI state of the second CC may be determined depending on whether there is an intersection set between a set of active TCI states of the first CC and a set of previously activated TCI states of the second CC. Alternatively, whether to deactivate an original TCI state of the second CC is determined by considering a capability of the terminal device, for example, considering whether a union set of a set of active TCI states of the first CC and a set of previously activated TCI states of the second CC is less than or equal to the capability of the terminal device. When the set of active TCI states of the first CC is a subset of the set of previously activated TCI states of the second CC, or when there is an intersection set between the set of active TCI states of the first CC and the set of previously activated TCI states of the second CC, or when the union set of the set of active TCI states of the first CC and the set of previously activated TCI states of the second CC is less than or equal to the capability of the terminal device, the original TCI state of the second CC is not deactivated. In this manner, when configurations of the TCI states are simultaneously updated for the plurality of CCs, impact of deactivation signaling on a TCI state of another CC is considered, and within a range of the capability of the terminal device, a relatively large quantity of active TCI states are included, to avoid an incorrect deactivation operation and ensure communication performance.

The embodiments described in this specification may be independent solutions, or may be combined based on internal logic. These solutions all fall within the protection scope of this application.

It may be understood that in the foregoing method embodiments, a method implemented by the terminal device may alternatively be implemented by a component (for example, a chip or a circuit) that may be used in the terminal, and a method implemented by the network device may alternatively be implemented by a component (for example, a chip or a circuit) that may be used in the network device.

The methods provided in the embodiments of this application are described above in detail with reference to FIG. 5 to FIG. 9. Communications apparatuses provided in the embodiments of this application are described below in detail with reference to FIG. 10 to FIG. 13. It should be understood that descriptions of the apparatus embodiments correspond to the descriptions of the method embodiments. Therefore, for content that is not described in detail, refer to the foregoing method embodiments. For brevity, details are not described herein again.

The foregoing mainly describes the solutions provided in the embodiments of this application from a perspective of interaction between network elements. It may be understood that, to implement the foregoing function, each network element, such as a transmit end device or a receive end device, includes a corresponding hardware structure and/or software module for performing each function. A person skilled in the art may be aware that units and algorithm steps in the examples described with reference to the embodiments disclosed in this specification can be implemented by electronic hardware or a combination of computer software and electronic hardware. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, a transmit end device or a receive end device may be divided into functional modules based on the foregoing method examples. For example, the transmit end device or the receive end device may be divided into functional modules corresponding to functions, or two or more functions may be integrated into one processing module. The integrated module may be implemented in a form of hardware, or may be implemented in a form of a software functional module. It should be noted that, in the embodiments of this application, module division is an example, and is merely logical function division. During actual implementation, another division manner may be used. An example in which functional modules are obtained through division based on functions is used below for description.

FIG. 10 is a schematic block diagram of a communications apparatus according to an embodiment of this application. As shown in the figure, the communications apparatus 1000 may include a communications unit 1010 and a processing unit 1020. The communications unit 1010 may communicate with the outside, and the processing unit 1020 is configured to process data. The communications unit 1010 may also be referred to as a communications interface or a transceiver unit. The communications interface is configured to input and/or output information, and the information includes at least one of instructions and data. Optionally, the communications apparatus may be a chip or a chip system. When the communications apparatus is a chip or a chip system, the communications interface may be an input/output interface, an interface circuit, an output circuit, an input circuit, a pin, a related circuit, or the like on the chip or the chip system. The processor may alternatively be embodied as a processing circuit or a logic circuit.

In a possible design, the communications apparatus 1000 may implement a step or a procedure performed by the terminal device in the foregoing method embodiments, for example, may be the terminal device, or a chip, a chip system, or a circuit configured in the terminal device. In this case, the communications apparatus 1000 may be referred to as a terminal device. The communications unit 1010 is configured to perform a sending/receiving-related operation on a terminal device side in the foregoing method embodiments, and the processing unit 1020 is configured to perform a processing-related operation of the terminal device in the foregoing method embodiments.

In a possible implementation, the communications unit 1010 is configured to receive beam update information of a first component carrier (CC). The processing unit 1020 is configured to update beam information of one or more second CCs and beam information of the first CC based on the beam update information of the first CC, where the one or more second CCs are associated with the first CC.

Optionally, the communications unit 1010 is further configured to receive beam configuration information and indication information of the first CC, where the indication information is used to indicate that the one or more second CCs are associated with the first CC.

Optionally, that the one or more second CCs are associated with the first CC includes: The one or more second CCs and the first CC use a same beam configuration.

Optionally, the communications unit 1010 is further configured to receive information about a time-frequency tracking reference signal resource configured for the first CC and information about a time-frequency tracking reference signal resource configured for the one or more second CCs; and the processing unit 1020 is configured to update beam information of the time-frequency tracking reference signal resource of the one or more second CCs based on the beam update information of the first CC.

Optionally, the beam update information of the first CC includes information about an active transmission configuration indicator (TCI) state TCI-state of the first CC; and the processing unit 1020 is configured to activate a TCI-state of the one or more second CCs and a TCI-state of the first CC, where an active TCI-state of the one or more second CCs is the same as an active TCI-state of the first CC.

Optionally, the processing unit 1020 is specifically configured to update a mapping relationship, of the one or more second CCs, between a TCI-state identifier TCI-state ID and a TCI field value and a mapping relationship, of the first CC, between a TCI-state ID and a TCI field value, where an updated mapping relationship, of the one or more second CCs, between a TCI-state ID and a TCI field value is the same as an updated mapping relationship, of the first CC, between a TCI-state ID and a TCI field value.

Optionally, the beam update information of the first CC includes information about an active TCI-state of the first CC; and the processing unit 1020 is configured to update a spatial relationship of the one or more second CCs, where an updated spatial relationship of the one or more second CCs is associated with the active TCI-state of the first CC.

Optionally, the beam update information of the first CC includes information about a reference signal resource corresponding to an active TCI-state of the first CC; and the processing unit 1020 is configured to update a reference signal resource corresponding to an active TCI-state of the one or more second CCs and a reference signal resource corresponding to an active TCI-state of the first CC, where an updated reference signal resource corresponding to the active TCI-state of the one or more second CCs is the same as an updated reference signal resource corresponding to the active TCI-state of the first CC.

Optionally, that the one or more second CCs are associated with the first CC includes one or more of the following: the active TCI-state of the one or more second CCs is the same as the active TCI-state of the first CC; or a reference signal resource included in the active TCI-state of the one or more second CCs is the same as the reference signal resource included in the active TCI-state of the first CC; or a reference signal resource identifier (ID) included in the active TCI-state of the one or more second CCs is associated with an ID of the first CC and a reference signal resource ID included in the active TCI-state of the first CC; or the one or more second CCs have a quasi-co-location (QCL) relationship with the first CC; or the one or more second CCs use a beam training result of the first CC, where beam management is performed on the first CC.

Optionally, the beam update information of the first CC is carried in medium access control-control element (MAC-CE) signaling, and a reserved field in the MAC-CE signaling can be used to indicate whether to update the beam information of the one or more second CCs and the beam information of the first CC based on the beam update information of the first CC.

The communications apparatus 1000 may implement a step or a procedure performed by the terminal device in the method 500 to the method 800 according to the embodiments of this application. The communications apparatus 1000 may include a unit configured to perform a method performed by the terminal device in the method 500 in FIG. 5, the method 600 in FIG. 6, the method 700 in FIG. 7, or the method 800 in FIG. 8. In addition, the units in the communications apparatus 1000 and the foregoing other operations and/or functions are intended to implement corresponding procedures of the method 500 in FIG. 5, the method 600 in FIG. 6, the method 700 in FIG. 7, or the method 800 in FIG. 8.

When the communications apparatus 1000 is configured to perform the method 500 in FIG. 5, the communications unit 1010 may be configured to perform step 510 in the method 500, and the processing unit 1020 may be configured to perform step 520 in the method 500.

When the communications apparatus 1000 is configured to perform the method 600 in FIG. 6, the communications unit 1010 may be configured to perform step 610, step 620, and step 640 in the method 600, and the processing unit 1020 may be configured to perform step 630 in the method 600.

When the communications apparatus 1000 is configured to perform the method 700 in FIG. 7, the communications unit 1010 may be configured to perform step 710, step 720, and step 740 in the method 700, and the processing unit 1020 may be configured to perform step 730 in the method 700.

When the communications apparatus 1000 is configured to perform the method 800 in FIG. 8, the communications unit 1010 may be configured to perform step 810, step 820, and step 830 in the method 800.

It should be understood that a specific process in which the units perform the foregoing corresponding steps is described in detail in the foregoing method embodiments. For brevity, details are not described herein again.

Figure 12:
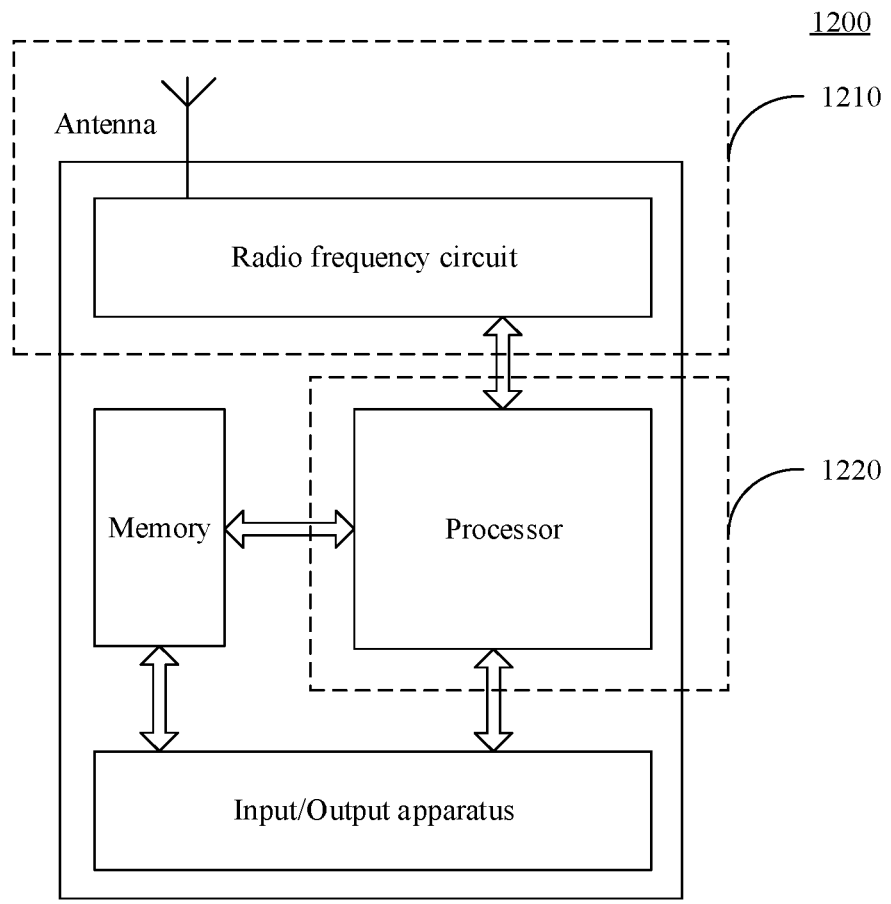
FIG. 12 is a schematic block diagram of a terminal device according to an embodiment of this application.

It should be further understood that the communications unit 1010 in the communications apparatus 1000 may be implemented by using a transceiver unit 1210 in a terminal device 1200 shown in FIG. 12, and the processing unit 1020 in the communications apparatus 1000 may be implemented by using a processor 1220 in the terminal device 1200 shown in FIG. 12. The transceiver may include a transmitter and/or a receiver, to respectively implement functions of a sending unit and a receiving unit.

It should be further understood that the communications unit 1010 in the communications apparatus 1000 may alternatively be an input/output interface.

In another possible design, the communications apparatus 1000 may implement a step or a procedure performed by the network device in the foregoing method embodiments, for example, may be the network device, or a chip, a chip system, or a circuit configured in the network device. In this case, the communications apparatus 1000 may be referred to as a network device. The communications unit 1010 is configured to perform a sending/receiving-related operation on a network device side in the foregoing method embodiments, and the processing unit 1020 is configured to perform a processing-related operation of the network device in the foregoing method embodiments.

The communications apparatus 1000 may implement a step or a procedure performed by the network device in the method 500 to the method 800 according to the embodiments of this application. The communications apparatus 1000 may include a unit configured to perform a method performed by the network device in the method 500 in FIG. 5, the method 600 in FIG. 6, the method 700 in FIG. 7, or the method 800 in FIG. 8. In addition, the units in the communications apparatus 1000 and the foregoing other operations and/or functions are intended to implement corresponding procedures of the method 500 in FIG. 5, the method 600 in FIG. 6, the method 700 in FIG. 7, or the method 800 in FIG. 8.

When the communications apparatus 1000 is configured to perform the method 500 in FIG. 5, the communications unit 1010 may be configured to perform step 510 in the method 500.

When the communications apparatus 1000 is configured to perform the method 600 in FIG. 6, the communications unit 1010 may be configured to perform step 610, step 620, and step 640 in the method 600.

When the communications apparatus 1000 is configured to perform the method 700 in FIG. 7, the communications unit 1010 may be configured to perform step 710, step 720, and step 740 in the method 700.

When the communications apparatus 1000 is configured to perform the method 800 in FIG. 8, the communications unit 1010 may be configured to perform step 810, step 820, and step 830 in the method 800.

It should be understood that a specific process in which the units perform the foregoing corresponding steps is described in detail in the foregoing method embodiments. For brevity, details are not described herein again.

Figure 13:
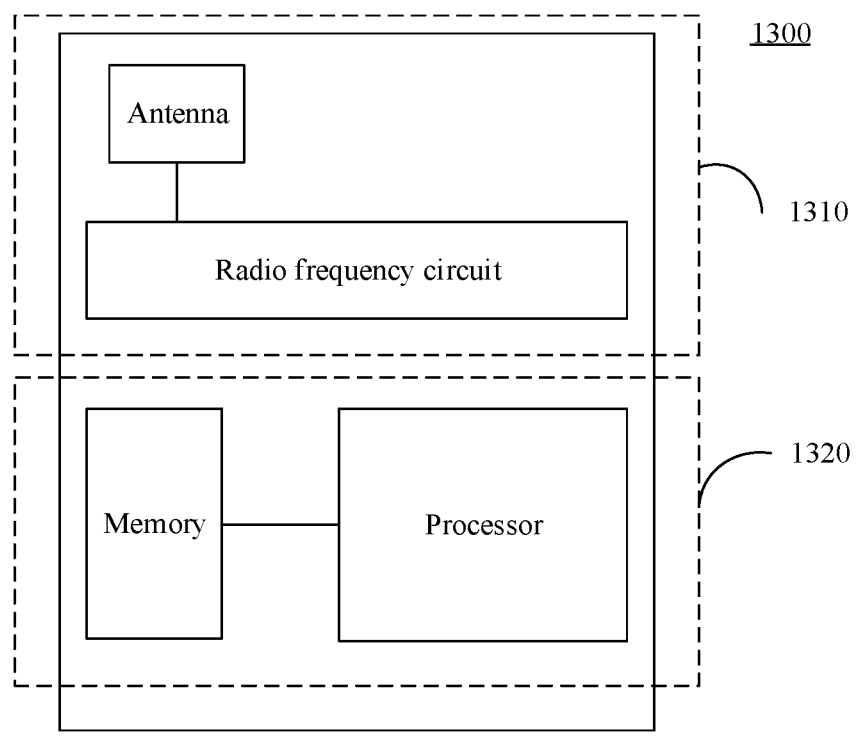
FIG. 13 is a schematic block diagram of a network device according to an embodiment of this application.

It should be further understood that the communications unit 1010 in the communications apparatus 1000 may be implemented by using a transceiver unit 1310 in a network device 1300 shown in FIG. 13, and the processing unit 1020 in the communications apparatus 1000 may be implemented by using a processor in the network device 1300 shown in FIG. 13.

It should be further understood that the communications unit 1010 in the communications apparatus 1000 may alternatively be an input/output interface. The transceiver may include a transmitter and/or a receiver, to respectively implement functions of a sending unit and a receiving unit.

Figure 11:
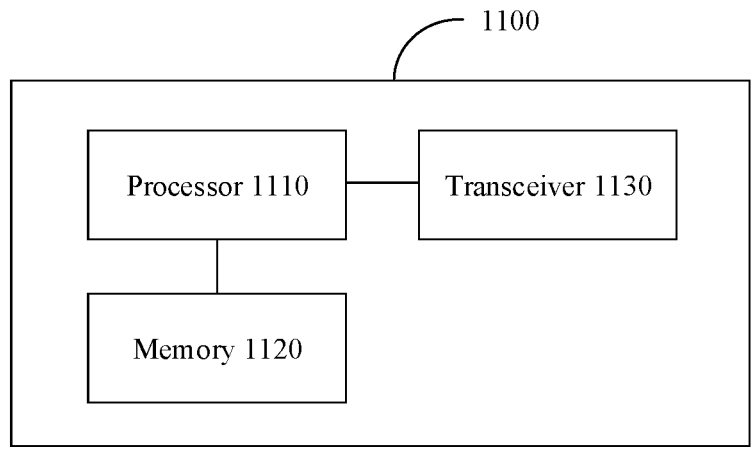
FIG. 11 is another schematic block diagram of a communications apparatus according to an embodiment of this application.

FIG. 11 is another schematic block diagram of a communications apparatus 1100 according to an embodiment of this application. As shown in the figure, the communications apparatus 1100 includes a processor 1110, a memory 1120, and a transceiver 1130. The memory 1120 stores a program. The processor 1110 is configured to execute the program stored in the memory 1120, and the execution of the program stored in the memory 1120 enables the processor 1110 to perform processing-related steps in the foregoing method embodiments, and enables the processor 1110 to control the transceiver 1130 to perform a sending/receiving-related step in the foregoing method embodiments.

In an implementation, the communications apparatus 1100 is configured to perform an action performed by the terminal device in the foregoing method embodiments. In this case, the execution of the program stored in the memory 1120 enables the processor 1110 to perform processing steps on a terminal device side in the foregoing method embodiments, and enables the processor 1110 to control the transceiver 1130 to perform receiving and sending steps on the terminal device side in the foregoing method embodiments.

In another implementation, the communications apparatus 1100 is configured to perform an action performed by the network device in the foregoing method embodiments. In this case, the execution of the program stored in the memory 1120 enables the processor 1110 to perform processing steps on a network device side in the foregoing method embodiments, and enables the processor 1110 to control the transceiver 1130 to perform receiving and sending steps on the network device side in the foregoing method embodiments.

An embodiment of this application further provides a communications apparatus 1200. The communications apparatus 1200 may be a terminal device or a chip. The communications apparatus 1200 may be configured to perform an action performed by the terminal device in the foregoing method embodiments.

When the communications apparatus 1200 is a terminal device, FIG. 12 is a simplified schematic structural diagram of the terminal device. As shown in FIG. 12, the terminal device includes a processor, a memory, a radio frequency circuit, an antenna, and an input/output apparatus. The processor is mainly configured to: process a communications protocol and communications data, control the terminal device, execute a software program, process data of the software program, and so on. The memory is mainly configured to store the software program and data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus such as a touchscreen, a display, or a keyboard is mainly configured to receive data entered by a user and output data to the user. It should be noted that some types of terminal devices may have no input/output apparatus.

When data needs to be sent, after performing baseband processing on the to-be-sent data, the processor outputs a baseband signal to the radio frequency circuit; and the radio frequency circuit performs radio frequency processing on the baseband signal and then sends a radio frequency signal to the outside in a form of an electromagnetic wave by using the antenna. When data is sent to the terminal device, the radio frequency circuit receives the radio frequency signal by using the antenna, converts the radio frequency signal into a baseband signal, and outputs the baseband signal to the processor, and the processor converts the baseband signal into data and processes the data. For ease of description, FIG. 12 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in the embodiments of this application.

In the embodiments of this application, the antenna and the radio frequency circuit that have receiving and sending functions may be considered as a transceiver unit of the terminal device, and the processor that has a processing function may be considered as a processing unit of the terminal device.

As shown in FIG. 12, the terminal device includes a transceiver unit 1210 and a processing unit 1220. The transceiver unit 1210 may also be referred to as a transceiver, a transceiver machine, a transceiver apparatus, or the like. The processing unit 1220 may also be referred to as a processor, a processing board, a processing module, a processing apparatus, or the like. Optionally, a component for implementing a receiving function in the transceiver unit 1210 may be considered as a receiving unit, and a component for implementing a sending function in the transceiver unit 1210 may be considered as a sending unit. That is, the transceiver unit 1210 includes the receiving unit and the sending unit. The transceiver unit may also be sometimes referred to as a transceiver machine, a transceiver, a transceiver circuit, or the like. The receiving unit may also be sometimes referred to as a receiver machine, a receiver, a receiver circuit, or the like. The sending unit may also be sometimes referred to as a transmitter machine, a transmitter, a transmitter circuit, or the like.

For example, in an implementation, the processing unit 1220 is configured to perform step 520 in the method 500, step 630 in the method 600, and step 730 in the method 700, and/or the processing unit 1220 is further configured to perform another processing step on the terminal device side in the embodiments of this application. The transceiver unit 1210 is further configured to perform step 510 in the method 500, step 610, step 620, and step 640 in the method 600, step 710, step 720, and step 740 in the method 700, and step 810, step 820, and step 830 in the method 800, and/or the transceiver unit 1210 is further configured to perform other receiving and sending steps on the terminal device side.

It should be understood that FIG. 12 is merely an example instead of a limitation. The terminal device including the transceiver unit and the processing unit may not depend on the structure shown in FIG. 12.

When the communications device 1200 is a chip, the chip includes a transceiver unit and a processing unit. The transceiver unit may be an input/output circuit or a communications interface. The processing unit may be a processor, a microprocessor, or an integrated circuit integrated on the chip.

An embodiment of this application further provides a communications apparatus 1300. The communications apparatus 1300 may be a network device or a chip. The communications apparatus 1300 may be configured to perform an action performed by the network device in the foregoing method embodiments.

When the communications apparatus 1300 is a network device, for example, a base station, FIG. 13 is a simplified schematic structural diagram of the base station. The base station includes a part 1310 and a part 1320. The part 1310 is mainly configured to: send and receive a radio frequency signal, and perform conversion between the radio frequency signal and a baseband signal. The part 1320 is mainly configured to: perform baseband processing, control the base station, and so on. The part 1310 may be usually referred to as a transceiver unit, a transceiver machine, a transceiver circuit, a transceiver, or the like. The part 1320 is usually a control center of the base station, and may usually be referred to as a processing unit, and is configured to control the base station to perform a processing operation on a network device side in the foregoing method embodiments.

The transceiver unit in the part 1310 may also be referred to as a transceiver machine, a transceiver, or the like. The transceiver unit includes an antenna and a radio frequency unit. The radio frequency unit is mainly configured to perform radio frequency processing. Optionally, a component for implementing a receiving function in the part 1310 may be considered as a receiving unit, and a component for implementing a sending function may be considered as a sending unit. That is, the part 1310 includes the receiving unit and the sending unit. The receiving unit may also be referred to as a receiver machine, a receiver, a receiver circuit, or the like. The sending unit may be referred to as a transmitter machine, a transmitter, a transmitter circuit, or the like.

The part 1320 may include one or more boards, and each board may include one or more processors and one or more memories. The processor is configured to read and execute a program in the memory to implement a baseband processing function and control the base station. If there are a plurality of boards, the boards may be interconnected to enhance a processing capability. In an optional implementation, alternatively, the plurality of boards may share one or more processors, or the plurality of boards share one or more memories, or the plurality of boards simultaneously share one or more processors.

For example, in an implementation, the transceiver unit in the part 1310 is configured to perform a sending/receiving operation on the network device side in step 510 in the method 500, step 610, step 620, and step 640 in the method 600, step 710, step 720, and step 740 in the method 700, and step 810, step 820, and step 830 in the method 800, and/or the transceiver unit in the part 1310 is further configured to perform another sending/receiving step on the network device side in the embodiments of this application. The processing unit in the part 1320 is configured to perform a processing step on the network device side in the embodiments of this application.

It should be understood that FIG. 13 is merely an example instead of a limitation. The network device including the transceiver unit and the processing unit may not depend on the structure shown in FIG. 13.

When the communications apparatus 1300 is a chip, the chip includes a transceiver unit and a processing unit. The transceiver unit may be an input/output circuit or a communications interface. The processing unit is a processor, a microprocessor, or an integrated circuit integrated on the chip.

In addition, the network device is not limited to the foregoing form, and may alternatively be in another form. For example, the network device includes an AAU, or may include a CU node and/or a DU node, or include a BBU and an adaptive radio unit (ARU), or a BBU. The network device may alternatively be customer premises equipment (CPE), or may be in another form. This is not limited in this application.

The CU and/or DU may be configured to perform an action that is implemented inside the network device and that is described in the foregoing method embodiments, and the AAU may be configured to perform an action of receiving or sending that is performed by the network device from or to the terminal device and that is described in the foregoing method embodiments. For details, refer to the descriptions in the foregoing method embodiments. Details are not described herein again.

An embodiment of this application further provides a processing apparatus, including a processor and an interface. The processor may be configured to perform the methods described in the method embodiments.

It should be understood that the processing apparatus may be a chip. For example, the processing apparatus may be a field programmable gate array (FPGA), an application-specific integrated chip (ASIC), a system on chip (SoC), a central processing unit (CPU), a network processor (NP), a digital signal processing circuit (DSP), a micro controller unit (MCU), a programmable logic device (PLD), or another integrated chip.

In an implementation process, the steps in the foregoing methods may be completed by using a hardware integrated logic circuit in the processor or instructions in a form of software. The steps in the methods disclosed with reference to the embodiments of this application may be directly performed and completed by a hardware processor, or may be performed and completed by a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in a memory, and the processor reads information in the memory and completes the steps in the foregoing method in combination with hardware of the processor. To avoid repetition, details are not described herein again.

It should be noted that the processor in the embodiments of this application may be an integrated circuit chip, and has a signal processing capability. In an implementation process, the steps in the foregoing method embodiments may be completed by using a hardware integrated logic circuit in the processor or instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The methods, steps, and logical block diagrams that are disclosed in the embodiments of this application may be implemented or performed. The general-purpose processor may be a microprocessor, or the processor may be any conventional processor, or the like. The steps in the methods disclosed with reference to the embodiments of this application may be directly performed and completed by a hardware decoding processor, or may be performed and completed by a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in a memory, and the processor reads information in the memory and completes the steps in the foregoing method in combination with hardware of the processor.

It may be understood that the memory in the embodiments of this application may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) that is used as an external cache. Examples but not limitative descriptions are provided herein. Many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memories of the systems and methods described in this specification are intended to include but are not limited to these memories and a memory of any other proper type.

According to the methods provided in the embodiments of this application, this application further provides a computer program product. The computer program product includes computer program code. When the computer program code is run on a computer, the computer is enabled to perform the method in any one of the embodiments shown in FIG. 5 to FIG. 9.

According to the methods provided in the embodiments of this application, this application further provides a computer-readable medium. The computer-readable medium stores program code. When the program code is run on a computer, the computer is enabled to perform the method in any one of the embodiments shown in FIG. 5 to FIG. 9.

According to the methods provided in the embodiments of this application, this application further provides a system. The system includes the foregoing one or more terminal devices and the foregoing one or more network devices.

All or some of the foregoing embodiments may be implemented by software, hardware, firmware, or any combination thereof. When software is used for implementation, all or some of the embodiments may be implemented in a form of computer program product. The computer program product includes one or more computer instructions. When the computer instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by a computer, or a data storage device, such as a server or a data center, including one or more usable media that are integrated. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

The network device and the terminal device in the foregoing apparatus embodiments correspond to the network device and the terminal device in the method embodiments. A corresponding module or unit performs a corresponding step. For example, a communications unit (a transceiver) performs a receiving step or a sending step in the method embodiments, and another step other than the sending step and the receiving step may be performed by a processing unit (a processor). For a function of a specific unit, refer to the corresponding method embodiments. There may be one or more processors.

Terms such as "component", "module", and "system" used in this specification are used to represent computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or an execution thread, and a component may be located on one computer and/or distributed between two or more computers. In addition, these components may be executed by various computer-readable media that store various data structures. For example, the components may communicate by using a local and/or remote process based on a signal having one or more data packets (for example, data from two components interacting with another component in a local system, a distributed system, and/or across a network such as the internet interacting with another system by using the signal).

A person of ordinary skill in the art may be aware that illustrative logical blocks (illustrative logical block) and steps (step) described with reference to the embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for detailed working processes of the foregoing system, apparatus, and unit, refer to corresponding processes in the foregoing method embodiments, and details are not described herein again.

In the several embodiments provided in this application, it should be understood that the disclosed system, apparatus, and method may be implemented in other manners. For example, the apparatus embodiments described in the foregoing are only examples. For example, division of the units is only a type of division of logical functions, and may be another manner of division during actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to a conventional technology, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, for example, a USB flash drive, a removable hard disk, a read-only memory (ROM), a random access memory (RAM), a magnetic disk, or an optical disc.

The foregoing descriptions are merely specific implementations of this application, but the protection scope of this application is not limited thereto. Any variation or replacement readily figured out by the person skilled in the art within the technical scope disclosed in this application shall fall within the protection scope of this application. Therefore, the protection scope of this application shall be subject to the protection scope of the claims.

What is claimed is:

1. A method for updating beam information, comprising:
    receiving, by a communications apparatus, information about a time-frequency tracking reference signal resource configured for a first component carrier (CC) and information about a time-frequency tracking reference signal resource configured for one or more second CCs associated with the first CC;
    receiving, by the communications apparatus, beam update information of the first CC indicating the communications apparatus to update beam information of the first CC, wherein the beam update information of the first CC comprises information about an active transmission configuration indicator state (TCI-state) of the first CC; and
    in response to receiving the beam update information of the first CC, updating, by the communications apparatus based on the beam update information of the first CC, the beam information of the first CC and beam information of the one or more second CCs associated with the first CC, wherein updating the beam information comprises activating, based on the active TCI-state of the first CC, a TCI-state of the first CC and a TCI-state of the one or more second CCs to generate the active TCI-state of the first CC and an active TCI-state of the one or more second CCs same as the active TCI-state of the first CC.

2. The method according to claim 1, wherein the one or more second CCs and the first CC are comprised in one group.

3. The method according to claim 1, the method further comprises:
    before receiving the beam update information of the first CC, receiving beam configuration information of the first CC, and indication information indicating that the one or more second CCs are associated with the first CC.

4. The method according to claim 1, wherein the one or more second CCs and the first CC have a same beam configuration.

5. The method according to claim 1, wherein updating the beam information of the one or more second CCs comprises:
    updating information about quasi-co-location (QCL)-TypeA or QCL-TypeD of the one or more second CCs based on the beam update information of the first CC, wherein a time-frequency tracking reference signal resource associated with the QCL-TypeA of the one or more second CCs is the time-frequency tracking reference signal resource of the one or more second CCs.

6. The method according to claim 5, wherein a configuration of the QCL-TypeA or the QCL-TypeD is absent of a CC identifier, and wherein the method further comprising:
    sending a reference signal of the QCL-TypeA or the reference signal of the QCL-TypeD on a frequency domain resource without the CC identifier.

7. The method according to claim 1, wherein updating the beam information of the first CC and the beam information of the one or more second CCs comprises:
    updating a spatial relationship of the one or more second CCs to generate an updated spatial relationship of the one or more second CCs associated with the active TCI-state of the first CC.

8. The method according to claim 1, wherein the active TCI-state of the one or more second CCs and the active TCI-state of the first CC are TCI-states of control resource sets with a same control resource set identifier (ID).

9. The method according to claim 1, wherein the beam update information of the first CC is carried in medium access control-control element (MAC-CE) signaling, and a reserved field in the MAC-CE signaling indicates whether to update the beam information of the one or more second CCs and the beam information of the first CC based on the beam update information of the first CC.

10. The method according to claim 1, wherein:
    the active TCI-state of the one or more second CCs and the active TCI-state of the first CC are used to transmit one or more of: PUSCH, SRS, or PUCCH; or
    the active TCI-state of the one or more second CCs and the active TCI-state of the first CC are used to receive one or more of: PDCCH, PDSCH, or CSI-RS.

11. A communications apparatus, comprising:
    at least one processor communicably coupled to one or more memories storing programming instructions for execution by the at least one processor to perform operations comprising:
    receiving information about a time-frequency tracking reference signal resource configured for a first component carrier (CC) and information about a time-frequency tracking reference signal resource configured for one or more second CCs associated with the first CC;
    receiving beam update information of the first CC indicating the communications apparatus to update beam information of the first CC, wherein the beam update information of the first CC comprises information about an active transmission configuration indicator state (TCI-state) of the first CC; and
    in response to receiving the beam update information of the first CC, updating, based on the beam update information of the first CC, beam information of the first CC and beam information of the one or more second CCs associated with the first CC, wherein updating the beam information comprises activating, based on the active TCI-state of the first CC, a TCI-state of the first CC and a TCI-state of the one or more second CCs to generate the active TCI-state of the first CC and an active TCI-state of the one or more second CCs same as the active TCI-state of the first CC.

12. The communications apparatus according to claim 11, wherein the one or more second CCs and the first CC are comprised in one group.

13. The communications apparatus according to claim 11, wherein the operations further comprising: receiving beam configuration information of the first CC, and indication information indicating that the one or more second CCs are associated with the first CC.

14. The communications apparatus according to claim 11, wherein the one or more second CCs and the first CC have a same beam configuration.

15. The communications apparatus according to claim 11, wherein update the beam information of the one or more second comprises:
updating information about quasi-co-location (QCL)-TypeA or QCL-TypeD of the one or more second CCs based on the beam update information of the first CC, wherein a time-frequency tracking reference signal resource associated with the QCL-TypeA of the one or more second CCs is the time-frequency tracking reference signal resource of the one or more second CCs.

16. The communications apparatus according to claim 15, wherein a configuration of the QCL-TypeA or the QCL-TypeD is absent of a CC identifier, and wherein the operations further comprising:

sending a reference signal of the QCL-TypeA or the reference signal of the QCL-TypeD on a frequency domain resource without the CC identifier.

17. The communications apparatus according to claim 11, wherein
updating the beam information of the first CC and the beam information of the one or more second CCs comprises:
updating a spatial relationship of the one or more second CCs to generate an updated spatial relationship of the one or more second CCs associated with the active TCI-state of the first CC.

18. The communications apparatus according to claim 11, wherein the active TCI-state of the one or more second CCs and the active TCI-state of the first CC are TCI-states of control resource sets with a same control resource set identifier (ID).

19. The communications apparatus according to claim 11, wherein the beam update information of the first CC is carried in medium access control-control element (MAC-CE) signaling, and a reserved field in the MAC-CE signaling indicates whether to update the beam information of the one or more second CCs and the beam information of the first CC based on the beam update information of the first CC.

20. The communications apparatus according to claim 11, wherein:
the active TCI-state of the one or more second CCs and the active TCI-state of the first CC are used to transmit one or more of: PUSCH, SRS, or PUCCH; or
the active TCI-state of the one or more second CCs and the active TCI-state of the first CC are used to receive one or more of: PDCCH, PDSCH, or CSI-RS.

* * * * *